(12) United States Patent
Akifusa et al.

(10) Patent No.: US 9,602,809 B2
(45) Date of Patent: Mar. 21, 2017

(54) STORAGE MEDIUM STORING DISPLAY CONTROL PROGRAM FOR PROVIDING STEREOSCOPIC DISPLAY DESIRED BY USER WITH SIMPLER OPERATION, DISPLAY CONTROL DEVICE, DISPLAY CONTROL METHOD, AND DISPLAY CONTROL SYSTEM

(75) Inventors: Yusuke Akifusa, Kyoto (JP); Toshio Sengoku, Kyoto (JP); Naoki Nakano, Kyoto (JP); Naoko Mori, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 549 days.

(21) Appl. No.: 12/858,810

(22) Filed: Aug. 18, 2010

(65) Prior Publication Data

US 2011/0304714 A1 Dec. 15, 2011

(30) Foreign Application Priority Data

Jun. 14, 2010 (JP) ................... 2010-135207

(51) Int. Cl.
*H04N 13/00* (2006.01)
*H04N 13/04* (2006.01)
(Continued)

(52) U.S. Cl.
CPC ....... *H04N 13/0454* (2013.01); *G06F 3/0488* (2013.01); *G06F 3/04815* (2013.01);
(Continued)

(58) Field of Classification Search
None
See application file for complete search history.

(56) References Cited

U.S. PATENT DOCUMENTS 6,025,833 A * 2/2000 Duff ............................ 345/159
7,371,163 B1 5/2008 Best
(Continued)

FOREIGN PATENT DOCUMENTS

EP 0 963 122 12/1999
EP 1 617 684 1/2006
(Continued)

OTHER PUBLICATIONS

Apr. 9, 2012 Notice of Grounds of rejection in JP2010-135207, with English translation, 9 pages.
(Continued)

*Primary Examiner* — Ryan D McCulley
(74) *Attorney, Agent, or Firm* — Nixon & Vanderhye P.C.

(57) ABSTRACT

A storage medium encoded with a display control program and executable by a computer of a display control device capable of interacting with an input device, for controlling a display capable of providing stereoscopic display, is provided. The present display control program stored in the storage medium includes zoom control instructions for performing zoom processing of a stereoscopic image based on an operation input accepted by operation input acceptance instructions, parallax control instructions for adjusting parallax of the stereoscopic image based on the operation input accepted by the operation input acceptance instructions, and display control instructions for causing the display to display the stereoscopic image subjected to zoom processing in accordance with the zoom control instructions, with parallax adjusted in accordance with the parallax control instructions.

25 Claims, 25 Drawing Sheets

(51) Int. Cl.
*G06F 3/0481* (2013.01)
*G06F 3/0484* (2013.01)
*G06F 3/0488* (2013.01)
*H04N 13/02* (2006.01)

(52) U.S. Cl.
CPC ..... *G06F 3/04847* (2013.01); *H04N 13/0022* (2013.01); *H04N 13/0029* (2013.01); *H04N 13/0497* (2013.01); *G06F 2203/04806* (2013.01); *H04N 13/0239* (2013.01); *H04N 13/0409* (2013.01); *H04N 13/0456* (2013.01)

(56) References Cited

U.S. PATENT DOCUMENTS

| | | | |
|---|---|---|---|
| 7,593,603 | B1 | 9/2009 | Wilensky |
| 2002/0008906 | A1 | 1/2002 | Tomita |
| 2006/0077185 | A1 | 4/2006 | Mashimo |
| 2006/0106757 | A1* | 5/2006 | Sakai et al. ............... 707/2 |
| 2006/0192780 | A1* | 8/2006 | Lantin ....................... 345/427 |
| 2006/0290778 | A1 | 12/2006 | Kitaura et al. |
| 2008/0046836 | A1 | 2/2008 | Maruyama et al. |
| 2008/0158346 | A1* | 7/2008 | Okamoto et al. ............ 348/47 |
| 2010/0201789 | A1* | 8/2010 | Yahagi ....................... 348/51 |
| 2012/0002903 | A1* | 1/2012 | Wilensky ................... 382/311 |

FOREIGN PATENT DOCUMENTS

| | | |
|---|---|---|
| JP | 4-35491 | 2/1992 |
| JP | 08-313825 | 11/1996 |
| JP | 8-317429 | 11/1996 |
| JP | 9-237160 | 9/1997 |
| JP | 9-305306 | 11/1997 |
| JP | 2001-326947 | 11/2001 |
| JP | 2002-101428 | 4/2002 |
| JP | 2004-349736 | 12/2004 |
| JP | 2006-251683 | 9/2006 |
| JP | 2008-167066 | 7/2008 |
| JP | 2010-8608 | 1/2010 |
| WO | 2005/020591 | 3/2005 |

OTHER PUBLICATIONS

Jun. 13, 2012, European Search Report for EP 10173640.3, 8 pages.
European Office Action issued in European Application No. 10 173 640 dated Dec. 2, 2015.

* cited by examiner

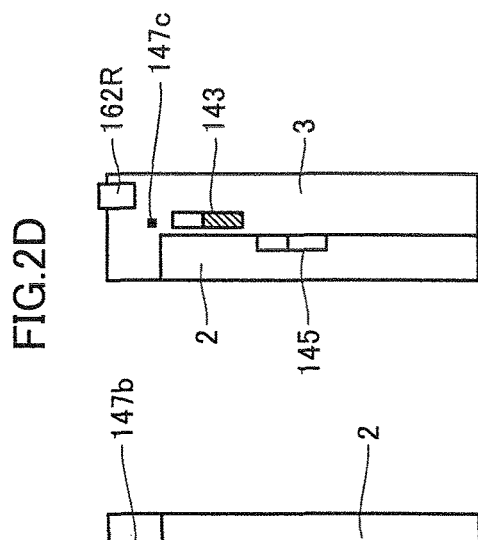
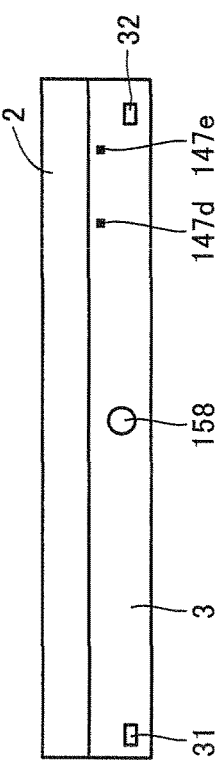
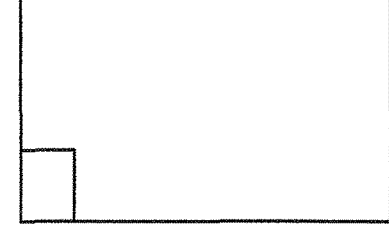
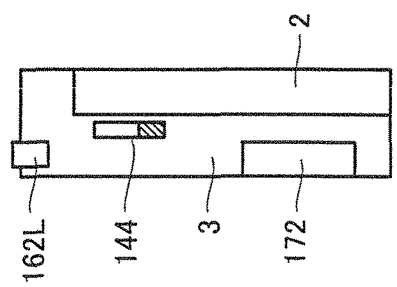

162R  174    170    176  179  162L

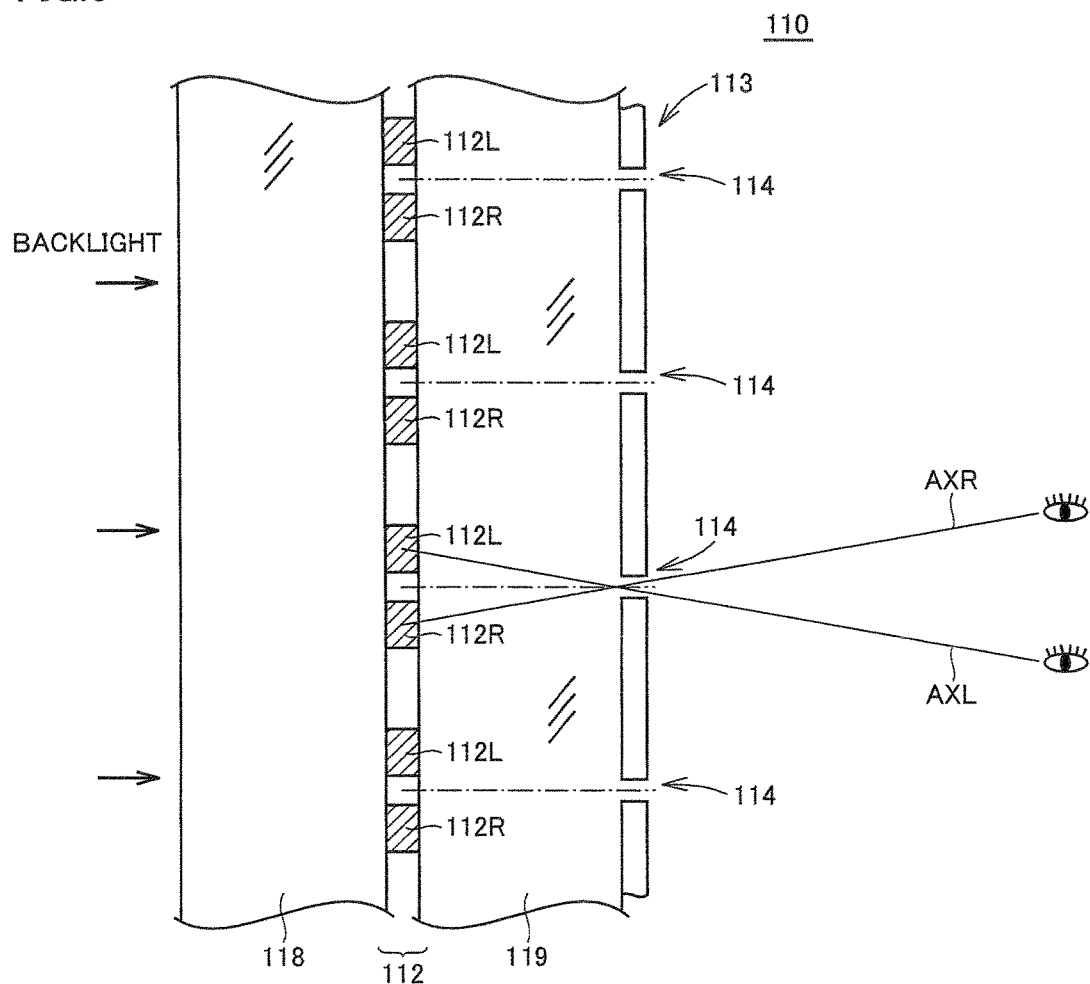

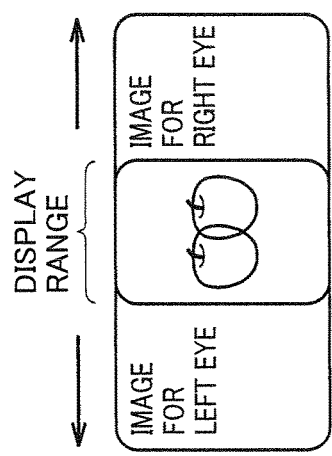
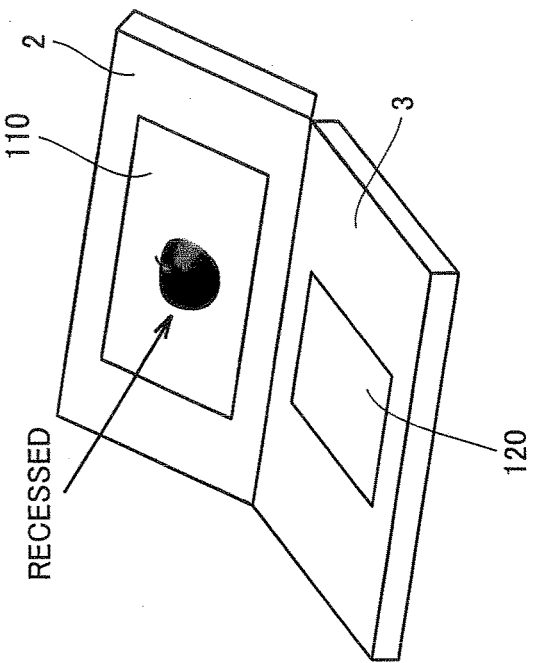
FIG.8A
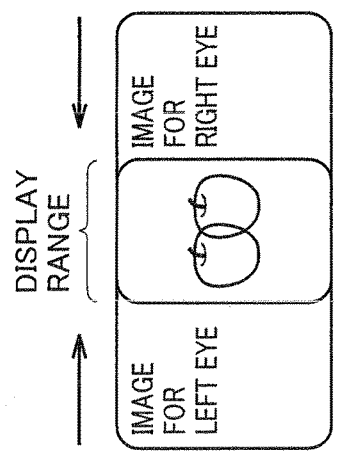
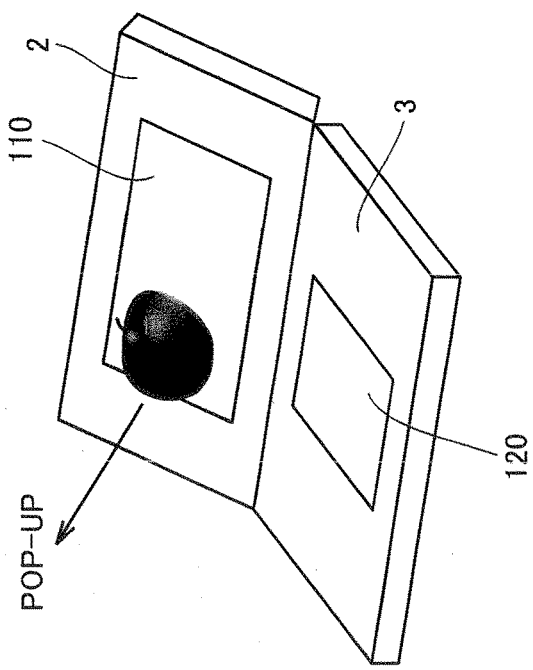
FIG.8B

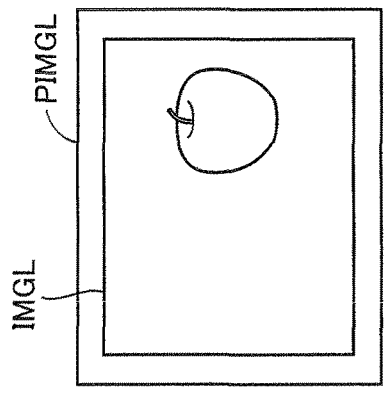
FIG.9A
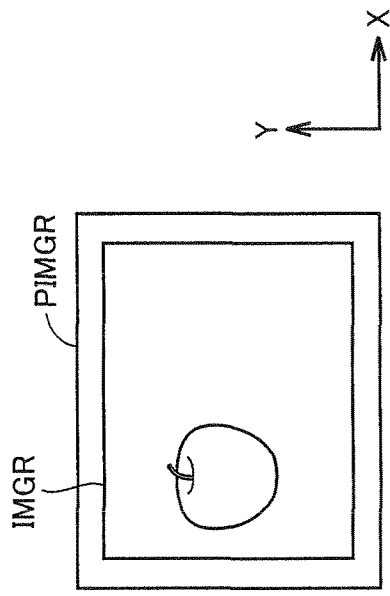
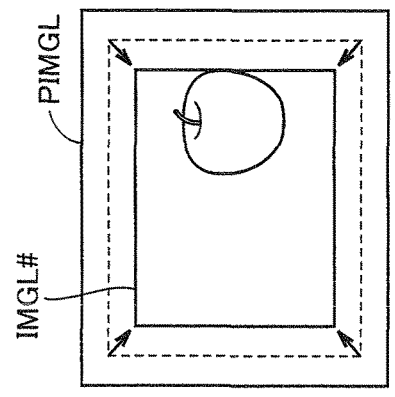
FIG.9B
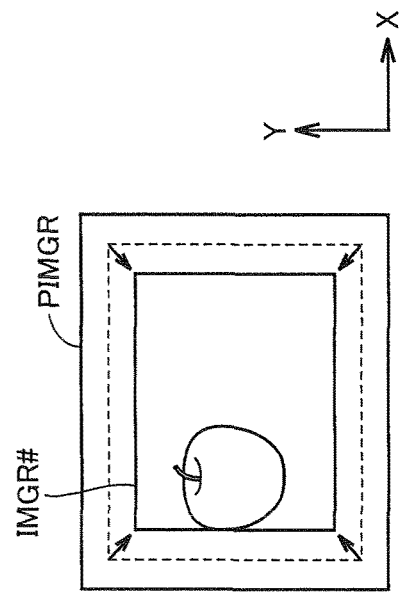

FIG.12A
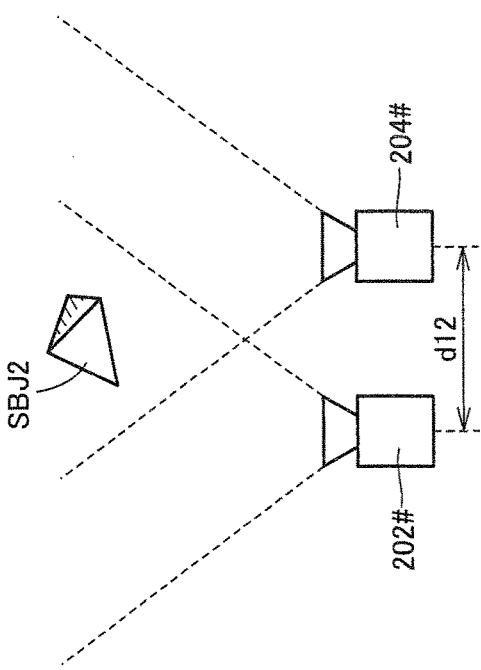
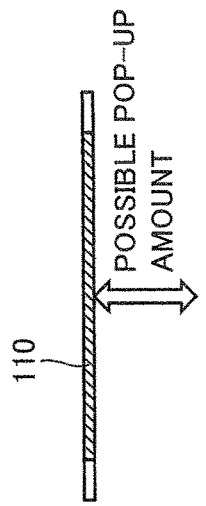
FIG.12B
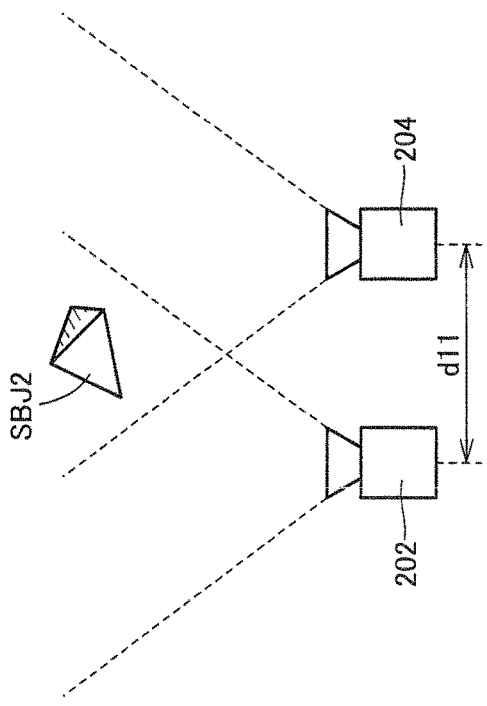
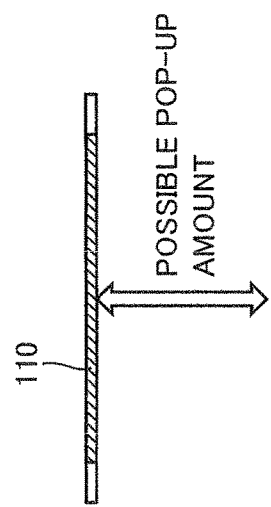

STORAGE MEDIUM STORING DISPLAY CONTROL PROGRAM FOR PROVIDING STEREOSCOPIC DISPLAY DESIRED BY USER WITH SIMPLER OPERATION, DISPLAY CONTROL DEVICE, DISPLAY CONTROL METHOD, AND DISPLAY CONTROL SYSTEM

This nonprovisional application is based on Japanese Patent Application No. 2010-135207 filed with the Japan Patent Office on Jun. 14, 2010, the entire contents of which are hereby incorporated by reference.

BACKGROUND OF THE INVENTION

Field of the Invention

The present invention relates to a storage medium storing a display control program for controlling a display capable of providing stereoscopic display, a display control device, a display control method, and a display control system.

Description of the Background Art

With development of a display device and improvement in image processing performance, various displays providing stereoscopic display have been put into practical use. As a basic method of realizing such stereoscopic display (stereoscopic image), a method of using a pair of images (stereo images) having prescribed parallax that is obtained as a result of image pick-up of a common subject at different observation points has been known.

For example, Japanese Patent Laying-Open No. 2006-251683 discloses a stereoscopic image pick-up system for forming a stereoscopic image by using left and right video cameras to pick up a right parallax image and a left parallax image respectively. This stereoscopic image pick-up system can also perform zoom processing by controlling image pick-up lenses used in the left and right video cameras to vary a focal length.

In realizing stereoscopic display by using a pair of images (an image for left eye and an image for right eye) having parallax as disclosed in the prior art document described above, the image for left eye and the image for right eye are displayed on a display such that they are viewed by user's left and right eyes respectively. Then, a user may see a portion displayed in a manner overlapping between the image for left eye and the image for right eye, around a display surface of the display.

Namely, the portion displayed in a manner overlapping between the image for left eye and the image for right eye is a portion on which the user can readily focus. Therefore, parallax between the image for left eye and the image for right eye at the display surface of the display is preferably adjusted such that an object or the like on which a user wishes to focus is located at a portion displayed in a manner overlapping between the image for left eye and the image for right eye.

When zoom processing or the like as shown in the prior art document described above is performed, a range (a size or a position of a subject) displayed as the image for left eye and the image for right eye is varied. In general, it is considered that, in many cases, the user performs zoom processing or the like if he/she wishes to focus on a specific portion of the subject.

Here, as the size or the position of the subject displayed on the display is varied in accordance with zoom processing or the like, parallax on the display before zoom processing is different from parallax on the display after the zoom processing. Therefore, parallax of the portion that has been focused on by the user is altered when zoomed. For example, when zoom is performed from a state that parallax has been adjusted such that the portion focused on by the user is seen around the display surface, it is also possible that parallax of that portion that has been focused on is altered and that portion is seen at a distance from around the display surface, and a portion different from the portion on which the user wished to focus is seen around the display surface of the display.

SUMMARY OF THE INVENTION

The present invention was made to solve the above-described new problems, and an object of the present invention is to provide a storage medium storing a display control program for providing stereoscopic display desired by a user with a simpler operation, a display control device, a display control method, and a display control system.

According to a first aspect of the present invention, a non-transitory storage medium encoded with a display control program and executable by a computer of a display control device capable of interacting with an input device, for causing a display capable of providing stereoscopic display to display a stereoscopic image, is provided. The present display control program includes operation input acceptance instructions for accepting an operation input from the input device, zoom control instructions for performing zoom processing of the stereoscopic image based on the operation input accepted by the operation input acceptance instructions, parallax control instructions for adjusting parallax of the stereoscopic image based on the operation input accepted by the operation input acceptance instructions, and display control instructions for causing the display to display the stereoscopic image subjected to zoom processing in accordance with the zoom control instructions, with parallax adjusted in accordance with the parallax control instructions.

According to this first aspect, the user can simultaneously perform zoom processing of a stereoscopic image displayed on the display surface of the display and adjust parallax of the stereoscopic image, by performing one operation on the input device. Thus, since the user can make adjustment, while zooming, of parallax that has been varied by that zooming, in a single operation, a portion to be focused on can be zoomed with a simple operation such that it is more readily viewed.

According to a second aspect of the present invention, in the first aspect described above, the input device outputs at least a two-dimensional value as the operation input.

According to this second aspect, since at least a two-dimensional value is employed as the operation input, an operation relating to zoom processing and an operation relating to adjustment of parallax can independently be defined.

According to a third aspect of the present invention, in the second aspect described above, the zoom control instructions perform zoom processing of the stereoscopic image based on a value in one dimension included in the operation input, and the parallax control instructions adjust parallax of the stereoscopic image based on a value in the other dimension included in the operation input.

According to this third aspect, separately for a value of each dimension included in the operation input, a value for zoom processing of the stereoscopic image and a value for adjustment of parallax of the stereoscopic image can independently be generated.

According to a fourth aspect of the present invention, in the third aspect described above, the input device includes one button or a plurality of buttons that can independently operate two directions brought in correspondence with the two-dimensional value and outputs the operation input having values in accordance with a button operation in respective directions.

According to a fifth aspect of the present invention, in the fourth aspect described above, the display control program further includes command generation instructions for generating a first command value for performing zoom processing of the stereoscopic image and a second command value for adjusting parallax of the stereoscopic image based on the button operation in respective directions.

According to these fourth and fifth aspects, the user can adjust stereoscopic display with an operation the same as a button operation that has conventionally widely been used.

According to a sixth aspect of the present invention, in the second aspect described above, the input device includes a pointing device, the zoom control instructions are adapted to perform zoom processing of the stereoscopic image based on a position in a first axial direction output from the pointing device, and the parallax control instructions are adapted to adjust parallax of the stereoscopic image based on a position in a second axial direction output from the pointing device.

According to this sixth aspect, the user can operate any position on a pointing device that extends two-dimensionally. Therefore, an operation for realizing desired stereoscopic vision can readily be performed.

According to a seventh aspect of the present invention, in the sixth aspect described above, the display control program further includes state value object display instructions for displaying a state value object at a coordinate position corresponding to a first state value indicating a state of zoom of the stereoscopic image and a second state value indicating a state of parallax of the stereoscopic image, in a two-dimensional coordinate where the first axial direction and the second axial direction serve as coordinate axes.

According to this seventh aspect, a first state value indicating a state of zoom of a stereoscopic image and a second state value indicating a state of parallax of a stereoscopic image can expressly be presented to the user. Thus, the user can grasp a state of stereoscopic display at a glance and can readily perform an operation for achieving aimed stereoscopic display.

According to an eighth aspect of the present invention, in the seventh aspect described above, the display control program further includes command generation instructions for generating a first command value for performing zoom processing of the stereoscopic image and a second command value for adjusting parallax of the stereoscopic image in accordance with a direction of displacement between a position of display of the state value object and the pointed position in the two-dimensional coordinate. The state value object display instructions are adapted to update the position of display of the state value object in accordance with the pointed position.

According to this eighth aspect, since the user should only point a position in accordance with an aimed operation direction by using a state value object displayed on the two-dimensional coordinate as the reference, he/she can intuitively adjust stereoscopic display.

According to a ninth aspect of the present invention, in the eighth aspect described above, the state value object display instructions are adapted to update the position of display of the state value object at a speed in accordance with a distance between the position of display of the state value object and the pointed position.

According to this ninth aspect, since a position of display of the state value object is updated in response to a user's operation, the user can intuitively perform an operation.

According to a tenth aspect of the present invention, in the second aspect described above, the input device includes an analog device capable of accepting input having at least two degrees of freedom and outputs the operation input having a value in accordance with a direction of displacement and an amount of displacement from a prescribed reference position.

According to this tenth aspect, an analog device is used by way of example of an input device. Since the user can perform an operation for achieving aimed stereoscopic display in accordance with an amount of operation (typically, a degree of pressing) of the analog device, operability can further be enhanced.

According to an eleventh aspect of the present invention, in the tenth aspect described above, the display control program further includes command generation instructions for generating a first command value for performing zoom processing of the stereoscopic image and a second command value for adjusting parallax of the stereoscopic image, in accordance with the direction of displacement from the reference position in the analog device.

According to a twelfth aspect of the present invention, in the eleventh aspect described above, the command generation instructions are adapted to generate the first command value and the second command value such that a state of zoom of the stereoscopic image and a state of parallax of the stereoscopic image are varied at a speed in accordance with the amount of displacement from the reference position in the analog device.

According to these eleventh and twelfth aspects, the user can generate a greater command value as an amount of displacement provided to the analog device is increased. Namely, when the user wishes to change a state of zoom of the stereoscopic image and a state of parallax of the stereoscopic image in a shorter period of time, the user can do so by displacing the analog device to a larger extent, and when he/she wishes fine adjustment, he/she can do so by displacing the analog device to a smaller extent.

According to a thirteenth aspect of the present invention, the display control program further includes image display instructions for providing stereoscopic display by causing the display to display entirety or a part of a first image and a second image having parallax on a display surface thereof. The zoom control instructions are adapted to perform zoom processing of the first image and the second image on the display surface of the display based on the operation input accepted by the operation input acceptance instructions, and the parallax control instructions are adapted to adjust parallax of the first image and the second image at the display surface of the display based on the operation input accepted by the operation input acceptance instructions.

According to this thirteenth aspect, typically, processing more suitable for such a display as providing stereoscopic display using stereo images can be provided.

According to a fourteenth aspect of the present invention, in the thirteenth aspect described above, the image display instructions are adapted to cause the first image and the second image to be displayed in a substantially identical display region.

According to this fourteenth aspect, an object on which the user wishes to focus can be displayed around the display surface of the display.

According to a fifteenth aspect of the present invention, in the thirteenth aspect described above, the display control device is configured to interact with a first image pick-up device and a second image pick-up device arranged at a prescribed distance from each other, and the image display instructions are adapted to cause respective ranges in accordance with the operation input in a first input image and a second input image generated as a result of image pick-up by the first image pick-up device and the second image pick-up device to be displayed as the first image and the second image.

According to this fifteenth aspect, zoom processing can be performed simply by partially cutting out images generated by the first image pick-up device and the second image pick-up device respectively. Therefore, an image displayed on the display can be zoomed without an optical mechanism.

According to a sixteenth aspect of the present invention, in the thirteenth aspect described above, the display control device is configured to interact with a storage device for storing an image, and the display control program further includes saving instructions for saving in the storage device, in response to a prescribed operation, an image having a size in accordance with a state of scaled-up display or scaled-down display of the first image and the second image at that time point, in association with information indicating a state of parallax of the first image and the second image at that time point.

According to a seventeenth aspect of the present invention, in the thirteenth aspect described above, the display control device is configured to interact with a storage device for storing at least a pair of images having parallax, and the display control instructions are adapted to obtain the pair of images stored in the storage device as the first image and the second image.

According to an eighteenth aspect of the present invention, in the seventeenth aspect described above, the storage device stores information indicating a state of parallax of the pair of images in association with the pair of images, and the display control instructions are adapted to cause the first image and the second image obtained from the pair of images to be displayed on the display surface of the display in relative positional relation based on the information indicating the state of parallax of the pair of images, as an initial state.

According to these sixteenth to eighteenth aspects, a state immediately before saving can readily be reproduced. Therefore, once the user has made adjustment to desired stereoscopic display, the user can subsequently reproduce that state again and again.

According to a nineteenth aspect of the present invention, in the first aspect described above, the display control device is configured to interact with a display for providing non-stereoscopic display, and the display control program further includes state value display instructions for displaying a state of zoom of the stereoscopic image and a state of parallax of the stereoscopic image on the display for providing non-stereoscopic display.

According to this nineteenth aspect, the user can recognize a current state of stereoscopic display at a glance.

According to a twentieth aspect of the present invention, a display control method performed on a computer of a display control device, for controlling a display capable of providing stereoscopic display, is provided. The present display control method includes: an operation input acceptance step of accepting an operation input from an input device; a zoom control step of performing zoom processing of a stereoscopic image based on the operation input accepted in the operation input acceptance step; a parallax control step of adjusting parallax of the stereoscopic image based on the operation input accepted in the operation input acceptance step; and a display control step of causing the display to display the stereoscopic image subjected to zoom processing in the zoom control step, with parallax adjusted in the parallax control step.

According to a twenty-first aspect of the present invention, a display control device is provided. The present display control device includes: a display capable of displaying a stereoscopic image; an input device; an operation input acceptance unit for accepting an operation input from the input device; a zoom control unit for performing zoom processing of the stereoscopic image based on the operation input accepted by the operation input acceptance unit; a parallax control unit for adjusting parallax of the stereoscopic image based on the operation input accepted by the operation input acceptance unit; and a display control unit for causing the display to display the stereoscopic image subjected to zoom processing by the zoom control unit, with parallax adjusted by the parallax control unit.

According to a twenty-second aspect of the present invention, a display control system including a recording medium storing a display control program and a display control device main body to which the recording medium can be attached is provided. The display control device main body includes a display capable of displaying a stereoscopic image and an input device. The display control program stored in the recording medium and executed on a computer of the display control device main body includes operation input acceptance instructions for accepting an operation input from the input device, zoom control instructions for performing zoom processing of the stereoscopic image based on the operation input accepted by the operation input acceptance instructions, parallax control instructions for adjusting parallax of the stereoscopic image based on the operation input accepted by the operation input acceptance instructions, and display control instructions for causing the display to display the stereoscopic image subjected to zoom processing in accordance with the zoom control instructions, with parallax adjusted in accordance with the parallax control instructions.

According to these twentieth to twenty-second aspects, a function and effect the same as in the first aspect described above can be obtained.

According to the present invention, stereoscopic display desired by the user can be realized with a simple operation.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 2A to 2D are projection views with an upper surface side of the game device shown in FIG. 1 being the center.

FIG. 6 is a schematic cross-sectional view of an upper LCD shown in FIG. 5.

FIGS. 8A and 8B are diagrams for illustrating a method of providing stereoscopic display using the pair of images having parallax generated with the method shown in FIGS. 7A and 7B.

FIGS. 9A and 9B are diagrams for illustrating a zoom function in the game device according to the embodiment of the present invention.

FIGS. 12A and 12B are diagrams for illustrating a phenomenon caused by change in a parallax base.

DESCRIPTION OF THE PREFERRED EMBODIMENTS

Figure 1:
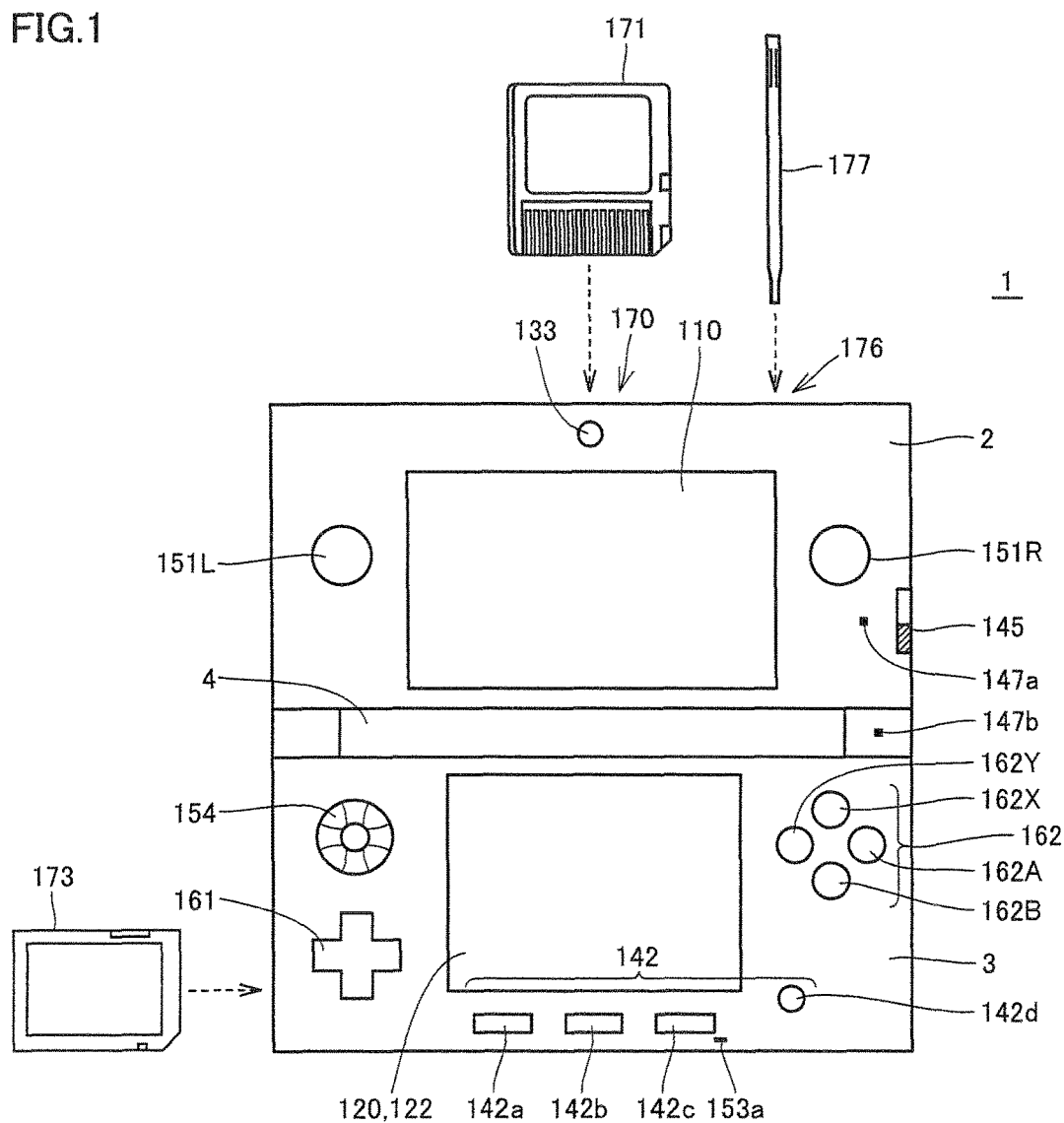
FIG. 1 is a top view of a game device (in an opened state) according to an embodiment of the present invention.

An embodiment of the present invention will be described in detail with reference to the drawings. The same or corresponding elements in the drawings have the same reference characters allotted, and description thereof will not be repeated.

A portable game device 1 representing a computer will be described hereinafter as a representative example of a display control device according to the present invention. In addition, as an implementation of a display control program for controlling a display according to the present invention, a non-transitory computer-readable medium contained in game device 1 or an instruction set stored in a non-transitory computer-readable medium removably attached to game device 1 is exemplified. Namely, in the present embodiment, as game device 1 executes a program prepared in advance, processing for display control as shown below is realized.

Game device 1 has a display capable of providing stereoscopic display and can interact with an input device for accepting an operation from a user or the like. In the present specification, the expression "can interact with" means that wired or wireless connection of an apparatus, means, a device, or the like of interest with a computer is established so that data can be communicated. Here, an apparatus, means or a device with which the game device can interact may integrally be configured with a display control device or it may be configured independently of the display control device.

The display control device according to the present invention is not limited to game device 1, and it may be mounted as a personal computer, a portable telephone, a portable terminal, or the like capable of executing also various applications. In addition, a display control program according to the present invention may be incorporated as a partial function of various applications executed by a personal computer or the like.

A. Definition (1) In the present specification, "stereoscopic display", "three-dimensional display" and "3D display" mean that an image is expressed such that the user can visually recognize at least a partial object included in the image stereoscopically. In order to have the user visually recognize the object stereoscopically, typically, physiological functions of eyes and brain of a human are utilized.

(2) In the present specification, a "stereoscopic image" means an image displayed for having the user visually recognize an object stereoscopically, and various types of images are assumed depending on a method for providing stereoscopic display as will be described later. In an example where stereo images (an image for left eye and an image for right eye) as will be described later are used, both of these images are collectively referred to as a stereoscopic image.

(3) In the present specification, "two-dimensional display" and "2D display" are terms as opposed to "stereoscopic display" and the like described above, and they mean that an image is expressed such that the user cannot visually recognize an object included in the image stereoscopically.

(4) In the present specification, "parallax" means (a degree of) difference in how a common object (a point of interest) is viewed, between an image viewed with left eye of the user and an image viewed with right eye of the user. This common object may merely be a part of an image that appears on the display surface of the display.

When images representing object images observed at respective observation points are generated in a case where some object (subject) is observed from different observation points (actually or virtually), these images "have parallax". In addition, a plurality of images having parallax can also be generated artificially from a single image. An "image having parallax" herein also includes an image generated with such a method.

(5) In the present specification, an "amount of parallax" means difference (magnitude) in position of an object image representing a common object (a point of interest), between an image visually recognized by the user's left eye and an image visually recognized by the user's right eye, that appear on the display surface of the display. Namely, the "amount of parallax" herein can mainly be calculated for each object (a point of interest) on which the user focuses, in the image displayed on the display.

(6) In the present specification; "adjusting parallax" means changing the "amount of parallax" described above. Namely, it means varying difference (magnitude) in position of an object image representing a certain common object (a point of interest), between an image visually recognized by the user's left eye and an image visually recognized by the user's right eye.

As means for realizing such a method of "adjusting parallax", typically, a method of changing parallax of a pair of images (images for left eye and right eye) displayed on the display surface of the display and a method of changing positional relation in displaying the pair of images on the display surface of the display are possible.

Regarding the former method, attention being paid to a common object (a point of interest) included in an image for left eye and an image for right eye when an observation point for generating the image for left eye and an observation point for generating the image for right eye are set at different positions, a position within the image for left eye of the object image representing the common object (point of interest) is different from a position within the image for right eye of the object image representing the common object (point of interest). Therefore, an image having non-zero parallax amount can be presented to the user. Then, by changing relative positional relation between the observation points in generating these images, the amount of parallax can be adjusted. Here, an actual image pick-up device or a virtual image pick-up device can be used for generating a pair of images.

Regarding the latter method, an amount of parallax can be adjusted also by displacing a position of display of each image on the display surface of the display. More specifically, a position of display, a display range, relative position displacement between images, or the like in displaying each image can be adjusted.

(7) In the present specification, "zoom (of an image)" or "zoom processing" means variation of contents in an image expressed on the display surface of the display. More specifically, it means processing for varying a size, a position of display, an observation point, or the like of some object displayed on the display surface of the display. Typically, it includes such processing as scaled-up display or scaled-down display of a displayed image.

For example, in a typical example of scaled-up display (zoom-in processing), only a part of an object that appeared on the display surface of the display at a certain time point is displayed on the display surface of the display. Alternatively, a typical example of scaled-down display (zoom-out processing) is an operation for displaying an object that appeared on the display surface of the display at a certain time point, together with its surroundings.

As a method of realizing such "zoom processing", a method or the like of changing as appropriate a position of an image pick-up device (including both of an actual camera and a virtual camera) relative to an object, a field of view, an angle of view, an optical system, or the like is possible. In addition, a method or the like of changing as appropriate a position of display, a display range, relative position displacement between images, or the like in displaying some image on the display surface of the display can also be adopted.

(8) In the present specification, obtaining some image data using an image pick-up device (image pick-up means) is denoted as "image pick-up". The image data obtained as a result of this image pick-up can be displayed as it is on the display (display means) or it can also be stored (saved) in a storage device (storage means) in a state as it is or in a state as subjected to some processing.

B. Overview

In game device 1 according to the present embodiment, the user can simultaneously perform a zoom operation (processing for scaled-up display/scaled-down display) of an image expressed on the display surface of the display and an operation for adjustment of stereoscopic effect (processing for adjusting parallax) of an object visually recognized stereoscopically with respect to the display surface of the display.

As will be described later, for example, even when a zoom operation alone is performed for an image expressed on the display surface of the display, an amount of parallax between a first image and a second image displayed on the display surface of the display may fluctuate.

In game device 1 according to the present embodiment, for example, such an operation for setting an appropriate amount of raise from the display surface, of an object of interest can readily be performed while performing zoom processing of a displayed image.

C. Appearance of Device

FIG. 1 is a top view of game device 1 (in an opened state) according to an embodiment of the present invention.

Figure 3B:
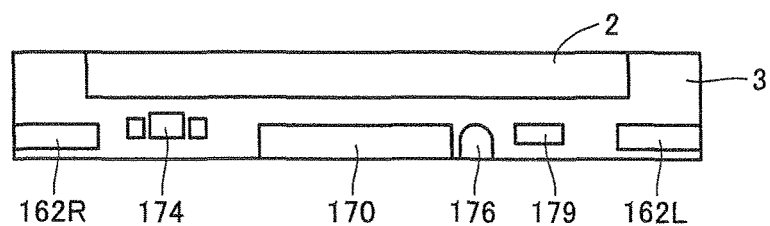
FIGS. 3A and 3B are projection views with a bottom surface side of the game device shown in FIG. 1 being the center.
Figure 3A:
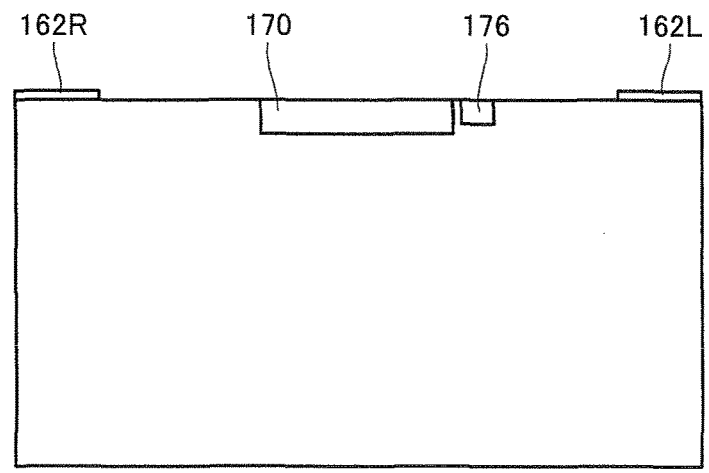

FIGS. 2A to 2D are projection views with an upper surface side of game device 1 shown in FIG. 1 being the center. Namely, FIG. 2A shows a top view of game device 1 (in a closed state), FIG. 2B shows a front view of game device 1, FIG. 2C shows a left side view of game device 1, and FIG. 2D shows a right side view of game device 1. FIGS. 3A and 3B are projection views with a bottom surface side of game device 1 shown in FIG. 1 being the center. Namely, FIG. 3A shows a bottom view of game device 1 and FIG. 3B shows a rear view of game device 1. In the present specification, for the sake of convenience, with arrangement of game device 1 as shown in FIG. 1 being the reference, the terms "top", "front", "left side", "right side", "bottom", and "rear" are used, however, these terms are formally used and they do not intend to restrict a manner of use of game device 1 by the user.

Referring to FIGS. 1 to 3, portable game device 1 according to the present embodiment is configured to be foldable. Appearance of game device 1 in an opened state is as shown in FIG. 1, and appearance thereof in a closed state is as shown in FIG. 2A. Game device 1 preferably has such a size that the user can hold game device 1 with both hands or one hand even in the opened state.

Game device 1 has an upper housing 2 and a lower housing 3. Upper housing 2 and lower housing 3 are coupled to allow opening and closing (be foldable). In the example shown in FIG. 1, upper housing 2 and lower housing 3 are each formed like a rectangular plate, and they are coupled to each other to be pivotable around a long side portion thereof by means of a hinge 4. Game device 1 is maintained in the opened state when used by the user and it is maintained in the closed state when not used.

In addition, in game device 1, an angle between upper housing 2 and lower housing 3 can also be maintained at any angle between a position in the closed state and a position in the opened state (approximately 0° to approximately 180°). In other words, upper housing 2 can rest at any angle with respect to lower housing 3. For resting of these housings, friction force or the like generated in a coupling portion between upper housing 2 and lower housing 3 is used. In addition to or instead of friction force, a latch mechanism may be adopted in the coupling portion between upper housing 2 and lower housing 3.

An upper LCD 110 is provided in upper housing 2 as the display (display means) capable of providing stereoscopic display. Upper LCD 110 has a rectangular shape and it is arranged such that a direction in which its long side extends coincides with a direction in which a long side of upper housing 2 extends. In game device 1 according to the present embodiment, upper LCD 110 greater in screen size than a lower LCD 120 is adopted so that the user can further enjoy stereoscopic display. It is noted, however, that the screen size does not necessarily have to be different as such, and a screen size can be designed as appropriate, depending on usage of an application, a size of game device 1, or the like. A detailed configuration of upper LCD 110 will be described later.

An image pick-up device (image pick-up means) for picking up an image of some subject is provided in upper housing 2. More specifically, a pair of outer cameras 131L, 131R (see FIG. 2A) and an inner camera 133 (see FIG. 1) are provided in upper housing 2. Here, inner camera 133 is arranged above upper LCD 110, while the pair of outer cameras 131L and 131R is arranged in a surface opposite to an inner main surface where inner camera 133 is arranged, that is, in an outer main surface of upper housing 2 (corresponding to a surface on the outside when game device 1 is in the closed state).

Based on such positional relation, the pair of outer cameras 131L and 131R can pick up an image of a subject present in a direction in which the outer main surface of upper housing 2 faces, while inner camera 133 can pick up an image of a subject present in a direction opposite to the direction of image pick-up by outer cameras 131L and 131R, that is, in a direction in which the inner main surface of upper housing 2 faces.

The pair of outer cameras 131L and 131R is arranged at a prescribed distance from each other, and data of a pair of images obtained by these outer cameras 131L and 131R (hereinafter also referred to as an "input image") is used for reproduction of the subject in stereoscopic display. Namely, outer cameras 131L and 131R function as what is called stereo cameras. Prescribed parallax in accordance with relative positional relation between outer camera 131L and outer camera 131R is present between the pair of input images obtained as a result of image pick-up by outer cameras 131L and 131R.

As will be described later, respective ranges (partial images) determined by a user's operation in the pair of input images obtained as a result of image pick-up by outer cameras 131L and 131R may be used for stereoscopic display. Namely, a range used for stereoscopic display of the pair of input images may be changed as appropriate by a user's operation.

Meanwhile, an input image obtained as a result of image pick-up by inner camera 133 is basically used for non-stereoscopic display (two-dimensional display, normal display). Therefore, in game device 1 according to the present embodiment, a pair of input images for stereoscopic display can be obtained by activating outer cameras 131L and 131R, and an input image for non-stereoscopic display can be obtained by activating inner camera 133.

In addition, in upper housing 2, stereoscopic vision volume 145 is provided on the right of upper LCD 110. This stereoscopic vision volume 145 is used for adjusting stereoscopic display on upper LCD 110.

It is noted that switching between outer cameras 131L and 131R and inner camera 133, that is, switching between stereoscopic display and normal display, can also be selected by the user on a program executed on game device 1. Here, stereoscopic vision volume 145 may be used for switching between stereoscopic display and normal display.

A speaker (a speaker 151 shown in FIG. 4) serving as an audio generation device (audio generation means) is accommodated in upper housing 2. More specifically, sound emission holes 151L and 151R are arranged on respective left and right sides of upper LCD 110 arranged in a central portion of the inner main surface of upper housing 2. Voice and sound generated from speaker 151 is emitted toward the user through sound emission holes 151L and 151R communicating with speaker 151.

Meanwhile, lower LCD (Liquid Crystal Display) 120 is provided as a display portion (display means) in lower housing 3. Lower LCD 120 has a rectangular shape and it is arranged such that a direction in which its long side extends coincides with a direction in which a long side of lower housing 3 extends.

Though a display capable of providing stereoscopic display as will be described later may be adopted as lower LCD 120, in the present embodiment, a common display for providing non-stereoscopic display of various types of information or the like is adopted. Therefore, for example, a display of other appropriate types such as a display utilizing EL (Electro Luminescence) may be adopted as lower LCD 120. In addition, resolution of the display portion (display means) is appropriately designed, depending on an application or the like to be executed.

In lower housing 3, a control pad 154, a cross-shaped button 161, and button groups 142, 162 are provided as input portions (input devices) for accepting an operation from a user or the like. These input portions are provided on a main surface of lower housing 3 located on the inner side when upper housing 2 and lower housing 3 are folded. In particular, control pad 154 and cross-shaped button 161 are arranged at such positions as being readily operated with the user's left hand when he/she holds game device 1, and button group 162 is arranged at such a position as being readily operated with the user's right hand when he/she holds game device 1.

Control pad 154 mainly accepts an operation for adjusting stereoscopic display on game device 1 (details of which will be described later). In particular, control pad 154 represents one example of an analog device capable of accepting input having at least two degrees of freedom. More specifically, control pad 154 has a projection accepting a user's operation and it is structured to be able to change relative positional relation with respect to lower housing 3 at least in a vertical direction of the sheet surface and a horizontal direction of the sheet surface. In addition, control pad 154 outputs a two-dimensional analog value in accordance with a direction of displacement and an amount of displacement from a prescribed reference position. Typically, control pad 154 includes two potentiometers brought in correspondence with two axes respectively, and each potentiometer outputs an analog value (typically, a voltage or a current) having a value in accordance with an amount of operation and a direction of operation by the user. A two-dimensional value obtained by combining values output from these two potentiometers is handled as an "operation input" which will be described later.

Therefore, as the user varies control pad 154 to a larger extent from the reference position (typically, a direction perpendicular to lower housing 3), control pad 154 outputs a greater analog value.

It is noted that an analog stick, a joystick or the like may be adopted, instead of control pad 154 shown in FIG. 1.

Cross-shaped button 161 is an input portion capable of independently operating two directions, and outputs a two-dimensional value having values in accordance with a user's button operation in respective directions. This two-dimensional value is also handled as an "operation input" which will be described later. It is noted that, unlike control pad 154 described above, a two-dimensional value generated by this cross-shaped button 161 is a digital value indicating "ON" or "OFF" separately for each direction. More specifically, cross-shaped button 161 permits displacement in the vertical direction of the sheet surface and the horizontal direction of the sheet surface by the user, and outputs "ON" or "OFF" in correspondence with the direction of displacement.

Button group 162 includes four operation buttons 162A, 162B, 162X, and 162Y brought in correspondence with the vertical and horizontal directions of the sheet surface. Namely, button group 162 also corresponds to an input portion capable of independently operate two directions, and outputs a value indicating a state of operation as a result of a user's operation of operation button 162A, 162B, 162X, 162Y arranged in correspondence with each direction. This value indicating a state of operation is also detected as an "operation input" which will be described later.

The operation input output from cross-shaped button 161 and/or button group 162 may be used for adjustment of stereoscopic display in game device 1 (details of which will be described later). Alternatively, in various applications executed on game device 1, these operation inputs are used for such operations as select, enter and cancel involved with game processing.

Button group 142 includes a select button 142a, a HOME button 142b, a start button 142c, and a power button 142d. Select button 142a is typically used for selecting an application to be executed on game device 1. HOME button 142b is typically used for setting a menu application or various applications executed on game device 1 to an initial state. Start button 142c is typically used for starting execution of an application on game device 1. Power button 142d is used for turning ON/OFF power of game device 1.

A microphone (a microphone 153 shown in FIG. 4) serving as an audio obtaining device (audio obtaining means) is accommodated in lower housing 3. On the main surface of lower housing 3, a microphone hole 153a for microphone 153 to obtain sound around game device 1 is provided. It is noted that a position where microphone 153 is accommodated and a position of microphone hole 153a communicating with microphone 153 are not limited to those in the main surface of lower housing 3. For example, microphone 153 may be accommodated in hinge 4 and microphone hole 153a may be provided in the surface of hinge 4 at a position corresponding to a position where microphone 153 is accommodated.

In game device 1, in addition to control pad 154, cross-shaped button 161, and button groups 142, 162, a touch panel 122 is further provided as a pointing device serving as another input portion (input means). Touch panel 122 is attached to cover a screen of lower LCD 120, and when the user performs an input operation (a pointing operation), touch panel 122 detects a value of a corresponding two-dimensional coordinate. Namely, touch panel 122 represents one example of a pointing device brought in correspondence with a two-dimensional coordinate including a first axial direction (a vertical direction of the screen) and a second axial direction (a horizontal direction of the screen) as coordinate axes, and it outputs an operation input in accordance with a coordinate value in the two-dimensional coordinate corresponding to a position pointed on touch panel 122 (pointing device).

Typically, resistive touch panel 122 can be adopted. It is noted, however, that touch panel 122 is not limited to the resistive type and various pressing-type touch panels may also be adopted. In addition, touch panel 122 preferably has resolution (detection accuracy) as high as that of lower LCD 120 (display accuracy). It is noted that the resolution of touch panel 122 does not necessarily have to exactly be equal to the resolution of lower LCD 120.

A pointing operation onto touch panel 122 is normally performed by the user with the use of a stylus pen 177, however, instead of stylus pen 177, the pointing operation (input operation) can also be performed with a user's own finger or the like. As shown in FIGS. 1 and 3B, an accommodation portion 176 for stylus pen 177 is provided in the rear surface of lower housing 3. Namely, stylus pen 177 for an input operation onto touch panel 122 is normally stored in accommodation portion 176 and it is taken out by the user as necessary.

Though touch panel 122 is exemplified as the pointing device, instead thereof or in addition thereto, a mouse, a track ball, a pen tablet, or the like may be employed. In addition, a pointer device capable of indicating a coordinate remotely from the display surface of the display (typically, a controller or the like of Wii®) may be adopted.

As shown in FIGS. 2C, 2D, 3A, and 3B, an L button 162L is provided at a left end portion of the rear surface of lower housing 3, and an R button 162R is provided at a right end portion on the rear surface of lower housing 3. L button 162L and R button 162R are arranged at such positions as readily being operated with the user's left forefinger and right forefinger respectively when he/she holds game device 1. L button 162L and R button 162R are used for such an operation as select in various applications executed on game device 1.

As shown in FIG. 2C, sound volume 144 is provided on a left side surface of lower housing 3. Sound volume 144 is used for adjusting a volume of the speaker (speaker 151 shown in FIG. 4) mounted on game device 1.

As shown in FIG. 2D, a wireless switch 143 is provided on the right side surface of lower housing 3. Wireless switch 143 switches wireless communication (details of which will be described later) in game device 1 between an ON state (an active state) and an OFF state (an inactive state).

A game card 171 and/or a memory card 173 can be attached to game device 1.

Namely, as shown in FIG. 3B, a game card slot 170 for attaching game card 171 is provided in the rear surface of lower housing 3. In the rear of game card slot 170, an interface for electrical connection between game device 1 and game card 171 is provided. Game card slot 170 is configured such that game card 171 is removably attached. Game card 171 retains an application program, a game program (both of which include an instruction set), or the like.

In addition, as shown in FIG. 2C, a memory card slot 172 for attaching memory card 173 is provided in the left side surface of lower housing 3. In the rear of memory card slot 172, an interface for electrical connection between game device 1 and memory card 173 is provided. Memory card slot 172 is configured such that memory card 173 is removably attached. Memory card 173 is used for reading a program or image data obtained from another information processing device or game device, storage (saving) of data of an image picked up and/or processed by game device 1, or the like. Game card 171 is implemented by a non-volatile recording medium such as an SD (Secure Digital) card.

In game device 1, various displays for presenting an operation state or the like to the user are provided. More specifically, in lower housing 3 and upper housing 2, an indicator group 147 consisting of a plurality of LEDs (Light Emitting Diodes) is provided as a display (display means). Indicator group 147 includes a stereoscopic display indicator 147a, a notification indicator 147b, a wireless indicator 147c, a power supply indicator 147d, and a charge indicator 147e. Stereoscopic display indicator 147a is provided on the main surface of upper housing 2 and other indicators are provided on the main surface or on the side surface of lower housing 3.

Stereoscopic display indicator 147a notifies whether stereoscopic display is provided on upper LCD 110 or not. Typically, while stereoscopic display on upper LCD 110 is active, stereoscopic display indicator 147a illuminates.

Notification indicator 147b notifies whether information to be notified of the user is present or not. Typically, when an e-mail unread by the user is present or when some message is received from various servers, notification indicator 147b illuminates.

Wireless indicator 147c gives notification of a state of wireless communication in game device 1. Typically, when wireless communication is active, wireless indicator 147c illuminates.

Power supply indicator 147d gives notification of a power supply state in game device 1. Game device 1 contains a not-shown battery (typically, stored in lower housing 3), and it is mainly driven by electric power from this battery. Therefore, power supply indicator 147d gives notification of a state of power ON in game device 1 and/or a state of charge of the battery. Typically, while power of game device 1 is turned ON (in the ON state) and a state of charge of the battery is sufficiently high, power supply indicator 147d illuminates in green, and while power of game device 1 is turned ON (in the ON state) and a state of charge of the battery is low, it illuminates in red.

Charge indicator 147e gives notification of a state of charge of the battery described above. Typically, when a charge adapter (not shown) or the like is attached to game device 1 and the contained battery is being charged, charge indicator 147e illuminates. It is noted that the charge adapter is connected to a charge terminal 174 provided in the rear surface of game device 1, as shown in FIG. 3A.

In addition, game device 1 according to the present embodiment incorporates an infrared communication function, and an infrared port 179 is provided on the rear surface of game device 1. This infrared port 179 projects/receives infrared rays, which are carrier waves for data communication.

Moreover, in the front surface of game device 1, hooks 31, 32 for connection to a strap for suspending game device 1 are provided.

Further, on the front surface of lower housing 3, a connection terminal 158 for connecting a headphone and/or a microphone is provided.

D. Electrical Configuration of Device

Figure 4:
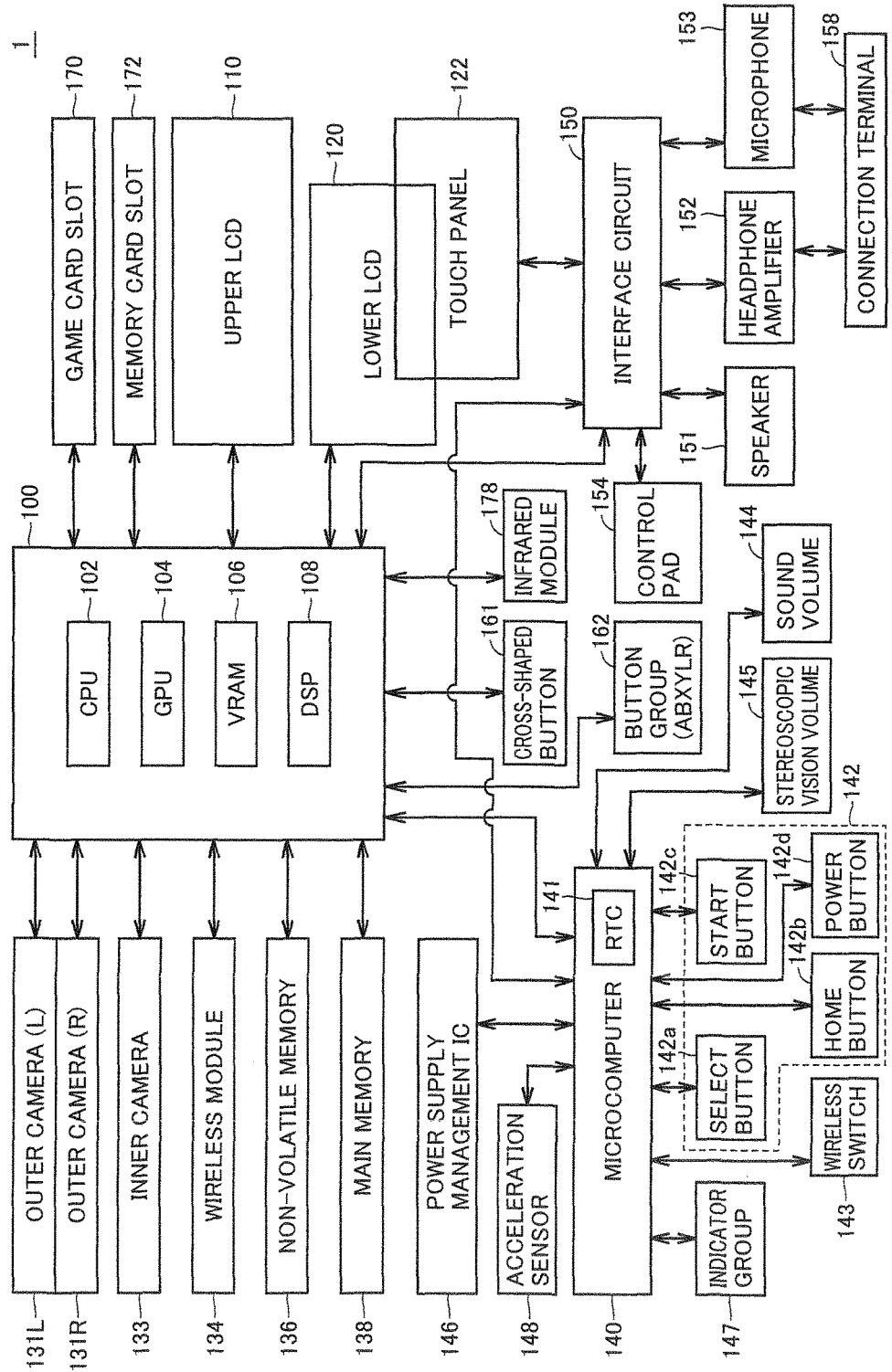
FIG. 4 is a block diagram showing an electrical configuration of the game device according to the embodiment of the present invention.

FIG. 4 is a block diagram showing an electrical configuration of game device 1 according to the embodiment of the present invention.

Referring to FIG. 4, game device 1 includes an operation processing unit 100, upper LCD 110, lower LCD 120, touch panel 122, outer cameras 131L, 131R, inner camera 133, a wireless module 134, a non-volatile memory 136, a main memory 138, a microcomputer 140, button group 142, sound volume 144, stereoscopic vision volume 145, a power supply management IC (Integrated Circuit) 146, indicator group 147, an acceleration sensor 148, an interface circuit 150, speaker 151, a headphone amplifier 152, microphone 153, control pad 154, connection terminal 158, cross-shaped button 161, button group 162, game card slot 170, memory card slot 172, and an infrared module 178. In addition, game device 1 includes a battery and a power supply circuit that are not shown.

Operation processing unit 100 is responsible for overall control of game device 1. Specifically, operation processing unit 100 realizes various types of processing including control of stereoscopic display on upper LCD 110 by executing firmware (an instruction set) stored in advance in non-volatile memory 136, a program (an instruction set) or data read from game card 171 attached to game card slot 170, a program (an instruction set) or data read from memory card 173 attached to memory card slot 172, or the like.

It is noted that, in addition to a case where a program (an instruction set) executed by operation processing unit 100 is provided through game card 171 or memory card 173, a program may be provided to game device 1 through an optical recording medium such as a CD-ROM or a DVD. Moreover, a program may be provided from a server device (not shown) connected through a network.

More specifically, operation processing unit 100 includes a CPU (Central Processing Unit) 102, a GPU (Graphical Processing Unit) 104, a VRAM (Video Random Access Memory) 106, and a DSP (Digital Signal Processor) 108. Processing in each unit will be described later. In addition, operation processing unit 100 exchanges data with each unit.

Each of outer cameras 131L, 131R and inner camera 133 is connected to operation processing unit 100, and outputs an input image obtained as a result of image pick-up to operation processing unit 100 in response to an instruction from operation processing unit 100. Each of these cameras includes image pick-up elements such as CCD (Charge Coupled Device) or CIS (CMOS Image Sensor) and a peripheral circuit for reading image data (input image) obtained by the image pick-up elements.

Wireless module 134 exchanges data with another game device 1 or some information processing device through a wireless signal. By way of example, wireless module 134 communicates data with another device under a wireless LAN scheme complying with such standards as IEEE802.11a/b/g/n.

Non-volatile memory 136 stores firmware or the like necessary for a basic operation of game device 1 and a code describing the firmware is developed on main memory 138. As CPU 102 of operation processing unit 100 executes the code developed on main memory 138, basic processing in game device 1 is realized. In addition, non-volatile memory 136 may store data on various parameters set in advance in game device 1 (pre-set data). By way of example, non-volatile memory 136 is implemented by a flash memory.

Main memory 138 is used as a work area or a buffer area for operation processing unit 100 to perform processing. Namely, main memory 138 temporarily stores a program (a code) or data necessary for processing by operation processing unit 100. By way of example, main memory 138 is implemented by a PSRAM (Pseudo-SRAM).

Microcomputer 140 mainly provides processing involved with a user interface. More specifically, microcomputer 140 is connected to operation processing unit 100 as well as to button group 142, sound volume 144, stereoscopic vision volume 145, power supply management IC 146, indicator group 147, and acceleration sensor 148. Microcomputer 140 senses a user's button operation or the like, outputs the result of sensing to operation processing unit 100, and causes an indicator for notifying the user of various types of information to illuminate, in response to a signal from operation processing unit 100.

In addition, microcomputer 140 has a real time counter (RTC: Real Time Clock) 141. Real time counter 141 is a part providing a time-counting function, and counts time in a predetermined cycle. The result of counting is successively output to operation processing unit 100. Operation processing unit 100 can also calculate the current time (date) or the like based on a count value counted by real time counter 141.

Power supply management IC 146 supplies electric power from a power supply (typically, the battery described above) mounted on game device 1 to each unit and controls an amount of supply thereof.

Acceleration sensor 148 detects displacement of game device 1 and the result of detection is output to operation processing unit 100 through microcomputer 140. The result of detection by acceleration sensor 148 is utilized in a program (a game application) executed on game device 1.

Infrared module 178 establishes wireless communication (infrared communication) with another game device 1. Wireless communication established by this infrared module 178 is narrower in coverage than wireless communication through wireless module 134. Namely, infrared module 178 is designed to exchange data with game device 1 of the same type, in accordance with a predetermined communication protocol. It is noted that infrared rays which are carrier waves for infrared communication are projected/received through infrared port 179 (see FIG. 3B).

Interface circuit 150 is connected to operation processing unit 100 as well as to speaker 151, headphone amplifier 152, microphone 153, control pad 154, and touch panel 122. More specifically, interface circuit 150 includes an audio control circuit (not shown) for controlling speaker 151, headphone amplifier 152 and microphone 153 and a touch panel control circuit (not shown) for controlling touch panel 122.

Speaker 151 amplifies an audio signal from interface circuit 150 to output voice and sound through sound emission holes 151L and 151R. Headphone amplifier 152 amplifies an audio signal from interface circuit 150 to output voice and sound from a connected headphone. Microphone 153 senses user's voice or the like uttered toward game device 1 to output an audio signal indicating sensed voice to interface circuit 150.

As described above, the audio control circuit constituting interface circuit 150 carries out A/D (analog/digital) conversion of an analog audio signal sensed by microphone 153 to output the resultant digital audio signal to operation processing unit 100, and carries out D/A (digital/analog) conversion of a digital audio signal generated by operation processing unit 100 or the like to output the resultant analog audio signal to speaker 151 and/or a connected headphone.

In addition, the touch panel control circuit constituting interface circuit 150 generates touch position data indicating a position where the user performed an input operation (a pointing operation) in response to a detection signal from touch panel 122 and outputs the data to operation processing unit 100. Namely, touch panel 122 outputs an operation input (touch position data) in accordance with a coordinate value in the two-dimensional coordinate corresponding to the position pointed on a touch surface.

Game card slot 170 and memory card slot 172 are each connected to operation processing unit 100. Game card slot 170 reads and writes data from and into attached game card 171 through a connector in response to a command from operation processing unit 100. Memory card slot 172 reads and writes data from and into attached memory card 173 through a connector in response to a command from operation processing unit 100.

Lower LCD 120 and upper LCD 110 each display an image in response to a command from operation processing unit 100. In a typical manner of use of game device 1, an image for accepting various operations is displayed on lower LCD 120 and stereoscopic display is provided on upper LCD 110.

E. Configuration of Display Portion

Figure 5:
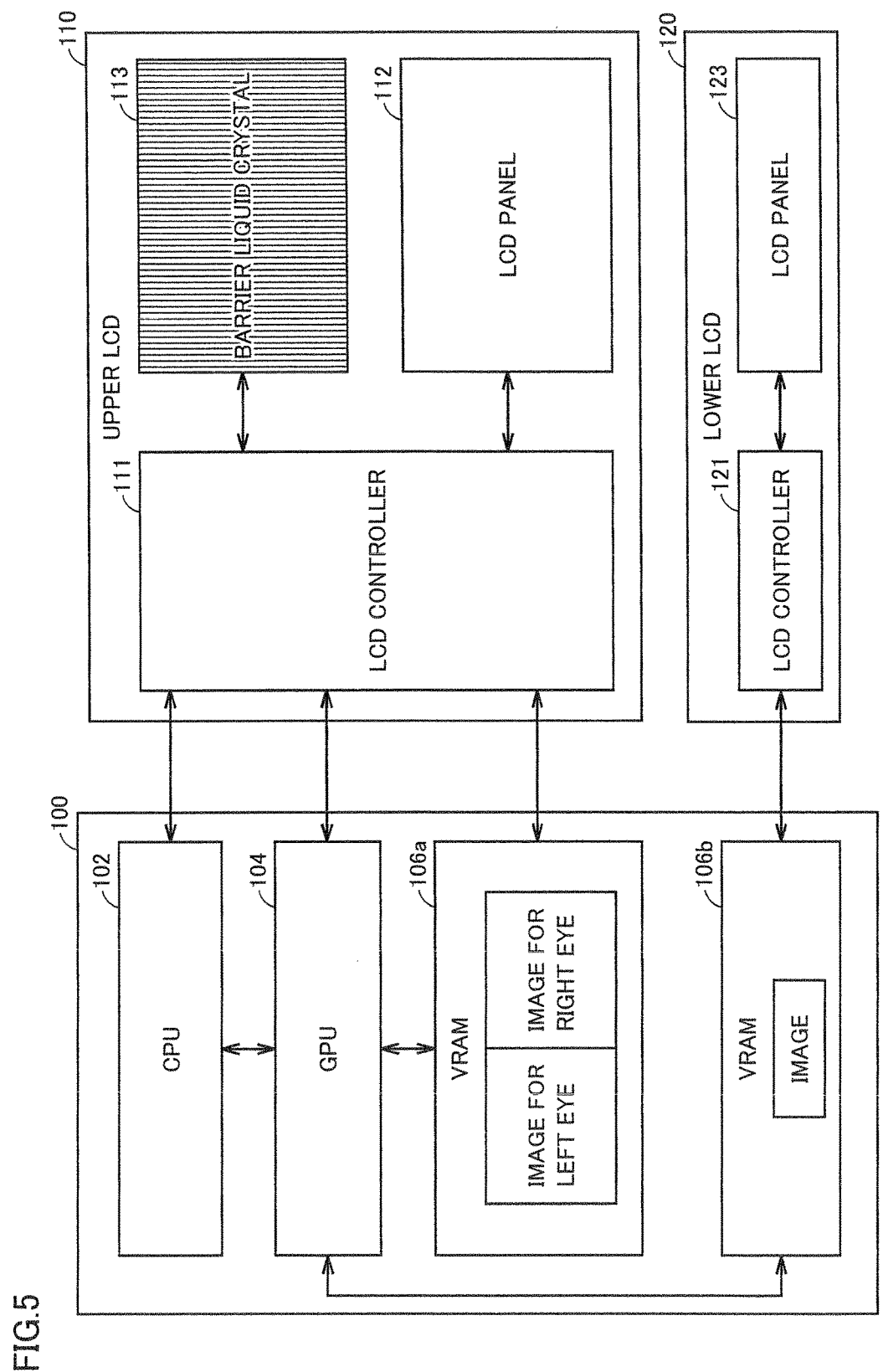
FIG. 5 is a block diagram showing an electrical configuration for implementing display control in the game device according to the embodiment of the present invention.

FIG. 5 is a block diagram showing an electrical configuration for implementing display control in game device 1 according to the embodiment of the present invention. FIG. 6 is a schematic cross-sectional view of upper LCD 110 shown in FIG. 5.

Referring to FIG. 5, operation processing unit 100 includes GPU 104 for mainly performing processing for displaying images on upper LCD 110 and lower LCD 120 respectively (image processing), in addition to CPU 102. GPU 104 has a processing circuit specialized for image processing and successively generates images to be displayed on upper LCD 110 and lower LCD 120 respectively in response to a command from CPU 102. These images are transferred to a VRAM 106a for upper LCD 110 and a VRAM 106b for lower LCD 120 respectively.

Here, a pair of images (an image for left eye and an image for right eye) for stereoscopic display on upper LCD 110 is written in VRAM 106a independently of each other. In contrast, since normal display (non-stereoscopic display) is provided on lower LCD 120, a single image is written in VRAM 106b.

Upper LCD 110 includes an LCD controller 111, an LCD panel 112, and a barrier liquid crystal 113. In contrast, lower LCD 120 includes an LCD controller 121 and an LCD panel 123.

A structure of upper LCD 110 is further described.

FIG. 6 shows a structure of a parallax barrier type liquid crystal display device as a typical example of upper LCD 110. Upper LCD 110 includes LCD panel 112 arranged between a glass substrate 118 and a glass substrate 119.

LCD panel 112 includes a left eye pixel group 112L and a right eye pixel group 112R. A not-shown backlight is provided on a side of glass substrate 118 opposite to glass substrate 119 and light from this backlight is emitted toward left eye pixel group 112L and right eye pixel group 112R. Left eye pixel group 112L and right eye pixel group 112R function as a spatial light modulator for adjusting light from the backlight. Here, each pixel in left eye pixel group 112L and each pixel in right eye pixel group 112R are alternately arranged.

Barrier liquid crystal 113 representing a parallax optical system is provided on a side opposite to the side where glass substrate 118 is in contact with left eye pixel group 112L and right eye pixel group 112R. In this barrier liquid crystal 113, a plurality of slits 114 are provided in rows and columns at prescribed intervals. Left eye pixel group 112L and right eye pixel group 112R are arranged symmetrically to each other, with an axis passing through a central position of each slit 114 and perpendicular to a surface of glass substrate 118 serving as the reference. By appropriately designing positional relation with the slit, of each set of left eye pixel group 112L and right eye pixel group 112R brought in correspondence with each slit, the user visually recognizes only left eye pixel group 112L with his/her left eye and visually recognizes only right eye pixel group 112R with his/her right eye.

Namely, each slit 114 in barrier liquid crystal 113 restricts a field of view of each of the user's right and left eyes to a corresponding angle. Consequently, only left eye pixel group 112L is present in a line of sight AXL of the user's left eye, while only right eye pixel group 112R is present in a line of sight AXR of the user's right eye.

Here, by causing left eye pixel group 112L and right eye pixel group 112R to display a pair of images having prescribed parallax, an image having prescribed parallax can be presented to the user. By displaying such a pair of images having prescribed parallax, the user feels as if he/she stereoscopically viewed a subject. Hereinafter, a surface of barrier liquid crystal 113 on the user side, that is, a surface on which this image is actually displayed, is also referred to as a display surface (of upper LCD 110).

More specifically, as shown in FIG. 5, GPU 104 successively writes an image for left eye and an image for right eye, by designating an address in VRAM 106a. LCD controller 111 successively reads image data in each column from the address of interest in VRAM 106a such that images in the direction of column constituting the image for left eye and the image for right eye written in VRAM 106a are alternately displayed in alignment on LCD panel 112, and drives LCD panel 112.

It is noted that upper LCD 110 can also provide normal display, that is, non-stereoscopic display, of an image. In this case, a method of inactivating barrier liquid crystal 113 and a method of setting parallax between the image for left eye and the image for right eye used for display to substantially zero, by providing a command to LCD controller 111, are available.

In the case of the former method, since a plurality of slits 114 provided in barrier liquid crystal 113 are inactivated, light from left eye pixel group 112L and right eye pixel group 112R is substantially incident on the user's left and right eyes. In this case, resolution for the user is substantially twice as high as resolution in stereoscopic display.

In the case of the latter method, since the image visually recognized by the user's left eye and the image visually recognized by the user's right eye are substantially equally controlled, the user visually recognizes the same image with his/her left and right eyes.

Meanwhile, non-stereoscopic display is provided on lower LCD 120. Namely, GPU 104 successively writes an image to be displayed, by designating an address in VRAM 106b, and LCD controller 121 successively reads images written in VRAM 106b and drives LCD panel 123.

Though a parallax barrier type display device has been exemplified in FIG. 6 by way of a typical example of a display capable of providing stereoscopic display, for example, a lenticular type display device or the like may also be adopted. According to such a type, a display area for an image for left eye and a display area for an image for right eye are arranged in a certain pattern (typically, alternately).

Alternatively, a configuration of a display capable of providing stereoscopic display may be such that two images different in main wavelength component are independently displayed and stereoscopic display is provided by having the user wear glasses incorporating two respective color filters different in transmitted wavelength range.

Similarly, a configuration may be such that two images are displayed with directions of polarization being differed and stereoscopic display is provided by having the user wear glasses incorporating two respective polarizing filters corresponding to the two directions of polarization.

In addition, such a form that an image for left eye and an image for right eye are alternately displayed with a display area for the image for left eye and a display area for the image for right eye being common may be adopted, as in the method of utilizing shutter glasses (time-division type).

F. Stereoscopic Display

Initially, processing for providing stereoscopic display on upper LCD 110 of game device 1 according to the present embodiment will be described.

Figures 7A, 7B:
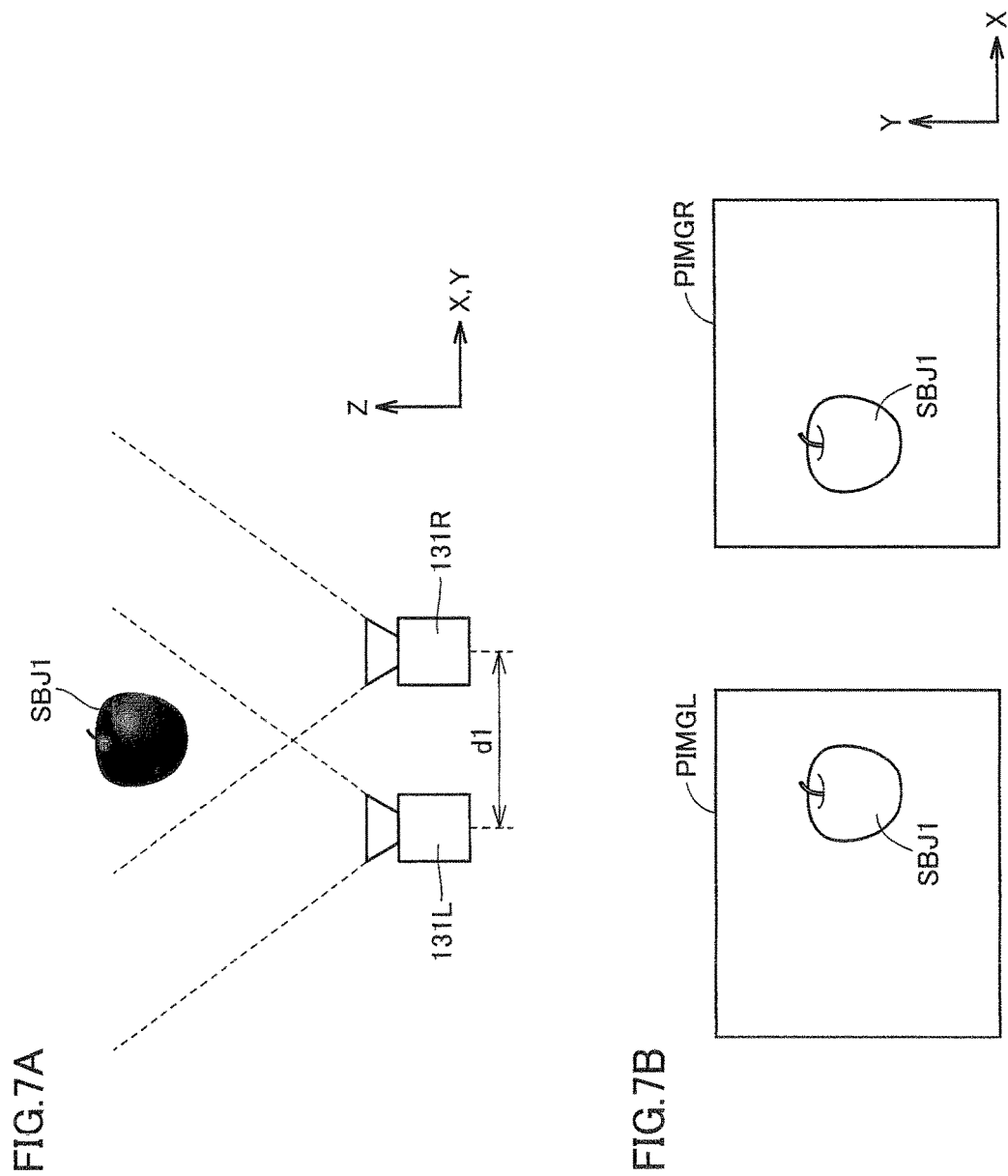
FIGS. 7A and 7B are diagrams for illustrating one example of a method of generating a pair of images having parallax used in stereoscopic display in the game device according to the embodiment of the present invention.

FIGS. 7A and 7B are diagrams for illustrating one example of a method of generating a pair of images having parallax used in stereoscopic display in the game device according to the embodiment of the present invention.

FIGS. 8A and 8B are diagrams for illustrating a method of providing stereoscopic display using the pair of images having parallax generated with the method shown in FIGS. 7A and 7B.

FIG. 7A shows a case where an "apple" is present as a subject SBJ1 at a prescribed distance from game device 1 and an image of this "apple" is picked up (stereo image pick-up) using the pair of outer cameras 131L, 131R mounted on upper housing 2.

In the description below, it is assumed that the pair of outer cameras 131L and 131R is arranged in alignment in a horizontal direction. Here, a horizontal direction is referred to as an X direction, a vertical direction is referred to as a Y direction, and a camera direction of each outer camera 131L, 131R (a direction of an optical axis of image pick-up) is referred to as a Z direction (to be understood similarly hereinafter).

In addition, a pair of images providing stereoscopic vision (stereo images consisting of an image for left eye and an image for right eye) is displayed in substantially the same display region. Namely, according to the lenticular type as shown in FIG. 6, a pixel for left eye and a pixel for right eye are alternately arranged so that the image for left eye and the image for right eye of interest are spatially alternately displayed in a lateral direction of the screen. Alternatively, according to shutter glasses (time-division type), an image for left eye and an image for right eye of interest are temporally alternately displayed as the same display surface is temporally divided.

Therefore, a region in a stereoscopic image where parallax is zero looks like being present on the display surface when viewed from the user. Namely, by setting parallax of a target region to zero, the user feels that an object included in that region is located on or around the display surface of the display.

FIG. 7B shows one example of a pair of images (stereo images) obtained as a result of image pick-up in positional relation as shown in FIG. 7A. Namely, as outer camera 131L picks up an image of subject SBJ1, an input image PIMGL for left eye is generated, and as outer camera 131R picks up an image of subject SBJ1, an input image PIMGR for right eye is generated.

Comparing input image PIMGL for left eye and input image PIMGR for right eye with each other, it can be seen that a position of a subject image representing subject SBJ1 within input image PIMGL is different from a position of a subject image representing subject SBJ1 within input image PIMGR. Namely, in input image PIMGL, the position of the subject image representing subject SBJ1 is located relatively on the right side, while in input image PIMGR, the position of the subject image representing subject SBJ1 is located relatively on the left side.

By displaying the pair of images (stereo images) thus obtained and having parallax on the display surface of upper LCD 110, the user can stereoscopically visually recognize subject SBJ1 of the "apple".

It is noted that a pair of images generated as a result of image pick-up by outer cameras 131L and 131R can be displayed on the display surface of upper LCD 110 in a manner superimposed on each other or relative positional relation between these images can be changed. Namely, when input image PIMGL and input image PIMGR are displayed on the display surface of upper LCD 110 in a manner superimposed on each other, an amount of parallax in accordance with positional relation between outer cameras 131L and 131R and subject SBJ1 at the time of image pick-up is produced. In addition, by changing a relative display position between input image PIMGL and input image PIMGR on the display surface of upper LCD 110, an amount of parallax regarding subject SBJ1 can be adjusted. Such adjustment of the amount of parallax will vary stereoscopic effect (a projecting amount (an amount of pop-up)/an amount of recess) visually recognized by the user.

Namely, as shown in FIG. 8A, when relative positional relation between input image PIMGL and input image PIMGR is changed in a direction to increase an amount of parallax regarding subject SBJ1, the user feels that subject SBJ1 is present closer toward the user side, relative to the display surface of upper LCD 110. So to speak, the user visually recognizes the subject image of subject SBJ1 as if it "projected" or "popped up" from the display surface.

In contrast, when relative positional relation between input image PIMGL and input image PIMGR is changed in a direction to decrease an amount of parallax regarding subject SBJ1, the user feels that subject SBJ1 is present at a position closer toward the display surface of upper LCD 110. So to speak, the user visually recognizes the subject image of subject SBJ1 as if it were "recessed" in the display surface.

Thus, by changing relative display position between input image PIMGL and input image PIMGR on the display surface of upper LCD 110, a position of subject SBJ1 (a position on a line from the user to the display surface) stereoscopically visually recognized by the user can be adjusted. Here, by displaying the entirety or a part of input images PIMGL and PIMGR having parallax on the display surface of upper LCD 110, stereoscopic display is provided.

As will be described later, in game device 1 according to the present embodiment, parallax of (a) a pair of images (stereo images) obtained as a result of actual image pick-up of a subject by outer cameras 131L and 131R (stereo cameras), (b) a pair of images (stereo images) obtained as a result of image pick-up (rendering) of an object defined in advance by using such a technique as computer graphics, with the use of a virtual camera, and (c) a pair of images (stereo images) having prescribed parallax obtained in advance with some method can be adjusted as described above. It is noted that various methods are applicable as processing for "adjusting parallax" in accordance with each method of obtaining an image, which will be described later in detail.

G. Zoom Processing

A zoom (or an image zoom) function provided by game device 1 according to the present embodiment will now be described.

Figure 10A:
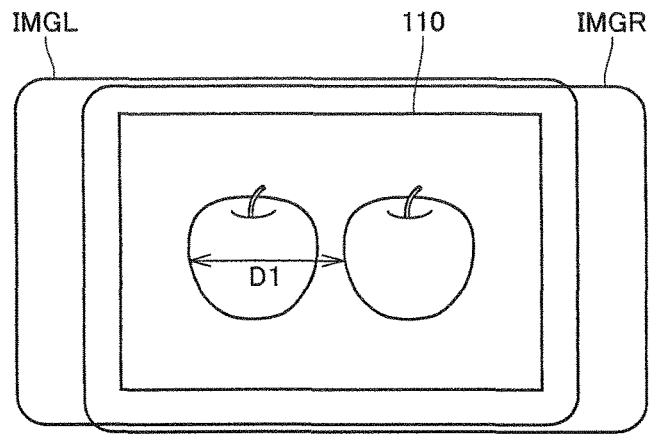
FIGS. 10A to 10C are diagrams for illustrating variation in an amount of parallax produced in accordance with zoom processing shown in FIGS. 9A and 9B.
Figure 10B:
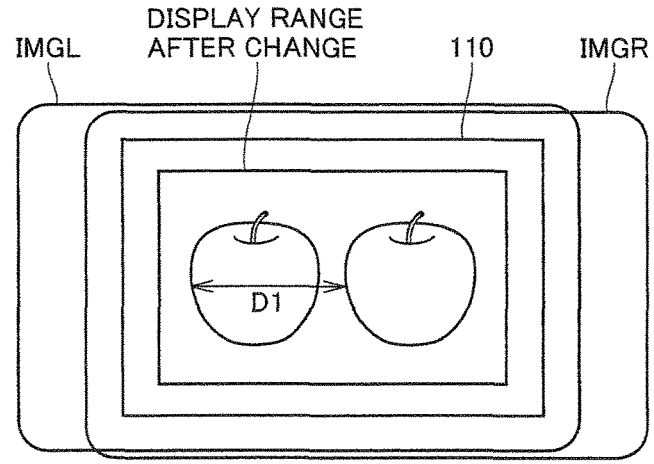
Figure 10C:
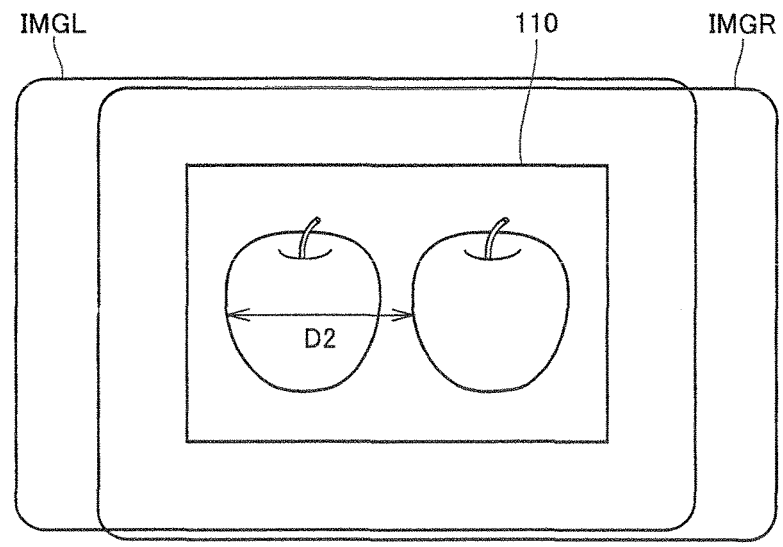

FIGS. 9A and 9B are diagrams for illustrating a zoom function in the game device according to the embodiment of the present invention. FIGS. 10A to 10C are diagrams for illustrating variation in an amount of parallax produced in accordance with zoom processing shown in FIGS. 9A and 9B.

As described above, the "zoom processing" herein means variation in contents of an image expressed on the display surface of the display, however, in the description below, processing similar to what is called digital zoom will be described by way of a typical processing example of scale-up display. In actual image pick-up, what is called optical zoom may be utilized.

As shown in FIG. 9A, a pair of input images (stereo images) PIMGL and PIMGR having parallax will be considered. It is assumed that, out of these input images PIMGL and PIMGR, for display on the display surface of upper LCD 110, display images IMGL and IMGR that are ranges in the inside thereof are used. As described above, however, a relative display position between images may be changed in order to adjust parallax, and therefore display images IMGL and IMGR are each preferably set to a size greater than a size of the display surface of upper LCD 110.

Then, it is assumed that the user indicated scale-up display (zoom-in processing) of these images. Then, as shown in FIG. 9B, ranges of display images IMGL and IMGR are changed such that regions to be used for display are narrowed. It is assumed that display images IMGL and IMGR had been set for input images PIMGL and PIMGR in the original state, whereas they were changed to display images IMGL# and IMGR#.

As change to display images IMGL# and IMGR# as shown in FIG. 9B is made, a size of an object image focused on within the image becomes relatively greater. Consequently, the image focused on is displayed in a scaled-up manner.

It is noted that, in scale-down display (zoom-out processing), the size of the display image is changed to become greater.

Variation in an amount of parallax in such zoom processing will now be described with reference to FIGS. 10A to 10C.

FIG. 10A shows a state that display image IMGL and display image IMGR shown in FIG. 9A are displayed on the display surface of upper LCD 110, in a manner displaced from each other by a prescribed relative distance. Here, it is assumed that difference in display position (that is, an amount of parallax) between an object image representing an "apple" within display image IMGL and an object image representing an "apple" within display image IMGR is D1.

Then, when scale-up display as shown in FIG. 9B is carried out, a display range with respect to the display surface of upper LCD 110 becomes smaller as shown in FIG. 10B. Namely, as shown in FIG. 10C, the object image representing the "apple" within display image IMGL and the object image representing the "apple" within display image IMGR are displayed on the display surface of upper LCD 110, in a further scaled-up manner.

Consequently, an amount of parallax between the object images representing the "apple" within both images increases from D1 to D2. This parallax amount D2 is calculated by multiplying parallax amount D1 by a scale-up factor in accordance with a ratio between a size of display images IMGL, IMGR and a region size of display images IMGL#, IMGR#.

Consequently, the amount of parallax between the object images representing the "apple" on the display surface of upper LCD 110 increases as the scale-up display processing is performed in spite of absence of an instruction to adjust the amount of parallax. As a result, stereoscopic effect of this "apple" felt by the user (an amount of pop-up from the display surface/recess in the display surface) is varied.

A phenomenon similar to such fluctuation in the amount of parallax occurs also when scale-down display processing is performed.

In addition, a phenomenon as described above may occur also when a size of an image expressed on the display surface, a position of display of an image on the display surface, an observation point in generating an image to be expressed, or the like is changed.

As described above, as the amount of parallax of the object (region) on which the user focuses is varied, stereoscopic effect felt by the user is varied. Therefore, when the user focuses on some object within an image, an operation for adjusting parallax is preferably performed simultaneously with an operation for zoom processing. Game device 1 according to the present embodiment provides a user interface permitting an operation for zoom processing and an operation for adjustment of parallax to simultaneously be performed.

H. Implementation of Zoom Processing and Parallax Adjustment

As described above, processing in the zoom processing according to the present embodiment means variation in contents of an image expressed on the display surface of upper LCD 110. Various other methods for such processing for varying contents of an image are available, in addition to the method shown in FIGS. 9 and 10 above. In addition, regarding processing for adjustment of parallax according to the present embodiment as well, various other methods are available in addition to the method of changing relative positional relation between display images as shown in FIGS. 8A and 8B above.

Here, an implementation of zoom processing and adjustment of parallax will be described, for each method of obtaining a pair of images (stereo images) (source) used for stereoscopic display on the display.

FIGS. 11A to 11D are diagrams showing processing examples for zoom processing and for adjusting parallax according to the present embodiment. FIGS. 12A and 12B are diagrams for illustrating a phenomenon caused by change in a parallax base.

Figure 11A:
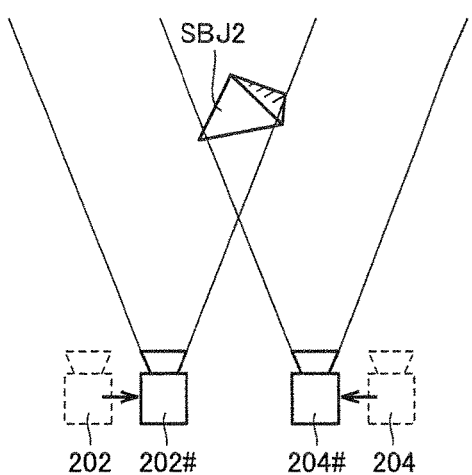
FIGS. 11A to 11D are diagrams showing processing examples of zoom processing and adjustment of parallax according to the present embodiment.
Figure 11B:
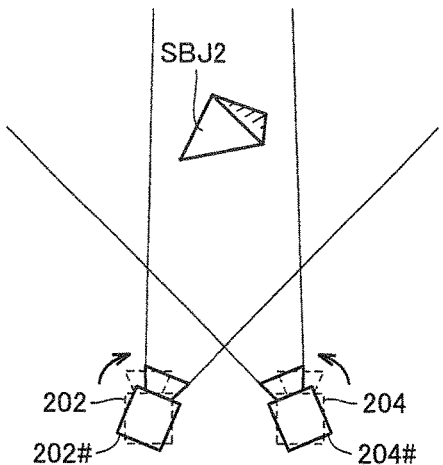
Figure 11C:
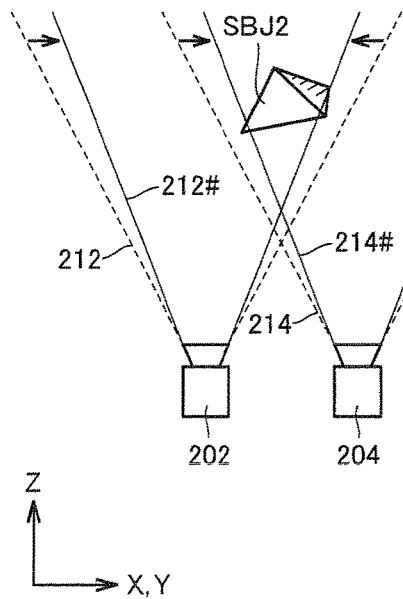
Figure 11D:
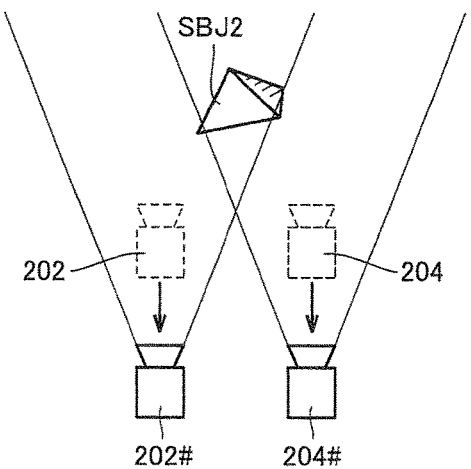

FIGS. 11A to 11D shows processing examples where an object is rendered with a virtual camera basically using such a technique as computer graphics. Namely, in each processing example shown in FIGS. 11A to 11D, it is assumed that a subject SBJ2 is arranged within a certain virtual space and a pair of virtual cameras 202 and 204 is arranged for this subject SBJ2. More specifically, FIG. 11A shows a processing example where a stereo base between the virtual cameras is changed, FIG. 11B shows a processing example where a camera angle of the virtual camera is changed, FIG. 11C shows a processing example where a field of view of the virtual camera is changed, and FIG. 11D shows a processing example where an arrangement position of the virtual camera is changed.

(h1. Change in Stereo Base Between Virtual Cameras)

In the example shown in FIG. 11A, zoom processing is performed with a distance in the X direction between the virtual cameras being changed. Namely, in the example shown in FIG. 11A, it is assumed that change to virtual cameras 202# and 204# is made by sliding current virtual cameras 202 and 204 in the X direction. As the positions of both virtual cameras are changed, a position or a size of subject SBJ2 in that field of view is changed and hence contents of generated stereo images are varied.

It is noted that a distance in the X direction in connection with a pair of virtual cameras is referred to as a "stereo base", and magnitude of parallax between the generated stereo images is varied depending on magnitude of this "stereo base". Consequently, magnitude of stereoscopic effect provided by stereoscopic display is also affected, which will be described more specifically with reference to FIGS. 12A and 12B.

As shown in FIG. 12A, a stereo base d11 between virtual camera 202 and virtual camera 204 is assumed. Magnitude of this stereo base d11 determines magnitude of parallax between generated stereo images. As parallax between the stereo images is greater, a range of stereoscopic visual recognition of a focused-on object by the user (a possible pop-up amount) can be increased.

Therefore, as shown in FIG. 12B, assuming a stereo base between virtual camera 202# and virtual camera 204# as d12 (<d11), a range of stereoscopic visual recognition of the focused-on object by the user (the possible pop-up amount) decreases.

When virtual camera 202# and virtual camera 204# are arranged at the same position, images generated as a result of image pick-up by respective virtual cameras match with each other and stereoscopic display cannot be provided.

By thus changing magnitude of the stereo base between the virtual cameras, zoom processing of subject SBJ2 is performed and a state of stereoscopic display is also varied. Namely, in a case shown in FIG. 11A, since a possible pop-up amount is varied, a pop-up position or the like visually recognized by the user may also be varied.

In other words, by changing the stereo base between the virtual cameras as shown in FIG. 11A zoom processing and adjustment of parallax can simultaneously be realized.

(h2. Change in Camera Angle of Virtual Camera)

In the example shown in FIG. 11B, zoom processing is performed with a camera angle of the virtual camera being changed. Namely, in the example shown in FIG. 11B, camera directions of virtual cameras 202 and 204 were previously in parallel to the Z direction, however, new camera directions of virtual cameras 202# and 204# are directed further inward.

With such change in a camera angle, a field of view of each virtual camera is also changed and hence contents of generated stereo images are varied.

(h3. Change in Field of View of Virtual Camera)

In the example shown in FIG. 11C, zoom processing is performed with a field of view of the virtual camera being changed. Namely, in the example shown in FIG. 11C, new fields of view 212# and 214# of respective virtual cameras 202 and 204 are narrower than previous fields of view 212 and 214 of respective virtual cameras 202 and 204.

Since a position or a size of subject SBJ2 present in each range is changed with such change in the field of view, contents of generated stereo images are varied.

(h4. Change in Arrangement Position of Virtual Camera)

In the example shown in FIG. 11D, zoom processing is performed with an arrangement position of the virtual camera being changed. Namely, in the example shown in FIG. 11D, previous arrangement positions of virtual cameras 202 and 204 were close to subject SBJ2, while new arrangement positions of virtual cameras 202# and 204# are distant from subject SBJ2.

Since the field of view of each virtual camera is also changed with such change in the arrangement position of the virtual camera, contents of generated stereo images are varied.

It is noted that a part of the processing shown in FIGS. 11A to 11D is also applicable to actual image pick-up using an actual camera.

J. Summary of Zoom Processing and Parallax Adjustment

As a method of obtaining a pair of images (stereo images) to be used for stereoscopic display on the display, (a) processing for actual image pick-up of a subject using outer cameras 131L and 131R (stereo cameras) (hereinafter also referred to as an "image pick-up mode"), (b) processing for virtual image pick-up (rendering) of an object defined in advance using a virtual camera with a technique such as computer graphics (CG) (hereinafter also referred to as a "CG mode"), and (c) processing for utilizing a pair of images (stereo images) having prescribed parallax obtained in advance with some method (hereinafter also referred to as a "viewing mode") are considered. Namely, game device 1 is assumed to have three modes of the "image pick-up mode," the "CG mode" and the "viewing mode". It is not necessary to mount all modes.

(j1. Image Pick-Up Mode)

Here, the following implementation methods are available as a method of realizing zoom processing:

(1) A method of utilizing digital zoom processing as shown in FIGS. 10A to 10C;

(2) A method of utilizing an optical zoom mechanism mounted on the outer camera (stereo camera); and (3) A method that the user holding game device 1 comes closer to a subject.

Here, the following implementation method is available as a method of realizing adjustment of parallax:

(1) A method of changing relative positional relation of display images as shown in FIGS. 8A and 8B.

(j2. CG Mode)

Here, the following implementation methods are available as a method of realizing zoom processing:

(1) A method of changing a stereo base between the virtual cameras as shown in FIG. 11A;

(2) A method of changing a camera angle of the virtual camera as shown in FIG. 11B;

(3) A method of changing a field of view of the virtual camera as shown in FIG. 11C;

(4) A method of changing an arrangement position of the virtual camera as shown in FIG. 11D; and (5) A method of further utilizing digital zoom processing for a generated image as shown in FIGS. 10A to 10C.

Here, the following implementation methods are available as a method of realizing adjustment of parallax:

(1) A method of changing relative positional relation between display images as shown in FIGS. 8A and 8B;

(2) A method of changing a stereo base between the virtual cameras as shown in FIG. 11A;

(3) A method of changing a camera angle of the virtual camera as shown in FIG. 11B;

(4) A method of changing a field of view of the virtual camera as shown in FIG. 11C; and (5) A method of changing an arrangement position of the virtual camera as shown in FIG. 11D.

(j3. Viewing Mode)

Here, the following implementation method is available as a method of realizing zoom processing:

(1) A method of utilizing digital zoom processing as shown in FIGS. 10A to 10C.

Here, the following implementation method is available as a method of realizing adjustment of parallax:

(1) A method of changing relative positional relation of display images as shown in FIGS. 8A and 8B.

K. User Interface

A user interface provided in game device 1 according to the present embodiment will now be described.

As described above, game device 1 according to the present embodiment provides at least such a user interface as permitting an operation for zoom processing and an operation for adjustment of parallax to simultaneously be performed. Game device 1 displays at least a two-dimensional coordinate system including a first coordinate axis for operating zoom processing and a second coordinate axis for adjusting parallax, by way of example of such a user interface.

Figure 13:
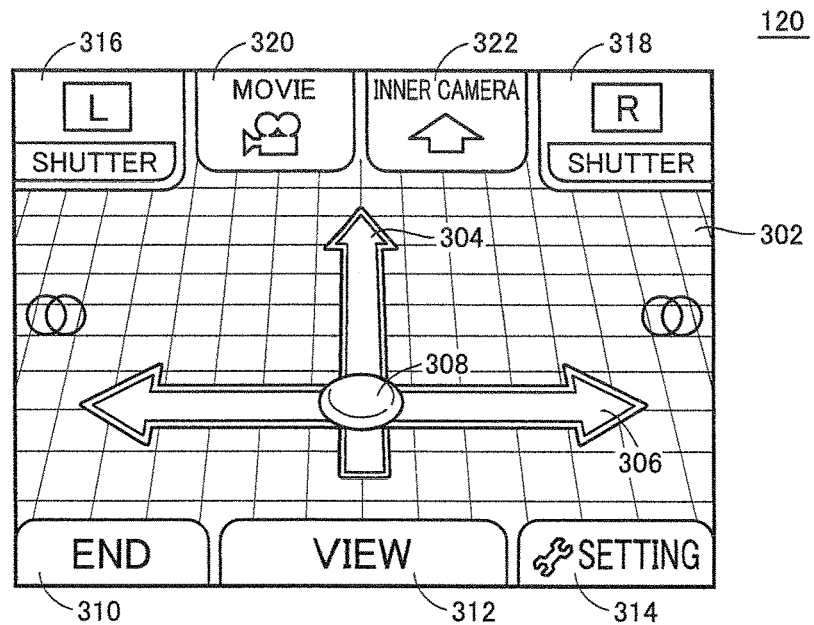
FIG. 13 shows one example of a user interface screen displayed on the game device according to the embodiment of the present invention.
Figure 14:
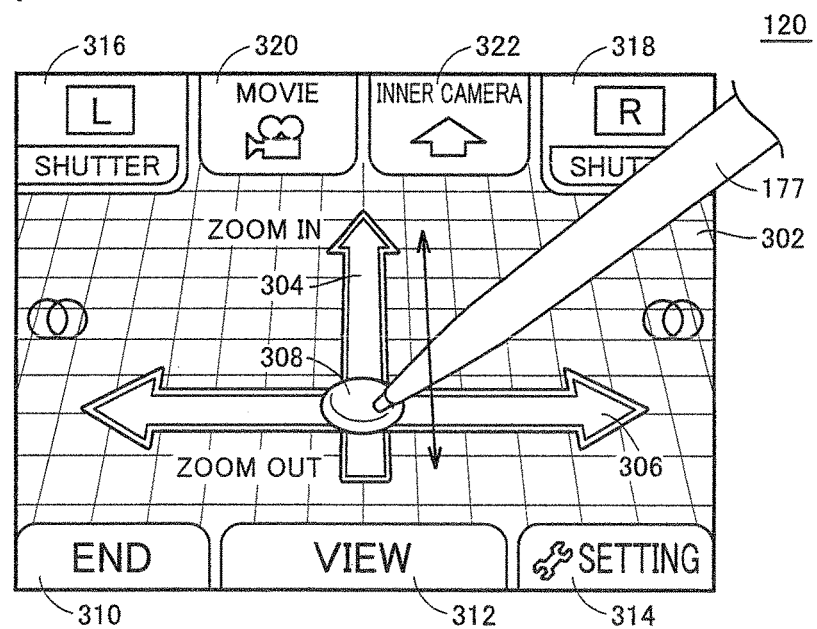
FIG. 14 is a diagram for illustrating an operation in a vertical direction of the screen in the user interface screen shown in FIG. 13.
Figure 15:
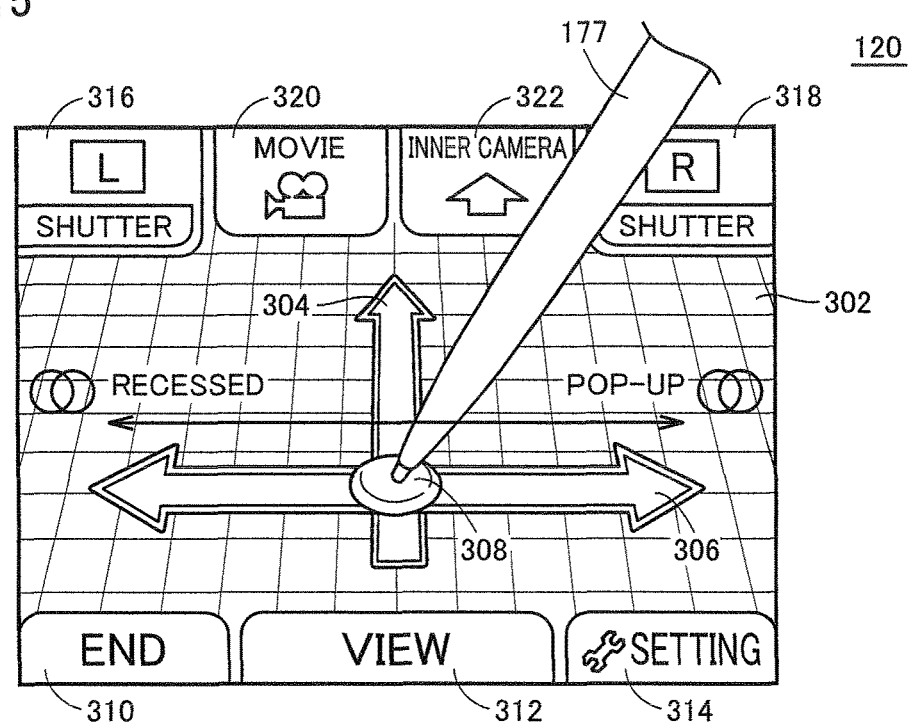
FIG. 15 is a diagram for illustrating an operation in a horizontal direction of the screen in the user interface screen shown in FIG. 13.

FIG. 13 shows one example of a user interface screen displayed on game device 1 according to the embodiment of the present invention. FIG. 14 is a diagram for illustrating an operation in a vertical direction of the screen in the user interface screen shown in FIG. 13. FIG. 15 is a diagram for illustrating an operation in a horizontal direction of the screen in the user interface screen shown in FIG. 13. Though FIGS. 13 to 15 mainly show screen examples used in the "image pick-up mode," the basic configuration is the same also in other "CG mode" and "viewing mode".

Referring to FIG. 13, in game device 1, lower LCD 120 displays a user interface screen for controlling stereoscopic display on upper LCD 110. Lower LCD 120 is provided with touch panel 122 serving as a pointing device. When the user points any position on touch panel 122, touch panel 122 outputs an operation input corresponding to that position. In response to this operation input, an operation for zoom processing and an operation for adjustment of parallax are performed.

On lower LCD 120 of game device 1, a coordinate system (a two-dimensional space) consisting of a coordinate system for expressing a state of zoom of an image for left eye and an image for right eye displayed on upper LCD 110 and a coordinate system for expressing a state of parallax of an image for left eye and an image for right eye displayed on upper LCD 110 is displayed. Then, a state value object indicating two state values is displayed at a two-dimensional coordinate position corresponding to the state of zoom and the state of parallax of the image for left eye and the image for right eye (stereoscopic images).

Namely, on lower LCD 120 serving as the display for non-stereoscopic display, the state of zoom of the image for left eye and the image for right eye displayed on upper LCD 110 and the state of parallax of the image for left eye and the image for right eye are displayed.

More specifically, on the user interface screen shown in FIG. 13, on a background image 302 showing a two-dimensional space, a first axis image 304 relating to an operation for zoom processing and a second axis image 306 relating to adjustment of parallax are displayed. In addition, at an intersection of first axis image 304 and second axis image 306, a marker image 308 is displayed. As the user performs an operation for zoom processing and adjustment of parallax, a position of display of marker image 308 is successively updated in response to these operations.

In accordance with a user's operation of such an input device as touch panel 122, control pad 154, cross-shaped button 161, or button group 162 (see FIG. 1), zoom is changed and parallax is adjusted. A user's operation of each input device and contents of processing performed in response to the operation will be described later.

On the user interface screen displayed on lower LCD 120, an operation relating to zoom processing and an operation relating to adjustment of parallax should only be performed independently of each other. Therefore, positional relation between first axis image 304 relating to the operation for zoom processing and second axis image 306 relating to adjustment of parallax is not limited that shown in FIG. 13. It is noted, however, in view of intuitiveness in the user's operation, that preferably the vertical direction of the screen of lower LCD 120 is brought in correspondence with the operation for zoom processing and the horizontal direction of the screen of lower LCD 120 is brought in correspondence with the operation for adjustment of parallax.

For example, as shown in FIG. 14, when the user uses stylus pen 177 or the like to operate marker image 308 in the vertical direction of lower LCD 120, the image displayed on upper LCD 110 (stereoscopic display) is scaled up (zoomed in) or scaled down (zoomed out). As marker image 308 moves upward in lower LCD 120, further scaled-up display is provided, and as marker image 308 moves downward in lower LCD 120, further scaled-down display is provided. It is noted that, in this zoom processing, the image for right eye and the image for left eye displayed on upper LCD 110 are both scaled up or down at the same scaling factor.

Alternatively, as shown in FIG. 15, when the user uses stylus pen 177 or the like to operate marker image 308 in the horizontal direction of the screen of lower LCD 120, a focused-on object that is stereoscopically visually recognized looks like popping up from the display surface of upper LCD 110 or looks like recessed in the display surface. As marker image 308 moves toward the right of lower LCD 120, the object looks like further popping up, and as marker image 308 moves toward the left of lower LCD 120, the object looks like further recessed in the display surface. Namely, as marker image 308 is operated in the horizontal direction of the screen, a degree of overlap between the image for right eye and the image for left eye displayed on upper LCD 110 (relative positional relation at the time of display) is changed. It is noted that a pop-up side and a recessed side may be interchanged.

As shown in FIGS. 14 and 15, other than an operation method using touch panel 122, a similar operation can be performed also by using control pad 154, cross-shaped button 161, button group 162, or the like.

In accordance with the state of zoom and the state of adjustment of parallax determined by the operation as above, the image for right eye and the image for left eye are displayed on upper LCD 110. Based on these image for right eye and image for left eye, the user can stereoscopically visually recognize a focused-on object included in these images.

The user interface screen used in the "image pick-up mode" shown in FIGS. 13 to 15 will be described. As shown in FIG. 15, on background image 302 showing the two-dimensional space, an image for accepting various operations or guiding an operation (hereinafter also referred to as an "operation image") is displayed. Namely, operation images 316, 318, 320, and 322 are arranged in the upper portion of the user interface screen shown in FIG. 15, and operation images 310, 312 and 314 are arranged in the bottom portion thereof.

Both of operation images 316 and 318 accept an operation relating to processing for saving an image obtained as a result of image pick-up by an image pick-up device (outer cameras 131L, 131R or inner camera 133). Namely, when the user points a region where operation images 316 and 318 are displayed, the entirety or a part of the image obtained by the image pick-up device is saved in a storage device (non-volatile memory 136, memory card 173 or the like). At the time of saving of the image, an image having a size in accordance with the state of zoom at that time point is saved in the storage device in association with information indicating the state of adjustment of parallax at that time point. Details of this saving processing will be described later.

It is noted that operation image 316 is brought in correspondence with L button 162L (see FIG. 3B or the like), and operation image 318 is brought in correspondence with R button 162R (see FIG. 3B or the like). When the user operates L button 162L or R button 162R as well, processing for saving an image is performed.

In addition, in the "image pick-up mode," an image obtained as a result of image pick-up by the image pick-up device (outer cameras 131L, 131R or inner camera 133) is successively displayed (real-time display) on upper LCD 110. Namely, upper LCD 110 functions as a "finder" in image pick-up using the image pick-up device. Thus, an image updated in real time on upper LCD 110 is also referred to as a "Live image". It is noted that this Live image may stereoscopically be displayed or non-stereoscopically be displayed.

Operation image 320 accepts selection of a type of an image to be saved. Game device 1 can save an image obtained by the image pick-up device as a still image or as a motion picture (so to speak, a form of continuously obtaining still images). FIGS. 13 to 15 show characters of "movie" indicating a motion picture and a corresponding picture as operation image 320. When the user points the region where operation image 320 is displayed, the mode of game device 1 switches from the "still image" to the "motion picture". In the "motion picture", characters and graphics indicating a still image are displayed as operation image 320.

Operation image 322 accepts selection of a type of a camera to be used for image pick-up. Game device 1 is equipped with outer cameras 131L and 131R (stereo cameras) and inner camera 133, and any of them can be selected for use in response to a user's request. FIGS. 13 to 15 show characters of "inner camera" indicating inner camera 133 and a corresponding picture as operation image 322. When the user points the region where operation image 322 is displayed, the image pick-up device to be used for image pick-up switches from inner camera 133 to outer cameras 131L and 131R (stereo cameras). When inner camera 133 is active, characters and graphics indicating outer cameras 131L and 131R (stereo cameras) are displayed as operation image 322.

Operation image 310 accepts an instruction to end an application that is currently being executed. Namely, when the user points the region where operation image 310 is displayed, display control processing in the present embodiment ends.

Operation image 312 accepts selection of the "image pick-up mode" and the "viewing mode". FIGS. 13 to 15 show characters of "view" indicating the viewing mode as operation image 312. When the user points the region where operation image 312 is displayed, an operation mode switches from the "image pick-up mode" to the "viewing mode". When the "viewing mode" has been selected, characters of "shoot" indicating the "image pick-up mode" are displayed as operation image 312.

Operation image 314 accepts start of processing for setting various parameters involved with display control according to the present embodiment. When the user points the region where operation image 314 is displayed, switching to a screen for setting various parameters involved with processing in game device 1 is made. Then, various parameters are accepted.

When the user selects operation image 322 to activate image pick-up by inner camera 133, stereo images necessary for stereoscopic display cannot be obtained. Therefore, upper LCD 110 provides non-stereoscopic display (two-dimensional display) instead of stereoscopic display.

Hereinafter, an operation for providing stereoscopic display using stereo images obtained as a result of image pick-up by outer cameras 131L and 131R (stereo cameras) is referred to as "3D image pick-up processing," while an operation for providing non-stereoscopic display (two-dimensional display) using an image obtained as a result of image pick-up by inner camera 133 is referred to as "2D image pick-up processing."

Since it is not necessary to adjust parallax in this "2D image pick-up processing," an operation for second axis image 306 relating to adjustment of parallax is inactivated in the user interface screen as shown in FIG. 15. It is noted that second axis image 306 may be turned off. Namely, in the "2D image pick-up processing," only an operation for first axis image 304 relating to the operation for zoom processing is activated. Naturally, a dedicated user interface screen may be prepared for each of the "3D image pick-up processing" and the "2D image pick-up processing."

Alternatively, when the "viewing mode" is selected, operation images 316, 318, 320, and 322 are removed from the user interface screen shown in FIGS. 13 to 15, and instead, an operation image for selecting a folder or the like from which an image is to be read is displayed.

Alternatively, when the "CG mode" is selected, operation images 316, 318, 320, and 322 are removed from the user interface screen shown in FIGS. 13 to 15, and instead, an operation image for selecting a focused-on object to stereoscopically be displayed, a virtual space or the like is displayed.

L. Operation Example

As described above, in game device 1, based on an operation input generated in response to the user's operation of the input device, the image for left eye and the image for right eye are zoomed on the display surface of upper LCD 110 and parallax between the image for left eye and the image for right eye at the display surface of upper LCD 110 is adjusted. These processes may be performed concurrently. Therefore, the operation input generated by the input device includes at least a two-dimensional value. Then, a first command value for zoom processing is generated based on a value in one dimension included in the operation input and a second command value for adjusting parallax is generated based on a value in the other dimension included in the operation input.

Namely, the user can simultaneously perform an operation for zoom processing and an operation for adjustment of parallax on game device 1. Such an operation example will be described hereinafter with reference to FIGS. 16A to 16F.

FIGS. 16A to 16F are diagrams for illustrating operation examples on the user interface screen shown in FIG. 13. More specifically, it is assumed that the user performed an operation in the order from FIGS. 16A to 16F. It is noted that a dashed line shown in FIGS. 16B to 16F is shown for the sake of convenience of better understanding of variation from an immediately preceding state and it does not necessarily have to be displayed on the actual user interface screen.

Figure 16A:
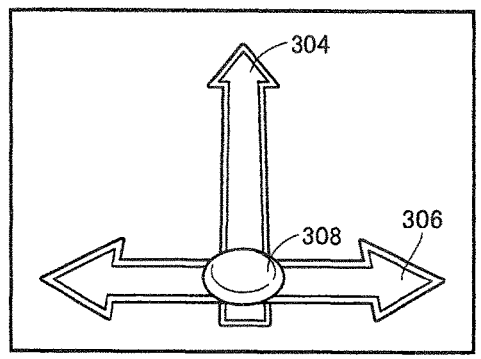
FIGS. 16A to 16F are diagrams for illustrating operation examples on the user interface screen shown in FIG. 13.

Initially, a position shown in FIG. 16A is assumed as an initial state. Namely, a state of zoom and a state of adjustment of parallax corresponding to a coordinate where marker image 308 is present are assumed as the initial state.

It is noted that the initial state typically refers to such a state that, regarding images picked up by outer cameras 131L, 131R, a state value of zoom and a state value of adjustment of parallax are set to initial values (default values) set in advance, respectively. Alternatively, any value set in advance by the user or a value obtained as a result of recent adjustment made by the user may be used as this initial value. Alternatively, in reading and reproducing an image saved in advance, a value described in parallax information (details of which will be described later) saved in association with the image may be used as the initial value.

Figure 16D:
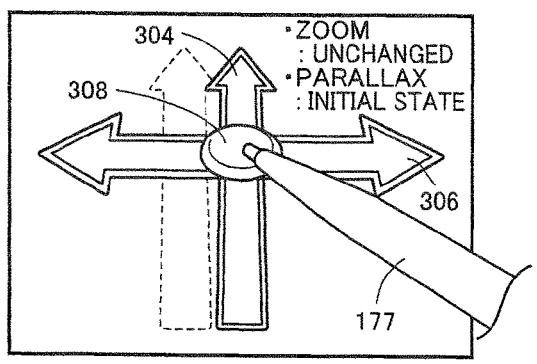
Figure 16B:
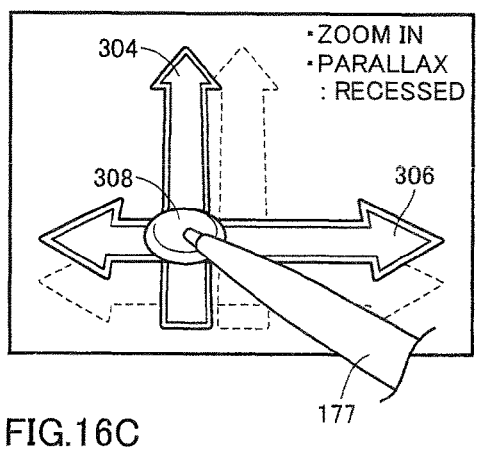

In succession, assuming that the user performs a pointing operation of a position as shown in FIG. 16B, marker image 308 moves to the pointed position and a command in accordance with this pointing operation is internally generated. Namely, concurrent change is made such that an image displayed on upper LCD 110 is displayed in a scaled-up manner (subjected to zoom-in processing) and a focused-on object included in that image is displayed in a further recessed manner in the display surface.

Figure 16E:
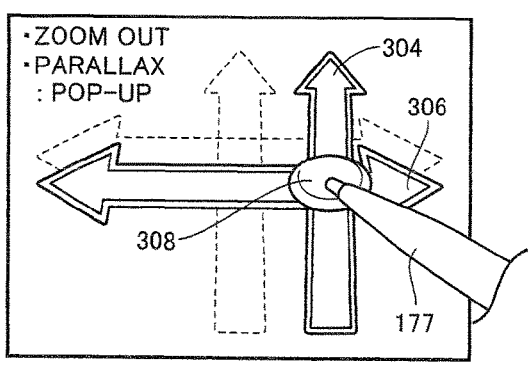
Figure 16C:
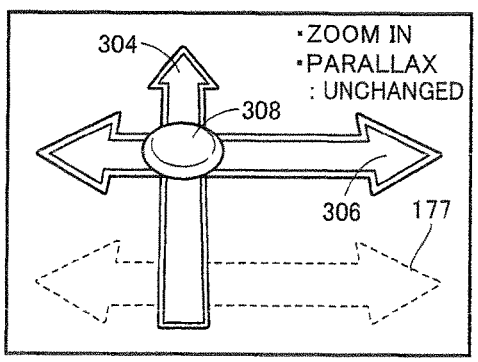

In succession, assuming that the user performs a pointing operation of a position as shown in FIG. 16C, marker image 308 moves to the pointed position and a command in accordance with this pointing operation is internally generated. In the example shown in FIG. 16C, an operation only in the vertical direction of the screen of lower LCD 120 is performed, so that an image displayed on upper LCD 110 is displayed in a further scaled-up manner (subjected to zoom-in processing), while parallax is not adjusted.

In succession, assuming that the user performs a pointing operation of a position as shown in FIG. 16D, marker image 308 moves to the pointed position and a command in accordance with this pointing operation is internally generated. In the example shown in FIG. 16D, an operation only in the horizontal direction of the screen of lower LCD 120 is performed, so that stereoscopic display of the focused-on object included in the image displayed on upper LCD 110 is reset to the initial state while a size of the image is maintained.

In succession, assuming that the user performs a pointing operation of a position as shown in FIG. 16E, marker image 308 moves to the pointed position and a command in accordance with this pointing operation is internally generated. Namely, concurrent change is made such that an image displayed on upper LCD 110 is displayed in a scaled-down manner (subjected to zoom-out processing) and the focused-on object included in that image is displayed in a manner further popping up from the display surface.

Figure 16F:
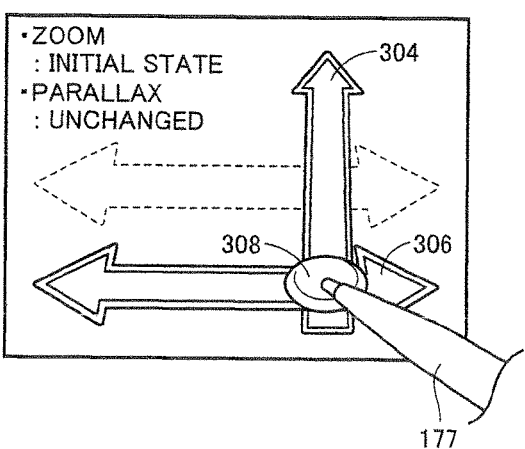

Finally, assuming that the user performs a pointing operation of a position as shown in FIG. 16F, marker image 308 moves to the pointed position and a command in accordance with this pointing operation is internally generated. In the example shown in FIG. 16F, an operation only in the vertical direction of the screen of lower LCD 120 is performed, so that the image displayed on upper LCD 110 is reset to the initial state, while parallax is not adjusted.

As described above, operation inputs in the axial directions are independent of each other, and operation contents for each axis are concurrently reflected. It is noted that resetting to the initial state may be made by performing a predetermined operation.

M. Input Device

In game device 1, control pad 154, cross-shaped button 161 and button group 162 can be used as the input device (input means) for accepting an operation for zoom processing and an operation for adjustment of parallax as described above.

When the user operates any input device, an operation input in accordance therewith is output from the input device. Here, the operation input includes at least a two-dimensional operation value.

Details of an operation of each input device will be described hereinafter.

(m1) Touch Panel

When the user points any position on touch panel 122 while the two-dimensional coordinate (background image 302) shown on the user interface screen shown in FIG. 13 is displayed, a command value relating to the zoom processing and a command value relating to adjustment of parallax are generated in accordance with a direction of displacement between a position of display of marker image 308 (state value object) and the pointed position. At the same time, the position of display of marker image 308 (state value object) moves to the position pointed by the user.

Typically, the following manner can be adopted as the user's pointing operation.

(i) Operation by Pointing Once

Figure 17A:
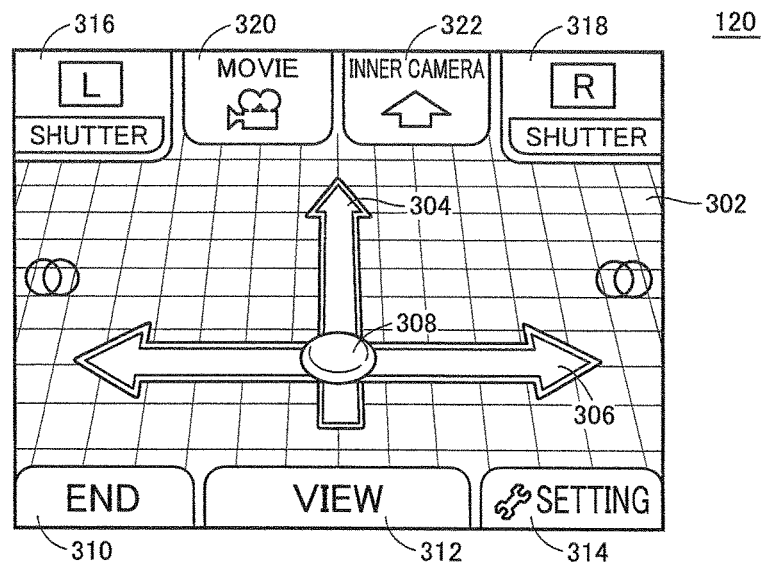
FIGS. 17A to 17C are diagrams for illustrating an operation example using a pointing device in the game device according to the present embodiment.
Figure 17B:
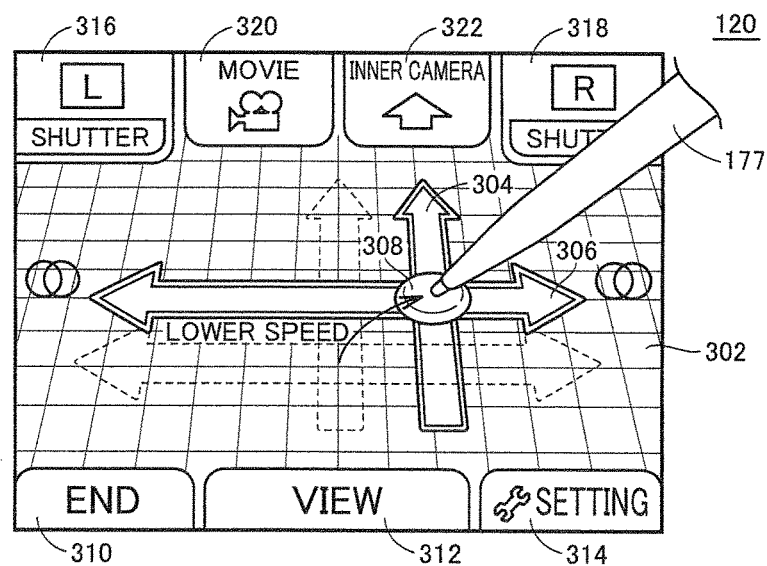
Figure 17C:
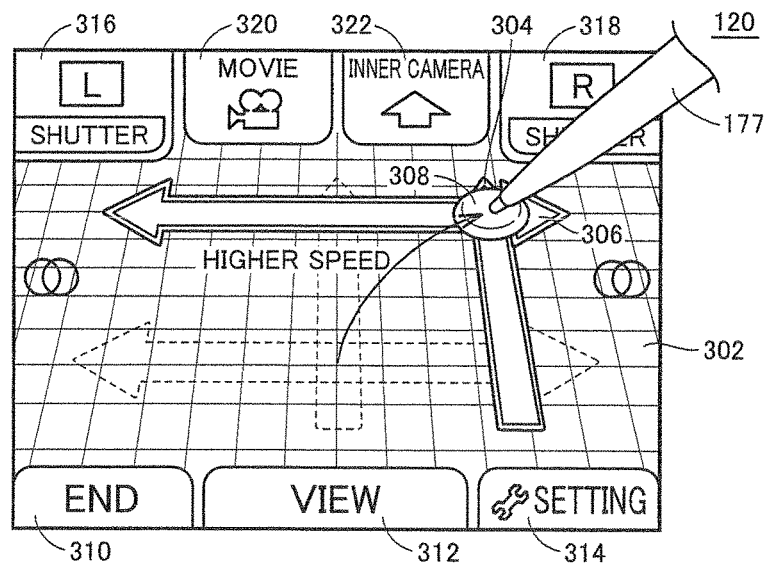

FIGS. 17A to 17C are diagrams for illustrating an operation example using a pointing device in the game device according to the present embodiment. FIG. 17A shows a case where a certain state is set for zoom processing and adjustment of parallax. It is assumed that the user performs an operation to point any position on the user interface screen shown in this FIG. 17A.

For example, it is assumed in FIG. 17B that a position relatively close to marker image 308 shown in FIG. 17A has been pointed. Then, marker image 308 moves to this pointed position.

Here, the position of display of marker image 308 is updated at a speed in accordance with a distance between marker image 308, which is the state value object, and the pointed position.

Namely, referring to FIG. 17C, it is assumed that the user has pointed a position further distant from the pointed position in FIG. 17B, with respect to marker image 308 shown in FIG. 17A. Then, marker image 308 moves to this pointed position, and here the moving speed is faster than the moving speed of marker image 308 in FIG. 17B.

In other words, in the user interface screen (see FIGS. 17A to 17C) provided by game device 1, marker image 308 moves to the pointed position in a direction in accordance with a difference (a differential vector) between the position of marker image 308 before the pointing operation and the pointed position, at a speed in proportion to magnitude of the differential vector.

By thus varying a moving speed of marker image 308 depending on a difference of the pointed position from marker image 308, time required for the operation can be made uniform, without depending on magnitude (absolute value) of an amount of operation relating to zoom processing and an amount of operation relating to adjustment of parallax.

(ii) Operation by Dragging

Figure 18A:
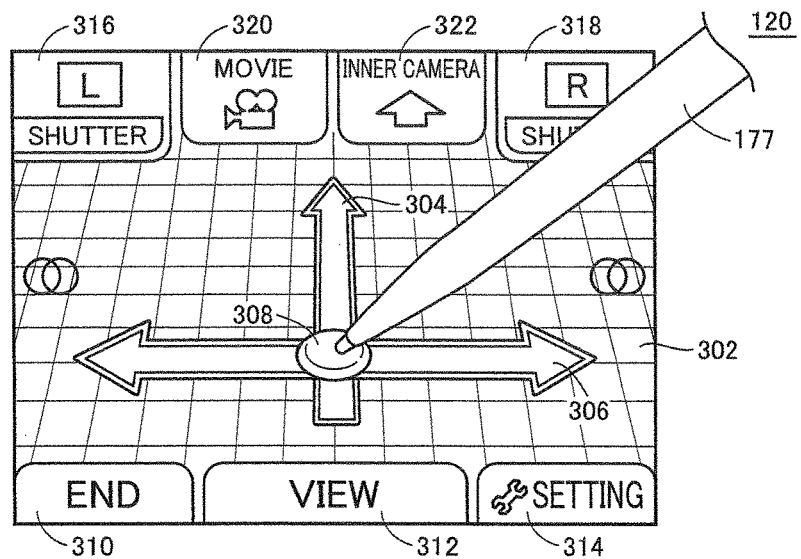
FIGS. 18A to 18C are diagrams for illustrating another operation example using the pointing device in the game device according to the present embodiment.
Figure 18B:
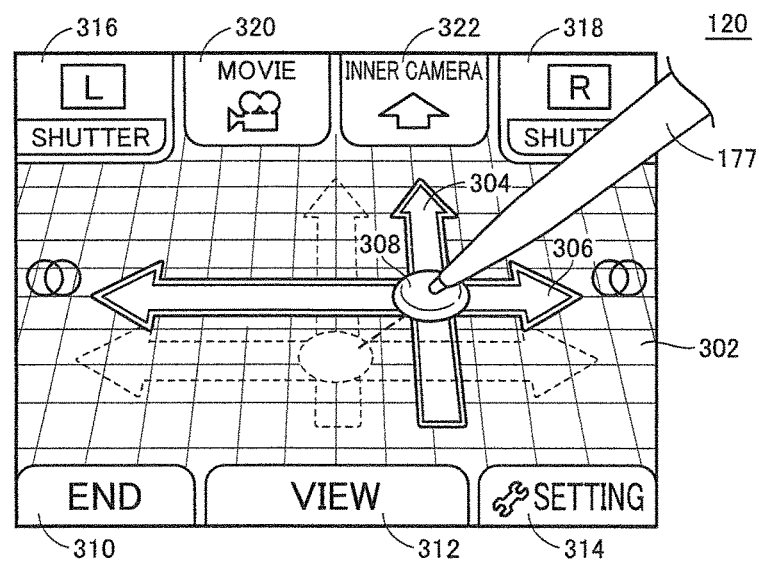
Figure 18C:
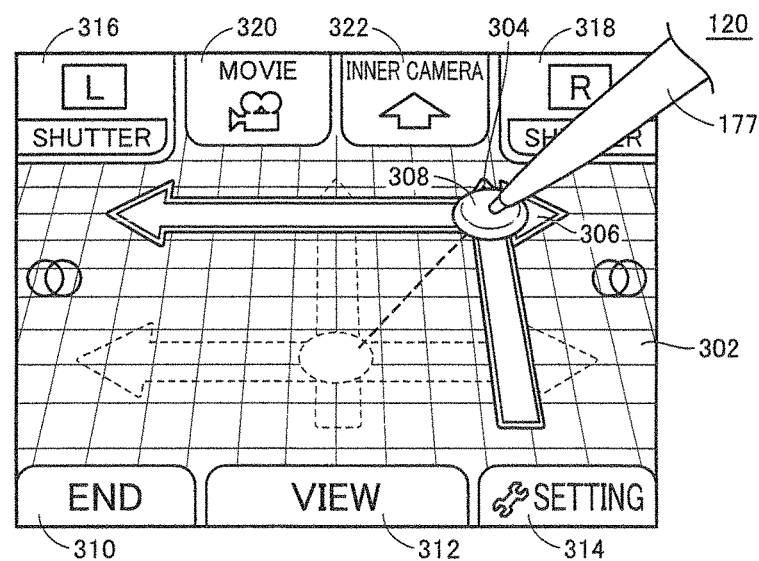

FIGS. 18A to 18C are diagrams for illustrating another operation example using a pointing device in the game device according to the present embodiment. FIG. 18A shows a case where a certain state is set for zoom processing and adjustment of parallax. In the user interface screen shown in this FIG. 18A, after the user selected (performed an operation to point) marker image 308 which is a state value object, movement to any position is permitted.

For example, FIG. 18B shows an operation for moving marker image 308 to any position, while maintaining such a state that marker image 308 shown in FIG. 18A has been pointed. So to speak, by dragging marker image 308, an operation relating to zoom processing and an operation relating to adjustment of parallax can be performed. In addition, FIG. 18C shows such a state that marker image 308 is dragged and moved to a more distant position.

In the example shown in FIGS. 18A to 18C, so long as the user maintains a pointing state (a dragging state continues), the position of display of marker image 308 is updated in synchronization with the pointed position. So to speak, marker image 308 moves in coordination with the user's dragging operation.

By thus performing an operation relating to zoom processing and adjustment of parallax in accordance with the operation to drag marker image 308, change in setting unintended by the user can be avoided, or a state desired by the user can readily be searched for.

(m2) Control Pad in game device 1, in addition to the operation of touch panel 122 described above, an operation relating to zoom processing and adjustment of parallax can be performed also by operating control pad 154 (see FIG. 1).

As described above, control pad 154 is an analog device capable of accepting input having at least two degrees of freedom. When the user operates control pad 154 so as to provide some displacement, an operation input having a value in accordance with a direction of displacement and an amount of displacement from a prescribed reference position is output. This operation input is a set of command values each having one of a large number of step values. At the time of mount, since an analog output generated by control pad 154 is quantized (discrete), a digital output having finite steps (for example, 16 steps) is provided.

In accordance with a direction of displacement from the reference position on this control pad 154, a command value relating to zoom processing and a command value relating to adjustment of parallax are generated. Namely, each command value is generated such that a state value of zoom and a state value of adjustment of parallax are each varied.

More specifically, a direction of displacement of control pad 154 is brought in correspondence with the two-dimensional coordinate (background image 302) within the user interface screen shown in FIG. 13. When the user operates control pad 154 in the vertical direction of the sheet surface, an image displayed on upper LCD 110 (stereoscopic display) is scaled up (zoomed in) or scaled down (zoomed out) at a speed in accordance with a degree of pressing (an amount of inclination) thereof. Similarly, when the user operates control pad 154 in the horizontal direction of the sheet surface, a degree of overlap between the image for right eye and the image for left eye (relative positional relation at the time of display) on the display surface of upper LCD 110 is varied at a speed in accordance with a degree of pressing (an amount of inclination) thereof. Namely, a position of a focused-on object that is stereoscopically visually recognized on the display surface of upper LCD 110 is varied.

Simply expressed, as the user operates control pad 154 to a larger extent, a state of stereoscopic display on upper LCD 110 is varied to a larger extent.

In coordination with these operations, a position of display of marker image 308 (state value object) moves also on the user interface screen displayed on lower LCD 120.

Thus, since an amount of operation for zoom processing and adjustment of parallax can be adjusted in accordance with an amount of operation (a direction of displacement and an amount of displacement) of control pad 154, the user can readily achieve a target display state.

(m3) Cross-Shaped Button/Button Group

In game device 1, an operation for zoom processing and adjustment of parallax can be performed by operating cross-shaped button 161 or button group 162 (see FIG. 1) in addition to an operation of touch panel 122 described above.

In using cross-shaped button 161, a direction of operation thereof is brought in correspondence with the two-dimensional coordinate (background image 302) within the user interface screen shown in FIG. 13. Namely, the user's operation (pressing of the button) in the vertical direction of the sheet surface can be brought in correspondence with the operation relating to zoom processing, while the user's operation (pressing of the button) in the horizontal direction of the sheet surface can be brought in correspondence with the operation relating to adjustment of parallax. For example, when cross-shaped button 161 is pressed toward "lower right", cross-shaped button 161 outputs a digital (ON/OFF) signal indicating that "right" and "down" are turned "ON".

Thus, cross-shaped button 161 is a button that can independently operate two directions brought in correspondence with a two-dimensional value, and it generates an operation input having a two-dimensional value in accordance with a button operation in each direction.

Alternatively, in using button group 162, each button operation is brought in correspondence with the two-dimensional coordinate (background image 302) within the user interface screen shown in FIG. 13. Namely, operation buttons 162X and 162B shown in FIG. 1 can be brought in correspondence with an operation relating to zoom processing, while operation buttons 162Y and 162A can be brought in correspondence with an operation relating to adjustment of parallax. In this case as well, the user can simultaneously press two buttons (for example, operation buttons 162X and 162A) included in button group 162.

Thus, button group 162 is a set of buttons that can independently operate two directions brought in correspondence with a two-dimensional value, and it generates an operation input having a two-dimensional value in accordance with a button operation in each direction.

Based on a button operation in each direction performed on cross-shaped button 161 or button group 162, a command value relating to zoom processing and a command value relating to adjustment of parallax are generated.

Since an operation input generated by cross-shaped button 161 or button group 162 is what is called a digital value (ON or OFF), zoom may be varied and adjustment of parallax may be varied at a speed in accordance with a time period during which the operation is continued.

More specifically, as the button operation of cross-shaped button 161 or button group 162 continues for a longer period of time, a speed of variation in zoom processing becomes higher and a speed of variation in adjustment of parallax becomes higher.

Thus, since an amount of operation relating to zoom processing and adjustment of parallax can be adjusted with an operation similar to an operation in a game application or the like, the user can readily achieve desired stereoscopic display without confusion in operation.

N. Control Block Diagram

Figure 19:
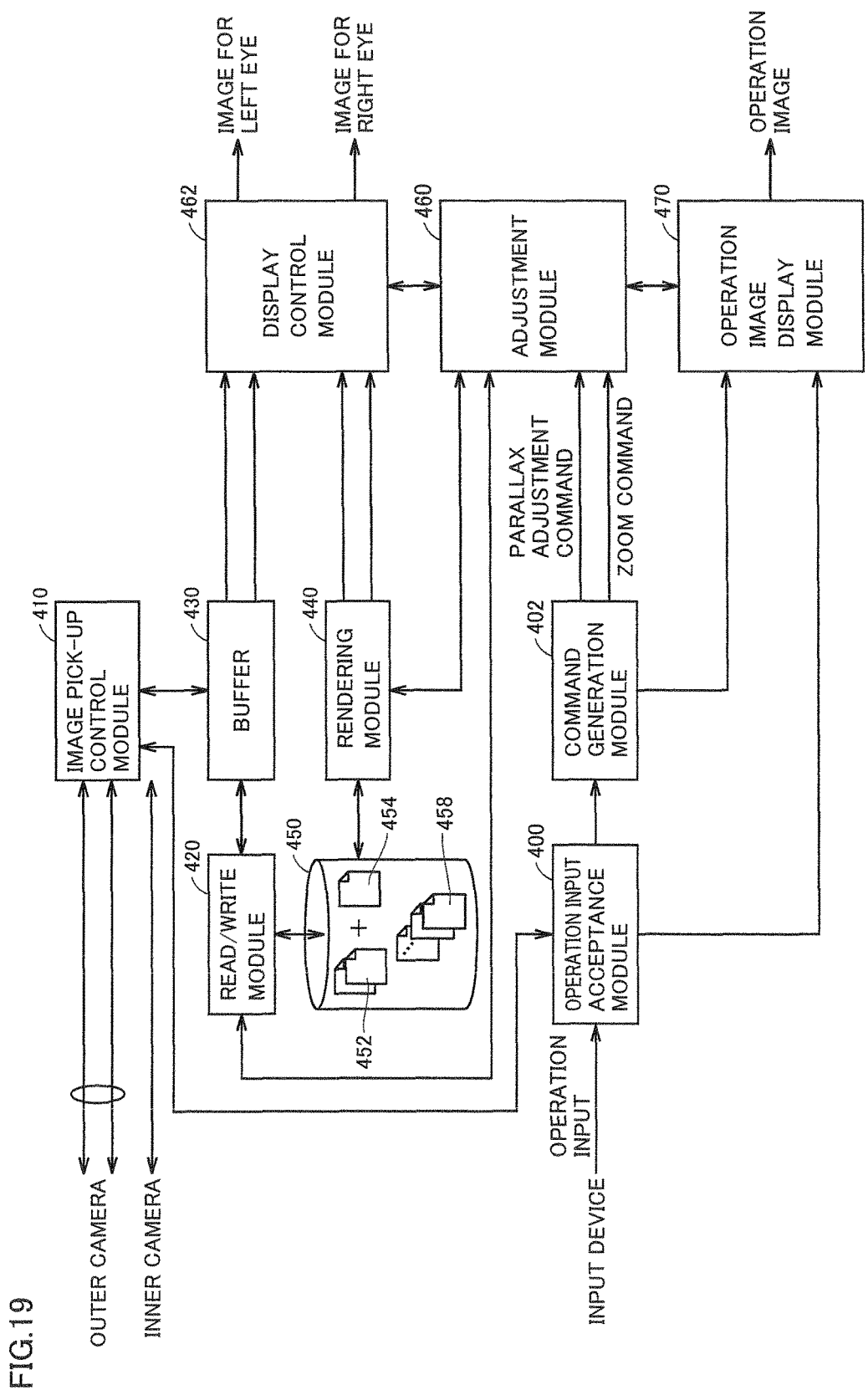
FIG. 19 is a block diagram showing a control structure for implementing a display control function provided in the game device according to the embodiment of the present invention.

FIG. 19 is a block diagram showing a control structure for implementing a display control function provided in game device 1 according to the embodiment of the present invention.

Referring to FIG. 19, game device 1 according to the present embodiment includes an operation input acceptance module 400, a command generation module 402, an image pick-up control module 410, a read/write module 420, a buffer 430, a rendering module 440, a storage unit 450, an adjustment module 460, and an operation image display module 470.

These modules are typically embodied by execution of a program (an instruction set) by operation processing unit 100. It is noted that storage unit 450 is embodied by a storage area included in non-volatile memory 136 (see FIG. 4) or the like.

Operation input acceptance module 400 is connected to various input devices as described above and accepts an operation input from the input device. This operation input includes at least a two-dimensional value, and operation input acceptance module 400 outputs a signal in accordance with the accepted operation input to command generation module 402, operation image display module 470, and the like.

Command generation module 402 generates a command value relating to zoom processing (a zoom command) based on a value of one dimension included in the operation input, and generates a command value relating to adjustment of parallax (a parallax adjustment command) based on a value of the other dimension included in the operation input. More specifically, command generation module 402 performs the following processing, for each input device.

When touch panel 122 is operated, command generation module 402 generates a command value relating to zoom processing (a zoom command) and a command value relating to adjustment of parallax (a parallax adjustment command) in accordance with a direction of displacement between a position of display of marker image 308, which is the state value object, in the two-dimensional coordinate (background image 302) shown on the user interface screen shown in FIG. 13 and the pointed position.

Alternatively, when control pad 154, which is an analog device, is operated, command generation module 402 generates a command value relating to zoom processing (a zoom command) and a command value relating to adjustment of parallax (a parallax adjustment command) in accordance with a direction of displacement from the reference position on control pad 154. Here, command generation module 402 generates the command values such that a state value of zoom and a state value of adjustment of parallax are varied at a speed in accordance with an amount of displacement from the reference position in control pad 154.

Alternatively, when cross-shaped button 161 or button group 162, which is a button that can independently operate two directions brought in correspondence with a two-dimensional value, is operated, command generation module 402 generates a command value relating to zoom processing (a zoom command) and a command value relating to adjustment of parallax (a parallax adjustment command) based on the button operation in each direction.

Image pick-up control module 410 is connected to outer cameras 131L, 131R (stereo cameras) and inner camera 133 and transfers an image obtained as a result of image pick-up by a designated camera to buffer 430, in response to a command from operation input acceptance module 400.

Read/write module 420 performs write (saving) processing of an image in storage unit 450 (in the "image pick-up mode" or the "viewing mode") and read processing of an image from storage unit 450 (in the "viewing mode"). It is noted that details of processing by read/write module 420 will be described later.

Buffer 430 is connected to image pick-up control module 410 and read/write module 420, and temporarily retains an image output from image pick-up control module 410 and an image output from read/write module 420. The image retained in buffer 430 is accessed by a display control module 462. In addition, the image retained in buffer 430 may be saved in storage unit 450 through read/write module 420.

In the "CG mode", rendering module 440 subjects data of an object or the like stored in storage unit 450 or the like to rendering processing, to thereby generate an image to be displayed on the display. Rendering module 440 dynamically generates stereo images having prescribed parallax, by virtually picking up an image of an object of interest with two virtual cameras for stereoscopic display on upper LCD 110.

Storage unit 450 stores image data 452 including an image to be displayed on the display and parallax information 454 associated with image data 452. In addition, storage unit 450 stores object data 458 for rendering module 440 to dynamically generate stereo images.

Adjustment module 460 performs zoom processing of the image for left eye and the image for right eye (stereoscopic image) on the display surface of upper LCD 110 based on contents of the operation input accepted by operation input acceptance module 400, and adjusts parallax between the image for left eye and the image for right eye (stereoscopic image) at the display surface of upper LCD 110. More specifically, adjustment module 460 performs zoom processing and adjusts parallax in response to a command value from command generation module 402. Namely, adjustment module 460 performs zoom processing of the image for left eye and the image for right eye (stereoscopic image) based on a value in one dimension included in the operation input, and adjusts parallax between the image for left eye and the image for right eye (stereoscopic image) based on a value in the other dimension included in the operation input.

Display control module 462 is connected to buffer 430, and causes upper LCD 110 serving as the display to display on its display surface the entirety or a part of a pair of input images having parallax, for providing stereoscopic display. In particular, display control module 462 outputs respective ranges in accordance with the operation input in the pair of input images generated as a result of image pick-up by outer cameras 131L and 131R (stereo cameras), as the image for left eye and the image for right eye (display images).

In particular, display control module 462 causes upper LCD 110 serving as the display to display the image for left eye and the image for right eye (stereoscopic image) subjected to zoom processing by adjustment module 460, with parallax adjusted by adjustment module 460.

Operation image display module 470 is connected to operation input acceptance module 400, command generation module 402 and adjustment module 460, and causes lower LCD 120 to display the user interface screen or an operation image. Operation image display module 470 causes marker image 308 serving as the state value object to be displayed at a coordinate position corresponding to a value indicating a state of zoom and a value indicating a state of parallax, for example, in the two-dimensional coordinate (background image 302) shown on the user interface screen shown in FIG. 13.

In addition, operation image display module 470 updates a position of display of marker image 308 serving as the state value object, in accordance with the pointed position on touch panel 122. Here, operation image display module 470 moves marker image 308 at a speed in accordance with a distance between the position of display of marker image 308 and the pointed position.

Namely, operation image display module 470 causes lower LCD 120 serving as the display for providing non-stereoscopic display to display a state of zoom and a state of parallax.

O. Saving/Reading of Image (o1. Saving of Image)

As shown in FIG. 13 above, when game device 1 is in the "image pick-up mode," the image obtained at that point is saved as the user presses L button 162L or R button 162R.

In game device 1, stereoscopic display of images (Live images) obtained by successive image pick-up by outer cameras 131L and 131R can be provided, and an operation for zoom processing and an operation for adjustment of parallax as described above can also be performed on these Live images.

Therefore, when the user indicates image pick-up (pressing of L button 162L or R button 162R) in the "image pick-up mode," an image is saved such that a state of zoom processing and a state of parallax at the time of indication can be reproduced.

More specifically, as described with reference to FIGS. 10A and 10B above, zoom-in processing or zoom-out processing representing a typical example of processing involved with zoom processing corresponds to processing for changing a region to be used for display on the display (a size of display images IMGL and IMGR), with respect to input images PIMGL and PIMGR obtained as a result of image pick-up by outer cameras 131L and 131R.

In response to a user's image pick-up instruction, game device 1 (read/write module 420 in FIG. 19) saves an image having a size in accordance with the state of zoom at that time point. By way of example, as shown in FIGS. 10A and 10B, a range of display image IMGL in input image PIMGL and a range of display image IMGR in input image PIMGR are saved.

In addition, game device 1 (read/write module 420 in FIG. 19) saves information indicating the state of parallax at that time point (parallax information 454 shown in FIG. 19) in association with these saved images. Such a data structure will be described in further detail with reference to FIGS. 20A and 20B.

Figure 20A:
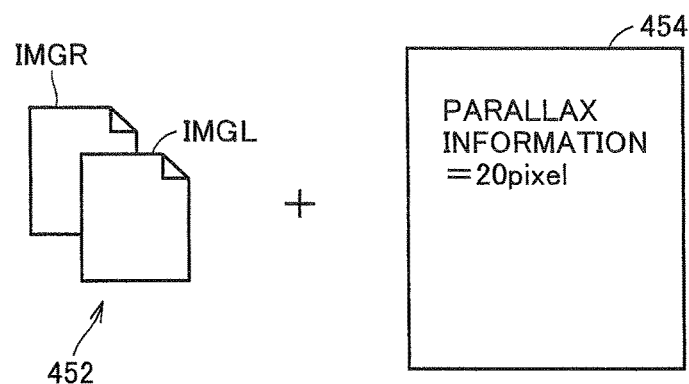
FIGS. 20A and 20B are diagrams showing one example of a data structure of an image saved in the game device according to the embodiment of the present invention.
Figure 20B:
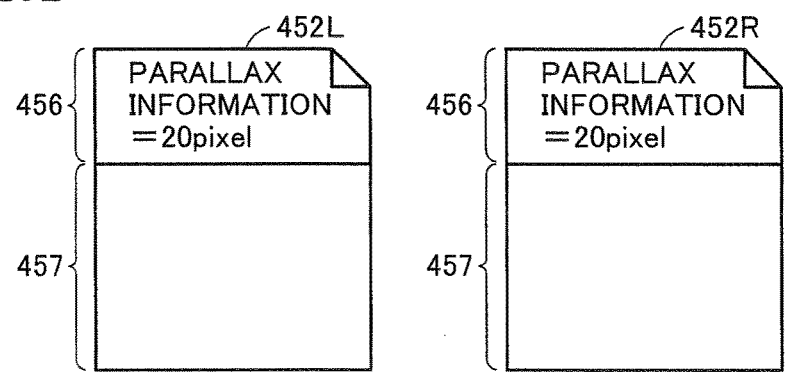

FIGS. 20A and 20B are diagrams showing one example of a data structure of an image saved in the game device according to the embodiment of the present invention.

FIG. 20A shows an example where parallax information 454 is saved as a file independent of image data 452 (display images IMGL and IMGR). As described above, since the state of zoom is reflected on the range of saved display images IMGL and IMGR, this parallax information 454 should only include information indicating relative positional relation in displaying display images IMGL and IMGR on the display.

In the example of parallax information 454 shown in FIG. 20A, description as "parallax information=20 pixel" is given. As described with reference to FIGS. 7 and 8 above, basically, relative positional relation (a degree of overlap) of a pair of images (stereo images) having prescribed parallax and displayed on the display (upper LCD 110) may be different in a direction of arrangement of human eyes, that is, in the X direction. Therefore, the example of parallax information 454 shown in FIG. 20A means that display image IMGL and display image IMGR are displayed on the display surface in a manner displaced from each other by "20 pixels".

In actual game device 1, due to variation in a position of attachment of outer cameras 131L and 131R (stereo cameras), variation in an optical system of each camera, or the like, calibration may be required. In calibration, in order to attain match between input images generated as a result of image pick-up by outer cameras 131L and 1318, correction parameters and the like such as a position displacement amount (ΔX, ΔY), an angle of rotation, inclination, and a scaling factor are obtained in advance. In such a case, the parallax information described above may be incorporated in these correction parameters.

More specifically, as shown in FIG. 20B, various types of information including the correction parameters are typically retained in a header portion (preamble) 456 of image data 452L, 452R. This header portion 456 is provided independently of a body portion 457 where contents of an image are substantially stored. For example, in image data in JPEG (Joint Photographic Experts Group) format, the information is incorporated as EXIF (Exchangeable Image File Format) information. Therefore, parallax information 454 may be incorporated in this header portion 456, in addition to the correction parameters described above.

(o2. Reading of Image)

In the "viewing mode" described above, a pair of images (stereo images) having prescribed parallax is read. Specifically, a pair of images (stereo images) stored in such a storage device as non-volatile memory 136 or memory card 173 (see FIG. 4) is obtained as images to be displayed on the display (upper LCD 110).

Here, as shown in FIG. 20A, parallax information 454 associated with the stereo images (display images IMGL and IMGR) to be read is simultaneously read. These read stereo images are displayed, as the initial state, on the display surface in relative positional relation based on the information described in parallax information 454.

P. Processing Procedure

Figure 21:
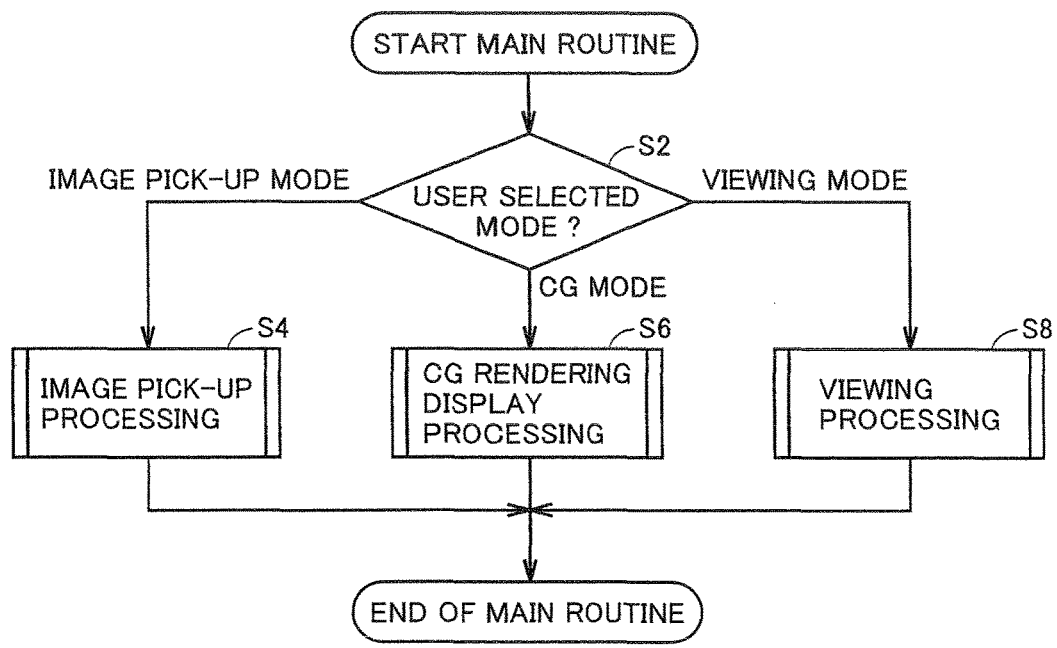
FIG. 21 is a flowchart of a main routine involved with display control processing provided in the game device according to the embodiment of the present invention.
Figure 22:
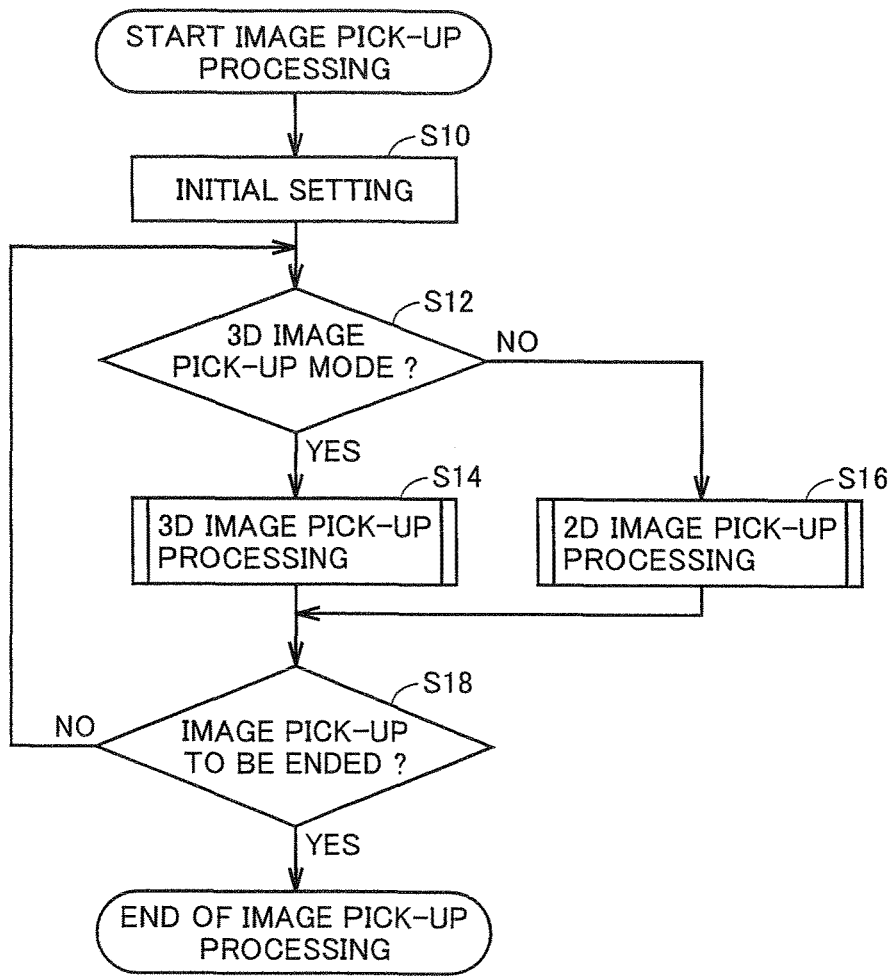
FIG. 22 is a flowchart in an "image pick-up mode" involved with the display control processing provided in the game device according to the embodiment of the present invention.
Figure 23:
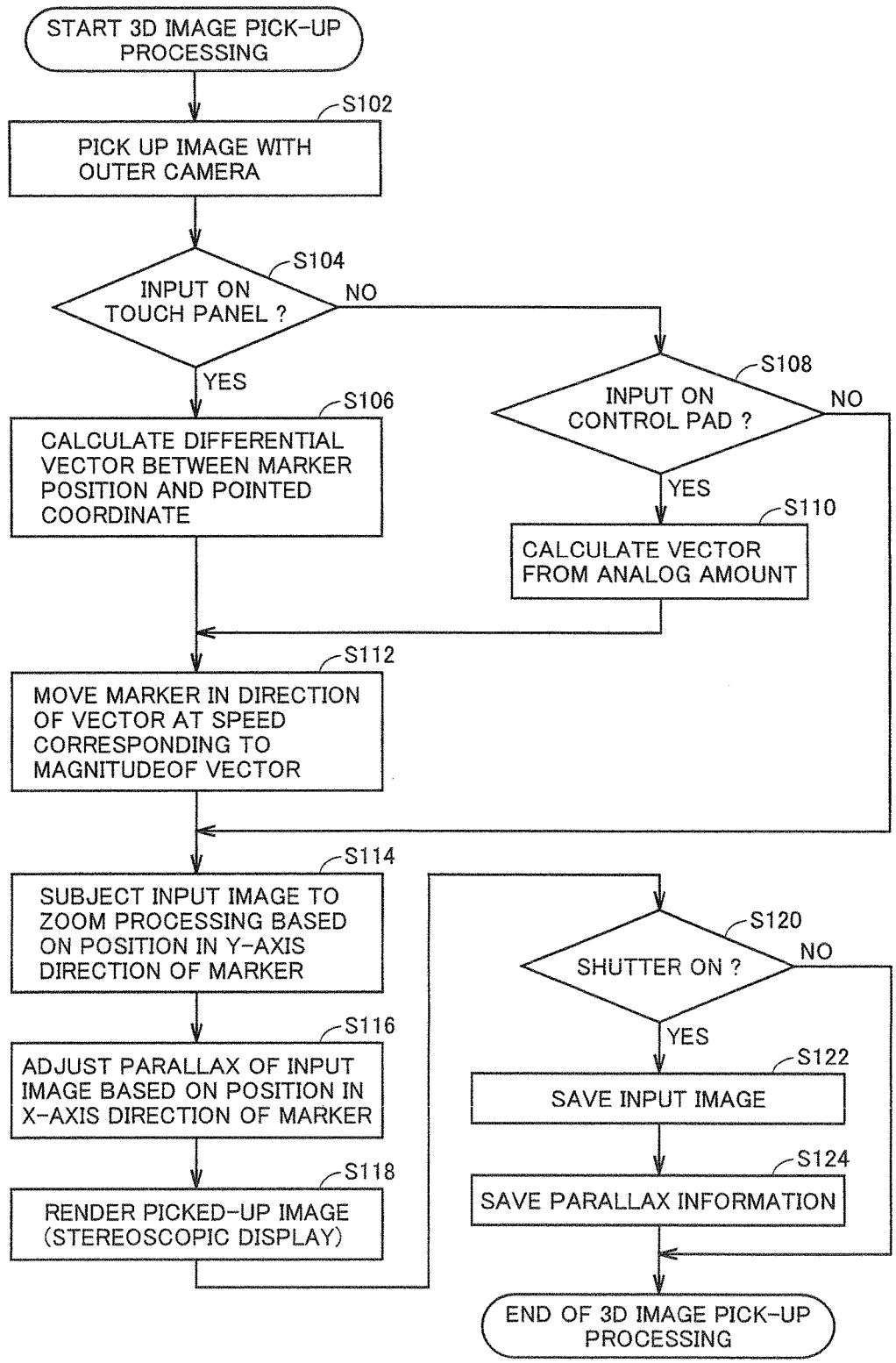
FIG. 23 is a flowchart showing contents in a 3D image pick-up processing sub routine in the flowchart shown in FIG. 22.
Figure 24:
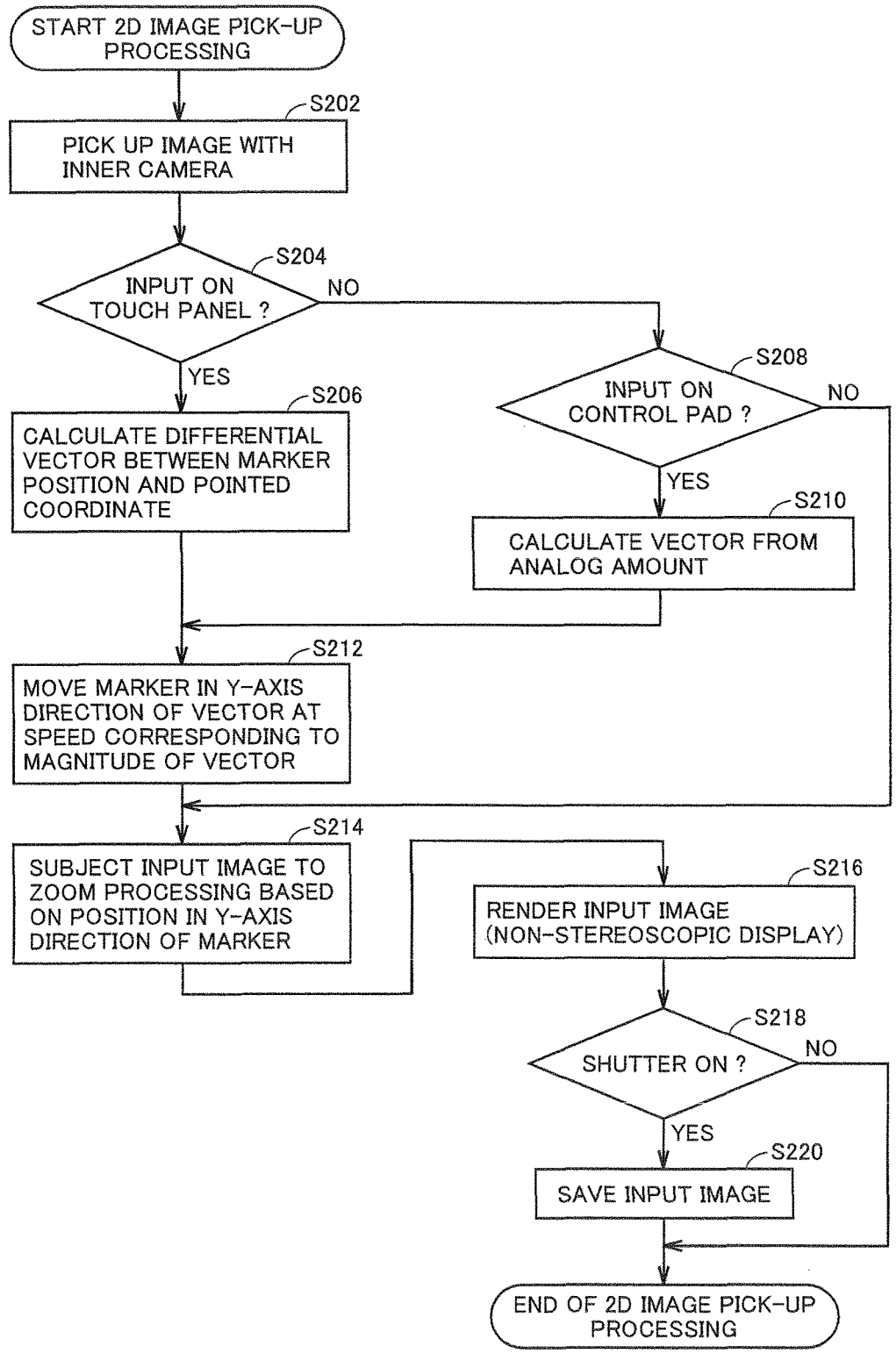
FIG. 24 is a flowchart showing contents in a 2D image pick-up processing sub routine in the flowchart shown in FIG. 22.
Figure 25:
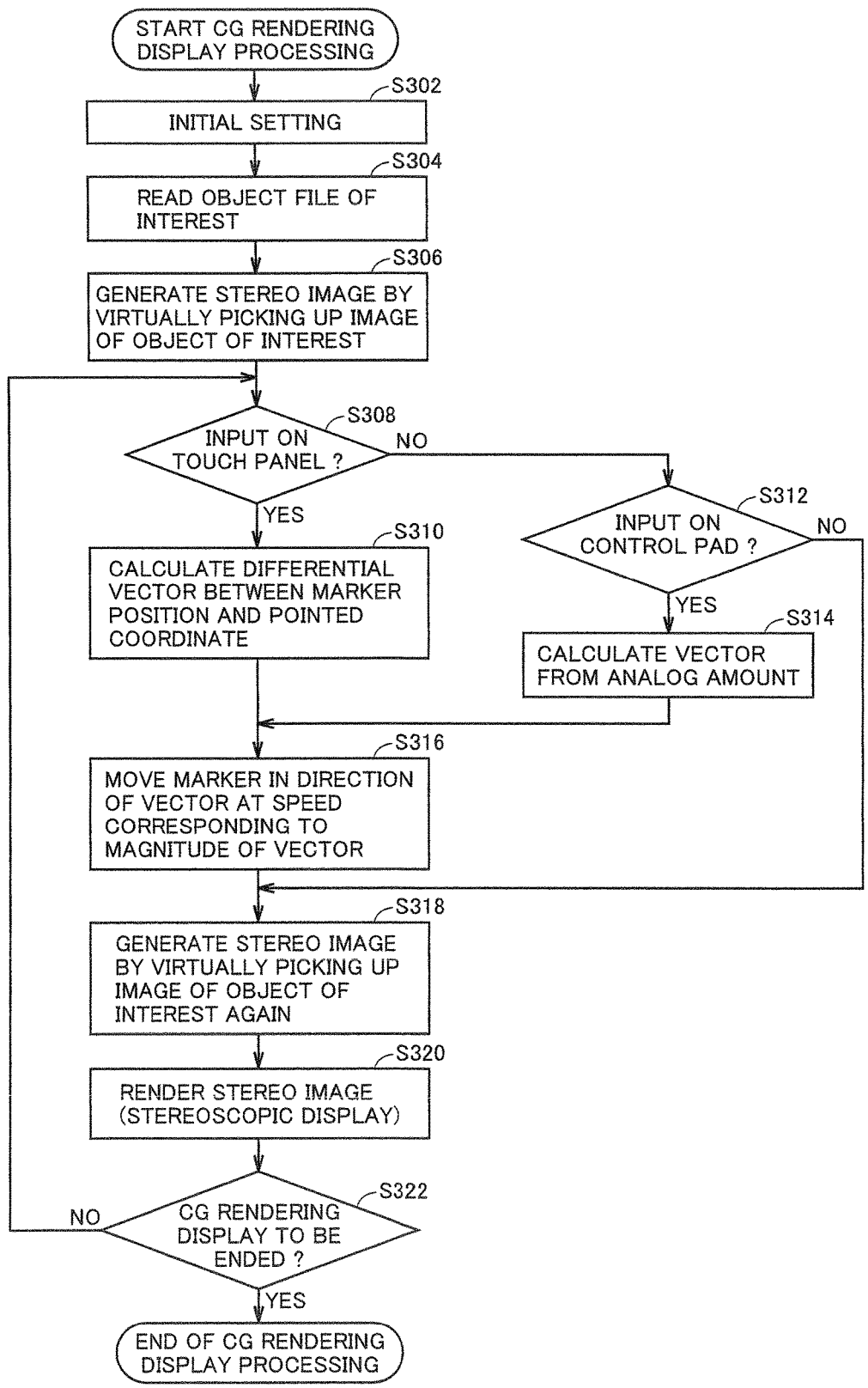
FIG. 25 is a flowchart in a "CG mode" involved with the display control processing provided in the game device according to the embodiment of the present invention.
Figure 26:
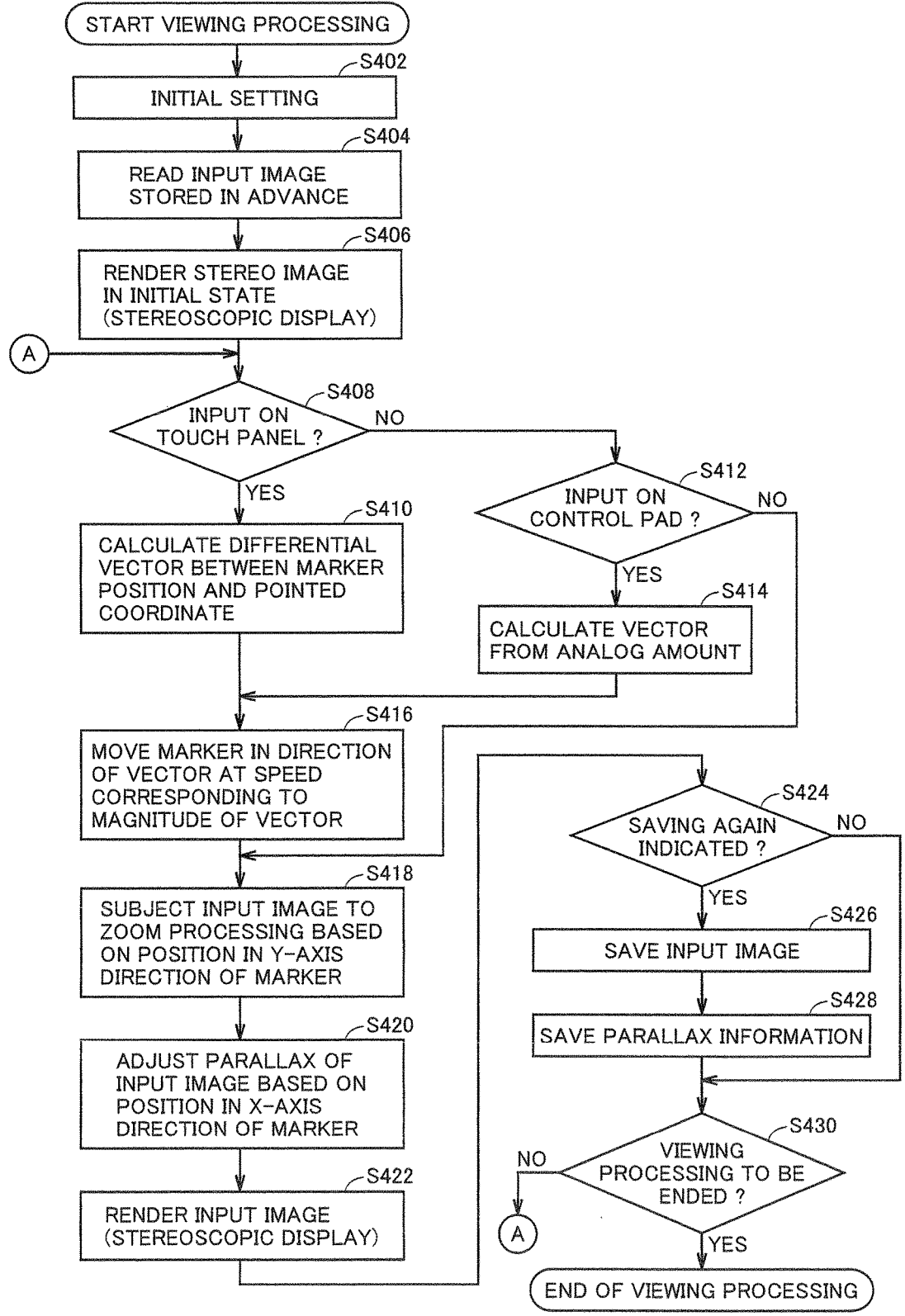
FIG. 26 is a flowchart in a "viewing mode" involved with the display control processing provided in the game device according to the embodiment of the present invention.

FIG. 21 is a flowchart of a main routine involved with display control processing provided in game device 1 according to the embodiment of the present invention. FIG. 22 is a flowchart in the "image pick-up mode" involved with the display control processing provided in game device 1 according to the embodiment of the present invention. FIG. 23 is a flowchart showing contents in a 3D image pick-up processing sub routine in the flowchart shown in FIG. 22. FIG. 24 is a flowchart showing contents in a 2D image pick-up processing sub routine in the flowchart shown in FIG. 22. FIG. 25 is a flowchart in the "CG mode" involved with the display control processing provided in game device 1 according to the embodiment of the present invention. FIG. 26 is a flowchart in the "viewing mode" involved with the display control processing provided in game device 1 according to the embodiment of the present invention.

Each step in each flowchart shown in FIGS. 21 to 26 is typically provided by execution of a program (an instruction set) by operation processing unit 100 (FIG. 4). It is noted that a single program does not necessarily have to be executed by operation processing unit 100 and one application or a plurality of applications may be executed together with a program (or firmware) providing basic OS (Operating System). In addition, the entirety or a part of the processing shown below may be implemented by hardware.

(p1. Main Routine)

Referring to FIG. 21, operation processing unit 100 determines a mode selected by the user (step S2). More specifically, operation processing unit 100 determines a mode selected by the user based on whether or not operation image 312 has been selected in the user interface screen shown in FIG. 13 or based on an operation or the like on a not-shown menu screen or the like.

When the user has selected the "image pick-up mode" ("image pick-up mode" in step S2), operation processing unit 100 starts image pick-up processing shown in FIG. 22 (step S4).

Alternatively, when the user has selected the "CG mode" ("CG mode" in step S2), operation processing unit 100 starts CG rendering display processing shown in FIG. 25 (step S6).

Alternatively, when the user has selected the "viewing mode" ("viewing mode" in step S2), operation processing unit 100 starts viewing processing shown in FIG. 26 (step S8).

(p2. Image Pick-Up Mode)

When the "image pick-up mode" is selected, operation processing unit 100 starts the image pick-up processing shown in FIG. 22.

Referring to FIG. 22, initially, operation processing unit 100 makes initial setting necessary for image pick-up (step S10). More specifically, operation processing unit 100 initializes the image pick-up device (outer cameras 131L, 131R and inner camera 133), causes an initial screen to be displayed, sets an initial parameter, and the like.

In succession, operation processing unit 100 determines whether the user has selected the 3D (stereoscopic) image pick-up mode or not (step S12). More specifically, operation processing unit 100 determines a mode selected by the user based on whether or not operation image 322 has been selected on the user interface screen shown in FIG. 13, or the like.

When the user has selected the "3D image pick-up mode" (YES in step S12), operation processing unit 100 starts the 3D image pick-up processing sub routine shown in FIG. 23 (step S14). On the other hand, when the user has not selected the "3D image pick-up mode" (NO in step S12), operation processing unit 100 starts the 2D image pick-up processing sub routine shown in FIG. 24 (step S16).

After any sub routine ended, operation processing unit 100 determines whether end of the image pick-up processing has been indicated or not (step S18). More specifically, operation processing unit 100 determines whether the image pick-up processing has been indicated or not based on whether operation image 310 or operation image 312 has been selected in the user interface screen shown in FIG. 13, or the like.

When end of the image pick-up processing has not been indicated (NO in step S18), operation processing unit 100 repeats processing in step S12 and subsequent steps. On the other hand, when end of the image pick-up processing has been indicated (YES in step S18), operation processing unit 100 ends the image pick-up processing shown in FIG. 22 and the process returns to the main routine.

(p2-1. 3D Image Pick-Up Processing Sub Routine)

The 3D image pick-up processing sub routine will be described with reference to FIG. 23.

Operation processing unit 100 activates image pick-up by outer cameras 131L and 131R (step S102). Namely, operation processing unit 100 provides a command to outer cameras 131L and 131R and obtains a pair of input images (stereo images) having prescribed parallax in a prescribed cycle or every prescribed event. The pair of input images having prescribed parallax is temporarily held.

In succession, operation processing unit 100 determines whether the user has provided some input on touch panel 122 or not (step S104). Namely, operation processing unit 100 determines whether some significant operation input has been output from touch panel 122 or not.

When it is determined that the user has provided some input on touch panel 122 (YES in step S104), operation processing unit 100 calculates a differential vector between marker image 308 displayed on lower LCD 120 and the pointed coordinate (step S106). Namely, operation processing unit 100 calculates a difference from a current value for zoom processing and adjustment of parallax, on the user interface screen displayed on lower LCD 120.

On the other hand, when it is determined that the user has provided no input on touch panel 122 (NO in step S104), operation processing unit 100 determines whether the user has provided some input on control pad 154 or not (step S108). Namely, operation processing unit 100 determines whether some significant operation input has been output from control pad 154 or not.

When it is determined that the user has provided some input on control pad 154 (YES in step S108), operation processing unit 100 calculates a vector from an operation input (an analog amount) output from control pad 154 (step S110). Namely, operation processing unit 100 calculates values to be applied to zoom processing and adjustment of parallax, in accordance with an amount of operation of control pad 154 by the user.

After step S106 or S110 is performed, operation processing unit 100 moves marker image 308 in a direction of the vector calculated in step S106 or S110 at a speed corresponding to magnitude of the vector (step S112). Namely, the calculated vector corresponds to an amount of operation for each of zoom processing and adjustment of parallax, and operation processing unit 100 moves marker image 308 to a position in accordance with this operation amount, and zoom processing and processing for adjusting parallax are performed such that a state value corresponding to the new position is attained.

On the other hand, when it is determined that the user has provided no input on control pad 154 (NO in step S108), operation processing unit 100 sets a current state value of zoom and a current state value of adjustment of parallax as a command value.

In succession, operation processing unit 100 subjects the input image to zoom processing based on the new position of the marker image in the direction of Y axis (the direction of first axis image 304 shown in FIG. 13) (step S114). Namely, operation processing unit 100 adjusts a size of the input image displayed on the display surface of upper LCD 110 so as to attain match with the command value calculated in the preceding processing.

Further in succession, operation processing unit 100 adjusts parallax of the input image based on the new position of the marker image in the X direction (the direction of second axis image 306 shown in FIG. 13) (step S116). Namely, operation processing unit 100 adjusts a degree of overlap (relative positional relation) between the input images displayed on the display surface of upper LCD 110 so as to attain match with the command value calculated in the preceding processing.

It is noted that the order of zoom processing in step S114 and adjustment of parallax in step S116 does not matter. In addition, these processes may be performed in parallel.

Finally, operation processing unit 100 causes upper LCD 110 to display a pair of input images, with change involved with zoom processing and change for adjustment of parallax in respective steps S114 and S116 being reflected (step S118).

In succession, operation processing unit 100 determines whether the user has performed a shutter ON operation or not (step S120). Namely, operation processing unit 100 determines whether L button 162L or R button 162R has been pressed or not.

When the user performed the shutter ON operation (YES in step S120), operation processing unit 100 causes the displayed input image to be saved (step S122). Here, operation processing unit 100 causes an image having a size in accordance with the state of zoom at the time of shutter ON in the pair of input images to be saved. In succession, operation processing unit 100 causes parallax information indicating the state of parallax at the time of shutter ON to be saved in association with the saved image (step S124).

After step S124 is performed or when the user did not perform the shutter ON operation (NO in step S120), the 3D image pick-up processing shown in FIG. 23 ends and the process returns to the process shown in FIG. 22.

(p2-2. 2D Image Pick-Up Processing Sub Routine)

Referring next to FIG. 24, the 2D image pick-up processing sub routine will be described. This 2D image pick-up processing sub routine corresponds to the 3D image pick-up processing sub routine shown in FIG. 23 from which processing involved with adjustment of parallax has been excluded. Therefore, detailed description of processing similar to that in the 3D image pick-up processing sub routine will not be repeated.

Operation processing unit 100 activates image pick-up by inner camera 133 (step S202). Namely, operation processing unit 100 provides a command to inner camera 133 and obtains an input image (non-stereo image) in a prescribed cycle or every prescribed event.

In succession, operation processing unit 100 determines whether the user has provided some input on touch panel 122 or not (step S204). Namely, operation processing unit 100 determines whether some significant operation input has been output from touch panel 122 or not.

When it is determined that the user has provided some input on touch panel 122 (YES in step S204), operation processing unit 100 calculates a differential vector between marker image 308 displayed on lower LCD 120 and the pointed coordinate (step S206). As will be described later, however, in the 2D image pick-up processing, since only zoom processing is adjusted, only a difference in the direction of first axis image 304 shown in FIG. 13 may be calculated.

On the other hand, when it is determined that the user has provided no input on touch panel 122 (NO in step S204), operation processing unit 100 determines whether the user has provided some input on control pad 154 or not (step S208). Namely, operation processing unit 100 determines whether some significant operation input has been output from control pad 154 or not.

When it is determined that the user has provided some input on control pad 154 (YES in step S208), operation processing unit 100 calculates a vector from an operation input (an analog amount) output from control pad 154 (step S210). As will be described later, however, in the 2D image pick-up processing, since only zoom processing is adjusted, only an amount of operation in the vertical direction of the sheet surface output from control pad 154 may be calculated.

After step S206 or S210 is performed, operation processing unit 100 moves marker image 308 in the Y-axis direction of the vector calculated in step S206 or S210 at a speed corresponding to magnitude of the vector (step S212). This is because only zoom processing is adjusted in the 2D image pick-up processing.

On the other hand, when it is determined that the user has provided no input on control pad 154 (NO in step S208), operation processing unit 100 sets a current state value of zoom as a command value.

In succession, operation processing unit 100 subjects the input image to zoom processing based on the new position of the marker image in the direction of the Y axis (the direction of first axis image 304 shown in FIG. 13) (step S214). Namely, operation processing unit 100 adjusts a size of the input image displayed on the display surface of upper LCD 110 so as to attain match with the command value calculated in the preceding processing.

Finally, operation processing unit 100 causes upper LCD 110 to display the input image, with change involved with zoom processing in step S214 being reflected (step S216). It is noted that barrier liquid crystal 113 or the like is inactivated so as to provide non-stereoscopic display (two-dimensional display).

In succession, operation processing unit 100 determines whether the user has performed a shutter ON operation or not (step S218). Namely, operation processing unit 100 determines whether L button 162L or R button 162R has been pressed or not.

When the user performed the shutter ON operation (YES in step S218), operation processing unit 100 causes the displayed input image to be saved (step S220). Here, operation processing unit 100 causes an image having a size in accordance with the state of zoom at the time of shutter ON in the pair of input images to be saved.

After step S220 is performed or when the user did not perform the shutter ON operation (NO in step S218), the 2D image pick-up processing shown in FIG. 24 ends and the process returns to the process shown in FIG. 22.

(p3. CG Mode)

When the "CG mode" has been selected, operation processing unit 100 starts the CG rendering display processing shown in FIG. 25.

Referring to FIG. 25, initially, operation processing unit 100 makes initial setting necessary for the CG rendering display processing (step S302). More specifically, operation processing unit 100 sets initial values such as various parameters necessary for rendering processing, a position of a virtual camera, and a value of a stereo base.

In succession, operation processing unit 100 reads a prescribed object file (step S304). Namely, operation processing unit 100 specifies an object to be rendered. Then, operation processing unit 100 dynamically generates a pair of images (stereo images) having prescribed parallax by virtually picking up an image of the object of interest (step S306). Though the user expressly selects this object file in some cases, typically, it is incorporated in advance in an application selected by the user, and by reading this file, an image to be displayed on the display surface is generated as a result of virtual image pick-up.

In succession, operation processing unit 100 determines whether the user has provided some input on touch panel 122 or not (step S308). Namely, operation processing unit 100 determines whether some significant operation input has been output from touch panel 122 or not.

When it is determined that the user has provided some input on touch panel 122 (YES in step S308), operation processing unit 100 calculates a differential vector between marker image 308 displayed on lower LCD 120 and the pointed coordinate (step S310).

On the other hand, when it is determined that the user has provided no input on touch panel 122 (NO in step S308), operation processing unit 100 determines whether the user has provided some input on control pad 154 or not (step S312).

When it is determined that the user has provided some input on control pad 154 (YES in step S312), operation processing unit 100 calculates a vector from an operation input (an analog amount) output from control pad 154 (step S314).

After step S310 or S314 is performed, operation processing unit 100 moves marker image 308 in a direction of the vector calculated in step S310 or S314 at a speed corresponding to magnitude of the vector (step S316).

On the other hand, when it is determined that the user has provided no input on control pad 154 (NO in step S312), operation processing unit 100 sets a current state value of zoom and a current state value of adjustment of parallax as a command value.

In succession, operation processing unit 100 dynamically generates a pair of images (stereo images) having prescribed parallax by virtually picking up an image of the object of interest again after a position or the like of the virtual camera is changed, based on new respective positions in the Y axis direction (the direction of first axis image 304 shown in FIG. 13) and the X direction (the direction of second axis image 306 shown in FIG. 13) of the marker image (step S318). Finally, operation processing unit 100 causes upper LCD 110 to display a pair of images generated in step S318 (step S320).

Thereafter, operation processing unit 100 determines whether end of the CG rendering display processing has been indicated or not (step S322). When end of the CG rendering display processing has not been indicated (NO in step S322), operation processing unit 100 repeats processing in step S308 and subsequent steps. On the other hand, when end of the CG rendering display processing has been indicated (YES in step S322), operation processing unit 100 ends the CG rendering display processing shown in FIG. 25 and the process returns to the main routine.

(p4. Viewing Mode)

When the "viewing mode" has been selected, operation processing unit 100 starts the viewing processing shown in FIG. 26. As compared with the flowchart showing the contents of the 3D image pick-up processing sub routine shown in FIG. 23, the flowchart of this viewing processing corresponds to obtaining stereo images by reading an image saved in advance, instead of obtaining stereo images as a result of image pick-up by outer cameras 131L, 131R. Therefore, detailed description of processing similar to that in the 3D image pick-up processing sub routine will not be repeated.

Referring to FIG. 26, initially, operation processing unit 100 makes initial setting necessary for the viewing processing (step S402). More specifically, operation processing unit 100 causes an initial screen to be displayed, sets an initial parameter, and the like.

In succession, operation processing unit 100 reads stereo images stored in advance, in response to selection by the user (step S404). Typically, display images IMGL and IMGR as shown in FIG. 20A above are read. Here, operation processing unit 100 reads parallax information saved in association with the read stereo images.

In succession, as the initial state, operation processing unit 100 causes upper LCD 110 to display the read stereo images in relative positional relation based on the parallax information read in step S404 (step S406).

In succession, operation processing unit 100 determines whether the user has provided some input on touch panel 122 or not (step S408). Namely, operation processing unit 100 determines whether some significant operation input has been output from touch panel 122 or not.

When it is determined that the user has provided some input on touch panel 122 (YES in step S408), operation processing unit 100 calculates a differential vector between marker image 308 displayed on lower LCD 120 and the pointed coordinate (step S410).

On the other hand, when it is determined that the user has provided no input on touch panel 122 (NO in step S408), operation processing unit 100 determines whether the user has provided some input on control pad 154 or not (step S412).

When it is determined that the user has provided some input on control pad 154 (YES in step S412), operation processing unit 100 calculates a vector from an operation input (an analog amount) output from control pad 154 (step S414).

After step S410 or S414 is performed, operation processing unit 100 moves marker image 308 in a direction of the vector calculated in step S410 or S414 at a speed corresponding to magnitude of the vector (step S416).

On the other hand, when it is determined that the user has provided no input on control pad 154 (NO in step S412), operation processing unit 100 sets a current state value of zoom and a current state value of adjustment of parallax as a command value.

In succession, operation processing unit 100 subjects the read input image to zoom processing based on the new position of the marker image in the direction of the Y axis (the direction of first axis image 304 shown in FIG. 13) (step S418). Further in succession, operation processing unit 100 adjusts parallax of the read input image based on the new position of the marker image in the X direction (the direction of second axis image 306 shown in FIG. 13) (step S420). Finally, operation processing unit 100 causes upper LCD 110 to display a pair of input images, with change involved with zoom processing and change for adjustment of parallax in respective steps S418 and S420 being reflected (step S422).

It is noted that the order of zoom processing in step S418 and adjustment of parallax in step S420 does not matter. In addition, these processes may be performed in parallel.

In succession, operation processing unit 100 determines whether the user has indicated saving again or not (step S424). When the user has indicated saving again (YES in step S424), operation processing unit 100 causes the displayed input image to be saved again (step S426). Here, operation processing unit 100 causes the image having a size in accordance with the state of zoom at the time of indication of saving again in the pair of input images to be saved. In succession, operation processing unit 100 causes the parallax information indicating the state of parallax at the time of indication of saving again to be saved in association with the saved image (step S428).

After step S428 is performed or when the user did not indicate saving again (NO in step S424), operation processing unit 100 determines whether end of the viewing processing has been indicated or not (step S430). When end of the viewing processing has not been indicated (NO in step S430), operation processing unit 100 repeats processing in step S408 and subsequent steps. On the other hand, when end of the viewing processing has been indicated (YES in step S430), operation processing unit 100 ends the viewing processing shown in FIG. 26 and the process returns to the main routine.

Q. Various Embodiments

Though an example where a series of processing is performed in a single device has been described in the embodiment above, the series of processing may be performed in an information processing system constituted of a plurality of information processing devices in other embodiments. For example, in an information processing system including a terminal-side device and a server-side device capable of communicating with the terminal-side device through a network, a part of processing in the series of processing above may be performed by the server-side device.

In addition, in the information processing system including the terminal-side device and the server-side device capable of communicating with the terminal-side device through a network, main processing in the series of processing above may be performed by the server-side device and a part of the processing may be performed by the terminal-side device.

Moreover, in the information processing system above, the system on the server side may be constituted of a plurality of information processing devices and processing to be performed on the server side may be performed by the plurality of information processing devices in a distributed manner.

Further, the present invention is embodied also as a display control method performed on a computer of a display control device for controlling a display capable of providing stereoscopic display.

Furthermore, the present invention can be implemented in such a manner that a recording medium storing a display control program for performing the processing described above is attached to a display control device main body to which the recording medium can be attached. Namely, the display control device main body has at least a display capable of displaying a stereoscopic image and an input device, and as a recording medium is attached to this display control device main body, the display control program stored therein is read and the display control processing according to the present embodiment is performed. In other words, a display control system constituted of a display control device main body and a recording medium attached thereto can be embodied.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A non-transitory computer readable storage medium storing a display control program executable by a computer of a display control device capable of interacting with an input device, for causing a display capable of providing stereoscopic display to display images in a stereoscopic manner, wherein the input device includes both a touch screen and an analog device configured to accept input having at least two degrees of freedom, the display control program comprising instructions, when executed by the computer, configured to:

cause a user interface display screen to be displayed on the touch screen, the user interface display screen including a displayed first coordinate axis and a displayed second coordinate axis that are both included in a two-dimensional coordinate system;

selectively switch between (1) a first display mode in which the display is set to display the images stereoscopically and (2) a second display mode in which the display is set to display images non-stereoscopically;

selectively accept a single operation input via:
the touch screen and at a touched position on the two-dimensional coordinate system of the user interface display screen with the displayed first coordinate axis and the displayed second coordinate axis, the single operation input having a determined displacement, when the single operation input is accepted via the touch screen, in accordance with a direction of displacement for the touched position on the touch screen from a reference position on the touch screen and an amount of displacement from the reference position on the touch screen to the touched position, and the analog device based on actuation of the analog device, the determined displacement of the single operation is determined, when the single operation input is accepted via the analog device, in accordance with a direction of displacement of the analog device from a reference position of the analog device and an amount of displacement from the reference position of the analog device;

when the first display mode is selected:
perform zoom processing of a stereoscopic image using a first value that is determined based on correspondence of said accepted single operation input to the displayed first coordinate axis of the user interface display screen, and adjust parallax of said stereoscopic image using a second value that is determined based on correspondence of said accepted single operation input to the displayed second coordinate axis of the two-dimensional coordinate system, and cause said display to display the stereoscopic image subjected to the performed zoom processing with adjusted parallax; and when the second display mode is selected:
perform zoom processing for an image using the first value of the accepted single operation input of the displayed first coordinate axis, where the second value of the displayed second coordinate axis is not used for processing the image, and cause the display to display the image subjected to the performed zoom processing in a non-stereoscopic manner.

2. The non-transitory storage medium according to claim 1, wherein said input device outputs at least a two-dimensional value as said single operation input.

3. The non-transitory storage medium according to claim 2, wherein the two-dimensional value includes the first value and the second value.

4. The non-transitory storage medium according to claim 3, wherein
said input device includes one button or a plurality of buttons that can independently operate two directions brought in correspondence with said two-dimensional value and outputs said single operation input having values in accordance with a button operation in respective directions.

5. The non-transitory storage medium according to claim 4, wherein the instructions are further configured to:
generate a first command value for performing zoom processing of said stereoscopic image and a second command value for adjusting parallax of said stereoscopic image based on the button operation in respective directions.

6. The non-transitory storage medium according to claim 2, wherein
said input device includes a pointing device that outputs a position in the first coordinate axis and a position in the second coordinate axis in accordance with the single operation input,
wherein the zoom processing is based on the position in the first coordinate axis, and
wherein the adjusted parallax of said stereoscopic image is further based on the position in the second coordinate axis output from said pointing device.

7. The non-transitory storage medium according to claim 6, wherein the instructions are further configured to:
display a state value object at a coordinate position in the two dimensional coordinate system that corresponds to a first state value indicating a state of zoom of said stereoscopic image and a second state value indicating a state of parallax of said stereoscopic image.

8. The non-transitory storage medium according to claim 7, wherein the instructions are further configured to:
generate a first command value for performing zoom processing of said stereoscopic image and a second command value for adjusting parallax of said stereoscopic image in accordance with a direction of displacement between a position of display of said state value object and pointed said position in said two-dimensional coordinate system; and
update the position of display of said state value object in accordance with said pointed position.

9. The non-transitory storage medium according to claim 8, wherein the position of display of said state value object is updated at a speed in accordance with a distance between the position of display of said state value object and said pointed position.

10. The non-transitory storage medium according to claim 2, wherein the instructions are further configured to:
generate a first command value for performing zoom processing of said stereoscopic image and a second command value for adjusting parallax of said stereoscopic image, in accordance with the direction of displacement from said reference position in said analog device.

11. The non-transitory storage medium according to claim 10, wherein
said first command value and said second command value are generated such that a state of zoom of said stereoscopic image and a state of parallax of said stereoscopic image are varied at a speed in accordance with the amount of displacement from said reference position in said analog device.

12. The non-transitory storage medium according to claim 1, wherein the instructions are further configured to:
cause said display to display entirety or a part of a first image and a second image having parallax on a display surface thereof;
perform zoom processing of said first image and said second image on the display surface of said display based on said accepted single operation input; and
adjust parallax of said first image and said second image at the display surface of said display based on said accepted single operation input.

13. The non-transitory storage medium according to claim 12, wherein said first image and said second image are caused to be displayed in a substantially identical display region.

14. The non-transitory storage medium according to claim 12, wherein
said display control device is configured to interact with a first image pick-up device and a second image pick-up device arranged at a distance from each other, and
the instructions are further configured to cause, in accordance with said single operation input, respective ranges of a first input image and a second input image, which are respectively generated as a result of image pick-up by said first image pick-up device and said second image pick-up device, to be displayed as said first image and said second image.

15. The non-transitory storage medium according to claim 12, wherein
said display control device is configured to interact with a storage device for storing an image, and
the instructions are further configured to save in said storage device, in response to a prescribed operation, an image having a size in accordance with a state of scaled-up display or scaled-down display of said first image and said second image at that time point, in association with information indicating a state of parallax of said first image and said second image at that time point.

16. The non-transitory storage medium according to claim 12, wherein
said display control device is configured to interact with a storage device for storing at least a pair of images having parallax, and
the instructions are further configured to obtain said pair of images stored in said storage device as said first image and said second image.

17. The non-transitory storage medium according to claim 16, wherein
said storage device stores information indicating a state of parallax of the pair of images, in association with said pair of images, and
the instructions are further configured to cause said first image and said second image obtained from said pair of images to be displayed on the display surface of said display in relative positional relation based on the information indicating the state of parallax of the pair of images, as an initial state.

18. The non-transitory storage medium according to claim 1, wherein the display control program comprises further instructions that are configured to cause the computer to:
display, concurrently with display of the stereoscopic image, an operation image upon which the single operation input is accepted in correspondence therewith, the operation image showing a zoom magnitude of said stereoscopic image and a parallax magnitude of said stereoscopic image,
wherein the operation image is displayed in a non-stereoscopic manner and concurrently with the display of the stereoscopic image.

19. A display control method performed on a computer of a display control device for controlling a display capable of providing stereoscopic display, the computer coupled to a touch screen and an analog device configured to accept input having at least two degrees of freedom, the method comprising:
causing a user interface display screen to be displayed on the touch screen, the user interface display screen including a displayed first coordinate axis and a displayed second coordinate axis that are both included in a two-dimensional coordinate system;
selectively switching between (1) a first display mode in which the display is set to display images stereoscopically and (2) a second display mode in which the display is set to display images non-stereoscopically;
selectively accepting a single operation input via:
the touch screen and at a touched position on the two-dimensional coordinate system of the user interface display screen with the displayed first coordinate axis and the displayed second coordinate axis, the single operation input having a determined displacement, when the single operation input is accepted via the touch screen, in accordance with a direction of displacement for the touched position on the touch screen from a reference position on the touch screen and an amount of displacement from the reference position on the touch screen to the touched position, and;
the analog device based on actuation of the analog device, the determined displacement of the single operation is determined, when the single operation input is accepted via the analog device, in accordance with a direction of displacement of the analog device from a reference position of the analog device and an amount of displacement from the reference position of the analog device;
when the first display mode is selected:
performing, via the computer, zoom processing of a stereoscopic image using a first value that is determined based on correspondence of said accepted single operation input to the displayed first coordinate axis of the user interface display screen, adjusting, via the computer, parallax of said stereoscopic image using a second value that is determined based on correspondence of said accepted operation input from the single input control to the displayed second coordinate axis of the two-dimensional coordinate system, and causing said display to display the stereoscopic image subjected to the performed zoom processing and the adjusted parallax; and when the second display mode is selected:

performing zoom processing for an image based on the first value of the accepted single operation input of the displayed first coordinate axis, where the second value of the displayed second coordinate axis is not used for processing the image, and causing the display to display the image subjected to the performed zoom processing in a non-stereoscopic manner.

20. A display control device, comprising:

a display configured to display images in a stereoscopic manner or a non-stereoscopic manner;

a touch screen configure to accept input that indicates a two-dimensional coordinate in a two-dimensional coordinate system;

an analog input device configured to accept input having at least two degrees of freedom;

a processing system that includes at least one hardware processor, the processing system configured to:

cause a user interface display screen to be displayed on the touch screen, the user interface display screen including a displayed first coordinate axis and a displayed second coordinate axis that are both included in a two-dimensional coordinate system;

selectively switch between (1) a first display mode in which the display is set to display the images in the stereoscopic manner and (2) a second display mode in which the display is set to display images in the non-stereoscopic manner;

selectively accept a single operation input via:

the touch screen and at a touched position onto the two-dimensional coordinate system of the user interface display screen with the displayed first coordinate axis and the displayed second coordinate axis, the single operation input having a determined displacement, when the single operation input is accepted via the touch screen, in accordance with a direction of displacement for the touched position on the touch screen from a reference position on the touch screen and an amount of displacement from the reference position on the touch screen to the touched position, and the analog device based on actuation of the analog device, the determined displacement of the single operation is determined, when the single operation input is accepted via the analog device, in accordance with a direction of displacement of the analog device from a reference position of the analog device and an amount of displacement from the reference position of the analog device;

when the first display mode is selected:

perform zoom processing of a stereoscopic image using a first value that is determined based on correspondence of said accepted single operation input to the displayed first coordinate axis of the user interface display screen, adjust parallax of said stereoscopic image using a second value that is determined based on correspondence of said accepted single operation input to the displayed second coordinate axis of the two-dimensional coordinate system, and cause said display to display the stereoscopic image subjected to the performed zoom processing with adjusted parallax; and when the second display mode is selected:

perform zoom processing for an image using the first value of the accepted single operation input of the displayed first coordinate axis, where the second value of the displayed second coordinate axis is not used for processing the image, and cause the display to display the image subjected to the performed zoom processing in a non-stereoscopic manner.

21. A display control system for controlling how images are displayed in a stereoscopic manner, the display control system comprising:

a display device configured to display images stereoscopically and non-stereoscopically;

a touch screen configured to accept input provided by a user in correspondence with a two-dimensional coordinate system;

an analog input device configured to accept input having at least two degrees of freedom;

a processing system including at least one hardware processor, the processing system configured to:

cause a user interface display screen to be displayed on the touch screen, the user interface display screen including a displayed first coordinate axis and a displayed second coordinate axis that are both included in the two-dimensional coordinate system;

selectively switch the display device between (1) a first display mode in which the display device is set to display the images stereoscopically and (2) a second display mode in which the display device is set to display images non-stereoscopically;

selectively accept a single operation input via:

the touch screen and at a touched position on the two-dimensional coordinate system of the user interface display screen with the displayed first coordinate axis and the displayed second coordinate axis, the single operation input having a determined displacement, when the single operation input is accepted via the touch screen, in accordance with a direction of displacement for the touched position on the touch screen from a reference position on the touch screen and an amount of displacement from the reference position on the touch screen to the touched position, and the analog device based on actuation of the analog device, the determined displacement of the single operation is determined, when the single operation input is accepted via the analog device, in accordance with a direction of displacement of the analog device from a reference position of the analog device and an amount of displacement from the reference position of the analog device;

when the first display mode is selected:

perform zoom processing on a stereoscopic image using a first value that is determined based on correspondence of the accepted single operation input to the displayed first coordinate axis of the user interface display screen, adjust parallax of said stereoscopic image using a second value that is determined based on correspondence of the accepted single operation input to the displayed second coordinate axis of the two-dimensional coordinate system, and output the stereoscopic image subjected to the performed zoom processing and the adjusted parallax to the display device for stereoscopic display thereon; and when the second display mode is selected:

perform zoom processing for an image based on the first value of the accepted single operation input of the displayed first coordinate axis, where the second value of the displayed second coordinate axis is not used for processing the image, and cause the display to display the image subjected to the performed zoom processing in a non-stereoscopic manner.

22. The display control system of claim 21, wherein the processing system is further configured to:

set a zoom parameter in accordance with the single operation input; and set a parallax parameter in accordance with the single operation input, wherein the first value is taken from the zoom parameter and the second value is taken from the parallax parameter.

23. The display control system of claim 21, further comprising a hardware control that is adjustable by a user, the hardware control configured to selectively cause the switching between the first display mode and the second display mode in response to actuation by the user.

24. The display control system of claim 21, wherein the processing system is further configured to output an operation image that is displayed in a non-stereoscopic manner, the operation image being concurrently displayed with the stereoscopic image that is displayed stereoscopically, where the single operation input is accepted on the touch screen in correspondence with where the operation image is displayed.

25. The display control system of claim 21, wherein:

the display control system is a portable electronic device that is holdable in at least one hand of a user of the portable electronic device, the analog device is provided on a front surface of the portable electronic device with the touch screen and includes at least one sensor that outputs data as a function of an amount and direction of movement from the reference position of the analog device.

* * * * *